United States Patent
Huang et al.

(10) Patent No.: US 12,466,856 B2
(45) Date of Patent: Nov. 11, 2025

(54) ECHINOCANDIN ANALOGUES AND PREPARATION METHOD THEREFOR

(71) Applicants: SHANGHAI SENHUI MEDICINE CO., LTD., Shanghai (CN); SHANGHAI SHENGDI PHARMACEUTICAL CO., LTD., Shanghai (CN); JIANGSU HENGRUI MEDICINE CO., LTD., Jiangsu (CN)

(72) Inventors: Jian Huang, Shanghai (CN); Lingjian Zhu, Shanghai (CN); Wei Jiang, Shanghai (CN); Weicou Cao, Shanghai (CN)

(73) Assignees: Shanghai Senhui Medicine Co., Ltd., Shanghai (CN); Shanghai Shengdi Pharmaceutical Co., Ltd., Shanghai (CN); Jiangsu Hengrui Medicine Co., Ltd., Lianyungang Jiangsu (CN)

(*) Notice: Subject to any disclaimer, the term of this patent is extended or adjusted under 35 U.S.C. 154(b) by 0 days.

(21) Appl. No.: 17/756,721

(22) PCT Filed: Dec. 4, 2020

(86) PCT No.: PCT/CN2020/133815
§ 371 (c)(1),
(2) Date: Jun. 1, 2022

(87) PCT Pub. No.: WO2021/110125
PCT Pub. Date: Jun. 10, 2021

(65) Prior Publication Data
US 2023/0159591 A1     May 25, 2023

(30) Foreign Application Priority Data

| Dec. 6, 2019 | (CN) | 201911241526.8 |
| Dec. 9, 2019 | (CN) | 201911249226.4 |
| Mar. 11, 2020 | (CN) | 202010165349.6 |
| Aug. 11, 2020 | (CN) | 202010799506.9 |
| Oct. 27, 2020 | (CN) | 202011164541.X |
| Nov. 30, 2020 | (CN) | 202011371550.6 |

(51) Int. Cl.
C07K 7/56      (2006.01)
A61P 31/10     (2006.01)

(52) U.S. Cl.
CPC ............ *C07K 7/56* (2013.01); *A61P 31/10* (2018.01)

(58) Field of Classification Search
CPC ............................ C07K 7/56; A61P 31/10
See application file for complete search history.

(56) References Cited

U.S. PATENT DOCUMENTS

| 5,652,213 A | 7/1997 | Jamison et al. |
| 5,914,313 A * | 6/1999 | Bouffard ............ C07K 7/56 514/21.1 |
| 2012/0190613 A1 | 7/2012 | James, Jr. et al. |

FOREIGN PATENT DOCUMENTS

| CN | 108883152 A | 11/2018 |
| WO | 2016201283 A1 | 12/2016 |
| WO | 2017120471 A1 | 7/2017 |

OTHER PUBLICATIONS

Pirali et al, Applications of Deuterium in Medicinal Chemistry, J. Med. Chem., 2019, 62, pp. 5276-5297.*
1-Methylpyrrolidine, from Chemical Book, 2018, pp. 1-4.*
Li et al, Genetic Manipulation of the Pneumocandin Biosynthetic Pathway for Generation of Analogues and Evaluation of Their Antifungal Activity, ACS Chem. Biol., 2015, 10, pp. 1702-1710.*
International Search Report issued Mar. 2, 2021 in PCT/CN2020/133815.
Written Opinion issued Mar. 2, 2021 in PCT/CN2020/133815.
Jamison, J.A., et al., "The Synthesis and Antifungal Activity of Nitrogen Containing Hemiaminal Esters of LY303366," Journal of Antibiotics, vol. 51, No. 2, pp. 239-242, Feb. 28, 1998.

(Continued)

*Primary Examiner* — Li N Komatsu
(74) *Attorney, Agent, or Firm* — Ice Miller LLP

(57) ABSTRACT

The present invention relates to an echinocandin analogue and a preparation method therefor. The compound can be used for preventing or treating fungal infection, or for preventing, stabilizing or inhibiting fungal growth or killing fungi. An exemplary compound is represented by formula I, wherein the definitions of $R_1$, $R_2$, $R_3$ and G groups are as described in the description.

6 Claims, 1 Drawing Sheet

(56) References Cited

OTHER PUBLICATIONS

Alexander, Barbara D., et al., "Antigungal Resistance Trends Towards the Year 2000," Drugs, vol. 54, No. 5, pp. 657-678, Nov. 1997.
Warnock, David W., "Fungal infections in neutropenia: current problems and chemotherapeutic control," Journal of Antimicrobial Chemotherapy, vol. 41, Suppl. D, pp. 95-105 (1998).
Andrew Streitwieser, Jr., "Amines," Introduction to Organic Chemistry, Macmillan Publishing Co., Inc., New York, pp. 765-778 (1976).

* cited by examiner

ECHINOCANDIN ANALOGUES AND PREPARATION METHOD THEREFOR

CROSS-REFERENCE TO RELATED APPLICATION

This application is a Section 371 of International Application No. PCT/CN2020/133815 filed Dec. 4, 2020, which was published in the Chinese language Jun. 10, 2021, under International Publication No. WO 2021/110125 A1, which claims priority to Chinese Patent Application 201911241526.8 filed on Dec. 6, 2019, Chinese Patent Application 201911249226.4 filed on Dec. 9, 2019, Chinese Patent Application 202010165349.6 filed on Mar. 11, 2020, Chinese Patent Application 202010799506.9 filed on Aug. 11, 2020, Chinese Patent Application 202011164541.X filed on Oct. 27, 2020, and Chinese Patent Application 202011371550.6 filed on Nov. 30, 2020, the disclosures of which are incorporated herein by reference in their entireties.

TECHNICAL FIELD

The present disclosure relates to the field of medicinal chemistry, and particularly to a class of echinocandin analogs that can be used for combating fungal infections.

BACKGROUND

The development of antifungal treatment regimens has been a consistent challenge for today's society. Currently available drugs for the treatment of fungal infections include amphotericin B, a macrolide polyene that interacts with fungal membrane sterols; flucytosine, a fluoropyrimidine that interacts with fungal protein and DNA biosynthesis; and a variety of azole antifungals that inhibit fungal membrane-sterol biosynthesis (e.g., ketoconazole, itraconazole and fluconazole) (Alexander et al., *Drugs*, 54:657, 1997). The application of amphotericin B is restricted for the infusion-related reactions and renal toxicity, in spite of the fact that it has a wide range of activity and is considered the "gold standard" for antifungal therapy (Warnock, *J. Antimicrob. Chemother.*, 41:95, 1998). The use of flucytosine is also restricted due to the development of drug-resistant microorganisms and its narrow spectrum of activity. The widespread use of azole antifungals is leading to the occurrence of clinical drug-resistant strains of *Candida* spp. Echinocandins are a novel class of antifungals. They generally comprise a cyclic hexapeptide and a lipophilic tail, with the latter linked to the hexapeptide core by an amide bond. Such drugs interfere with the synthesis of β-1,3-glucose in fungal cell walls by non-competitive inhibition of β-1,3-glucose synthase, leading to changes of the fungal cell walls in permeability and to lysis, and thus death, of the cells. Due to the absence of cell walls in human cells and the presence of cell walls in fungal cells, echinocandin antifungals can directly act upon the components of the fungal cell walls, thereby having low toxicity to humans. Therefore, they have been one of the safest antifungals to date.

Currently, such drugs on the market include caspofungin, micafungin and anidulafungin. Caspofungin, the first echinocandin antifungal, was developed by Merck Sharp & Dohme, U.S. and was approved by USFDA for the treatment of fungal infections in 2004 and approved for the treatment of *Candida* infections in children in 2008. Micafungin (Mycamine) is a novel semi-synthetic antifungal, launched in Japan in 2002. Anidulafungin is a third-generation semi-synthetic echinocandin antifungal, launched in 2006.

WO2017049102A and WO2018102407A disclose echinocandin antifungals shown as formula 1 below.

formula 1

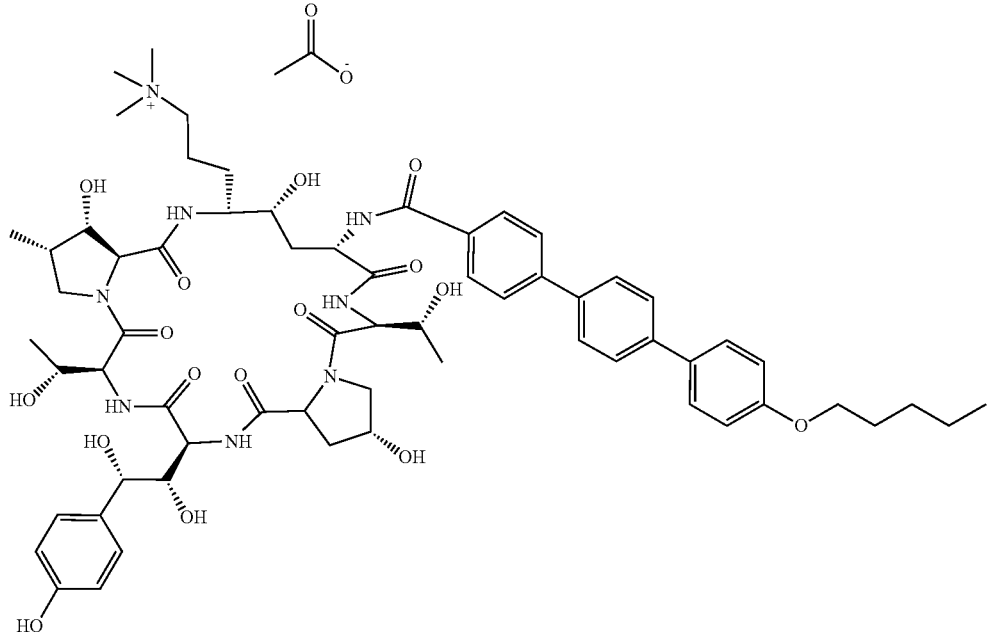

SUMMARY

The present disclosure provides a compound of formula I or a pharmaceutically acceptable salt or isomer thereof,

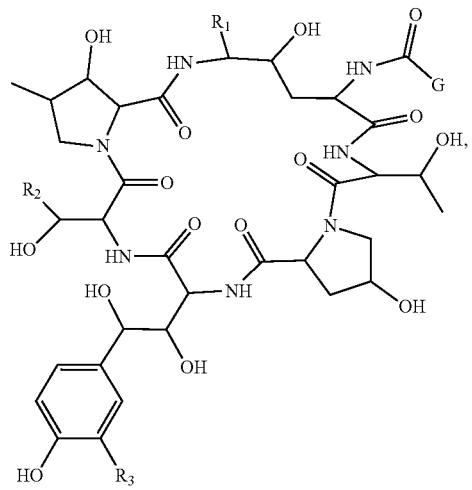

I wherein $R_1$ is selected from the group consisting of hydroxy, $O(C(R_{A1})(R_{A2}))_a(C(R_{A3})(R_{A4}))_jX_1$, $NH(C(R_{A1})(R_{A2}))_a(C(R_{A3})(R_{A4}))_jX_1$, $O(CH_2CH_2O)_b CH_2CH_2X_1$, $O(CH_2CH_2CH_2O)_b CH_2CH_2X_1$, $O(CH_2CH_2NH)_b CH_2CH_2X_1$, $NH(CH_2CH_2O)_b CH_2CH_2X_1$, $NH(CH_2CH_2NH)_b CH_2CH_2X_1$, $NH(CH_2CH_2CH_2O)_b CH_2CH_2X_1$, $NH[(CH_2(CH_2)_cO)]_b CH\{CH_2[OCH_2(CH_2)_c]_dX_1\}_2$, $O[(CH_2(CH_2)_cO)]_b CH\{CH_2[OCH_2(CH_2)_c]_dX_1\}_2$ and $(OCH_2CH_2)_b(NHCH_2CH_2)_eX_2$;

$R_2$ is selected from the group consisting of hydrogen, $R_{B1}R_{B2}N-$, $CH_2CH_2NR_{B1}R_{B2}$, $CH_2C(O)NR_{B1}R_{B2}$, $C_{1-10}$ lower alkyl, $C_{2-10}$ alkenyl, $C_{2-10}$ alkynyl, aryl, heteroaryl, cyclohydrocarbyl, heterocyclyl and PEG;

$R_3$ is selected from the group consisting of H, $OSO_3H$ and $CH_2NR_{B1}R_{B2}$;

G is a $C_{10-42}$ fatty unit;

$R_{A1}$, $R_{A2}$, $R_{A3}$ and $R_{A4}$ are independently selected from the group consisting of hydrogen, deuterium, halogen, lower alkyl, cyclohydrocarbyl and cyclohydrocarbylene

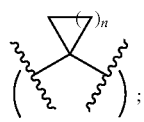

$R_{B1}$ and $R_{B2}$ are independently selected from the group consisting of H, $-C(O)R_J$ and lower alkyl;

$X_1$ is independently $N(R_{C1}R_{C2}R_{C3})$ or the structure

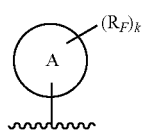

wherein ring A is an optionally substituted, saturated or unsaturated, monocyclic or fused ring containing one or more N atoms;

$R_{C1}$, $R_{C2}$ and $R_{C3}$ are independently selected from the group consisting of H, $C_{1-6}$ alkyl, $C_{1-6}$ lower haloalkyl and deuterated $C_{1-6}$ lower alkyl, and at least one of $R_{C1}$, $R_{C2}$ and $R_{C3}$ is not hydrogen;

each $R_F$ is independently selected from the group consisting of H, deuterium, hydroxy, hydroxyalkyl, amino, alkoxy, lower alkyl, alkenyl, alkynyl, halogen, SR', SOR', $SO_2R'$, NR'(R''), COOR' and CONR'(R''), wherein the lower alkyl is optionally substituted with a substituent substituted with one or more substituents selected from the group consisting of deuterium, alkyl, cycloalkyl, alkoxy, hydroxyalkyl, alkenyl, alkynyl, aryl, heteroaryl, nitro, nitrile groups, hydroxy, halogen, SR', NR'(R''), COOR' and CONR'(R'');

$X_2$ is $N(R_{D1}R_{D2}R_{D3})$ or $X_1$ structure;

$R_{D1}$, $R_{D2}$ and $R_{D3}$ are independently selected from the group consisting of H, $C_{1-6}$ lower alkyl, $C_{1-6}$ lower haloalkyl and deuterated $C_{1-6}$ lower alkyl;

R' and R'' are independently selected from the group consisting of hydrogen, hydroxy, alkyl, alkoxy, alkenyl and $-C(O)R_J$;

$R_J$ is selected from the group consisting of hydrogen, deuterium, $C_{1-10}$ lower alkyl, cyclohydrocarbyl and cyclohydrocarbylene;

a is an integer from 0 to 5;
b is an integer from 1 to 5;
c is an integer from 1 to 2;
d is an integer from 0 to 3;
e is an integer from 1 to 5;
k is an integer from 0 to 20;
j is an integer from 0 to 5; and
n is an integer from 1 to 7.

"Independently selected from the group consisting of" or "independently is/are" means that variable groups, at each occurrence, are independently selected from the group consisting of defined substituents.

In some embodiments, $R_1$ may be selected from the group consisting of $O(C(R_{A1})(R_{A2}))_a(C(R_{A3})(R_{A4}))_jX_1$, $NH(C(R_{A1})(R_{A2}))_a(C(R_{A3})(R_{A4}))_jX_1$, $O(CH_2CH_2O)_b CH_2CH_2X_1$, $O(CH_2CH_2CH_2O)_b CH_2CH_2X_1$, $O(CH_2CH_2NH)_b CH_2CH_2X_1$, $NH(CH_2CH_2O)_b CH_2CH_2X_1$, $NH(CH_2CH_2NH)_b CH_2CH_2X_1$, $NH(CH_2CH_2CH_2O)_b CH_2CH_2X_1$, $NH[(CH_2(CH_2)_cO)]_b CH\{CH_2[OCH_2(CH_2)_c]_dX_1\}_2$, $O[(CH_2(CH_2)_cO)]_b CH\{CH_2[OCH_2(CH_2)_c]_dX_1\}_2$ and $(OCH_2CH_2)_b(NHCH_2CH_2)_eX_2$;

$R_2$ may be selected from the group consisting of hydrogen, $R_{B1}R_{B2}N-$, $CH_2CH_2NR_{B1}R_{B2}$, $CH_2C(O)NR_{B1}R_{B2}$, $C_{1-10}$ lower alkyl, $C_{2-10}$ alkenyl, $C_{2-10}$ alkynyl, aryl, heteroaryl, cyclohydrocarbyl, heterocyclyl and PEG;

$R_3$ may be selected from the group consisting of H, $OSO_3H$ and $CH_2NR_{B1}R_{B2}$;

G may be a $C_{10-36}$ lipophilic unit;

$R_{A1}$, $R_{A2}$, $R_{A3}$ and $R_{A4}$ are independently selected from the group consisting of hydrogen, deuterium, halogen, lower alkyl, cyclohydrocarbyl and cyclohydrocarbylene

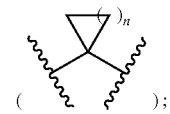

$R_{B1}$ and $R_{B2}$ are each independently selected from the group consisting of H, —C(O)$R_J$ and lower alkyl;

$X_1$ is independently N($R_{C1}R_{C2}R_{C3}$) or the structure

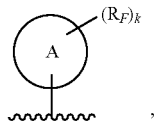

wherein ring A is an optionally substituted, saturated or unsaturated, monocyclic or fused ring containing one or more N atoms;

$R_{C1}$, $R_{C2}$ and $R_{C3}$ are each independently selected from the group consisting of H, $C_{1-6}$ lower haloalkyl and deuterated $C_{1-6}$ lower alkyl, and at least one of $R_{C1}$, $R_{C2}$ and $R_{C3}$ is not hydrogen;

each $R_F$ is independently selected from the group consisting of H, deuterium, hydroxy, hydroxyalkyl, amino, alkoxy, lower alkyl, alkenyl, alkynyl, halogen, SR', SOR', SO$_2$R', NR'(R"), COOR' and CONR'(R"), wherein the lower alkyl may be optionally substituted with one or more substituents selected from the group consisting of deuterium, alkyl, cycloalkyl, alkoxy, hydroxyalkyl, alkenyl and alkynyl;

$X_2$ is N($R_{D1}R_{D2}R_{D3}$) or $X_1$ structure;

$R_{D1}$, $R_{D2}$ and $R_{D3}$ are independently selected from the group consisting of H, $C_{1-6}$ lower alkyl, $C_{1-6}$ lower haloalkyl and deuterated $C_{1-6}$ lower alkyl;

R' and R" are independently selected from the group consisting of hydrogen, hydroxy, alkyl, alkoxy, alkenyl and —C(O)$R_J$;

$R_J$ is independently selected from the group consisting of hydrogen, $C_{1-10}$ lower alkyl, cyclohydrocarbyl and cyclohydrocarbylene;

a is an integer from 0 to 5;
b is an integer from 1 to 5;
c is an integer from 1 to 2;
d is an integer from 0 to 3;
e is an integer from 1 to 5;
k is an integer from 0 to 20;
j is independently an integer from 0 to 5; and
n is an integer from 1 to 7.

In some embodiments, $X_1$ may be selected from the group consisting of the following structures:

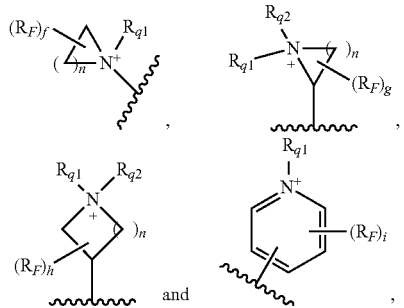

wherein each $R_F$ is independently selected from the group consisting of H, deuterium, hydroxy, hydroxyalkyl, amino, alkoxy, lower alkyl, alkenyl, alkynyl, halogen, SR', SOR', SO$_2$R', NR'(R"), COOR' and CONR'(R"), wherein the lower alkyl may be optionally substituted with one or more substituents selected from the group consisting of deuterium, alkyl, cycloalkyl, alkoxy, hydroxyalkyl, alkenyl and alkynyl;

$R_{q1}$ and $R_{q2}$ may independently be H or $C_{1-6}$ lower alkyl optionally substituted with one or more substituents selected from the group consisting of deuterium, alkyl, cycloalkyl, alkoxy, hydroxyalkyl, alkenyl, alkynyl, aryl, heteroaryl, nitro, nitrile groups, hydroxy, halogen, SR', NR'(R"), COOR' and CONR'(R");

R' and R" are independently selected from the group consisting of hydrogen, hydroxy, alkyl, alkoxy, alkenyl and —C(O)$R_J$;

$R_J$ is selected from the group consisting of hydrogen, deuterium, $C_{1-10}$ lower alkyl, cyclohydrocarbyl and cyclohydrocarbylene;

f is an integer from 0 to 16;
g is an integer from 0 to 16;
h is an integer from 0 to 9;
i is an integer from 0 to 4;
n is an integer from 1 to 7; and
p is an integer from 1 to 3.

In some embodiments, G may be selected from the group consisting of

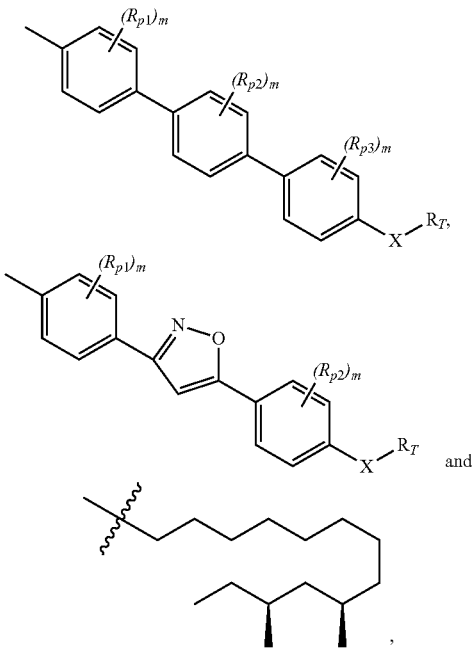

wherein X is independently selected from the group consisting of O, C($R_{B1}$)($R_{B2}$), NR$_{p4}$— and S; $R_T$ may be $C_{1-5}$ linear or branched alkyl, wherein the alkyl is optionally substituted with one or more substituents selected from the group consisting of deuterium, halogen, alkyl, cyclohydrocarbyl and cyclohydrocarbylene

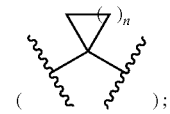

$R_{p1}$, $R_{p2}$ and $R_{p3}$, at each occurrence, are independently selected from the group consisting of hydrogen, deuterium, halogen, $C_{1-10}$ lower alkyl, $C_{1-10}$ lower haloalkyl, $C_{2-10}$ alkenyl, $C_{2-10}$ alkynyl, aryl, heteroaryl, cyclohydrocarbyl, heterocyclyl and PEG; m is an integer from 0 to 4; n is an integer from 1 to 7; $R_{p4}$ is hydrogen or $C_{1-6}$ lower alkyl; $R_{B1}$ and $R_{B2}$ are each independently selected from the group consisting of H, —C(O)$R_J$ and $C_{1-10}$ lower alkyl, wherein $R_J$ is selected from the group consisting of hydrogen, deuterium, $C_{1-10}$ lower alkyl, cyclohydrocarbyl and cyclohydrocarbylene.

In some embodiments, G may be selected from the group consisting of:

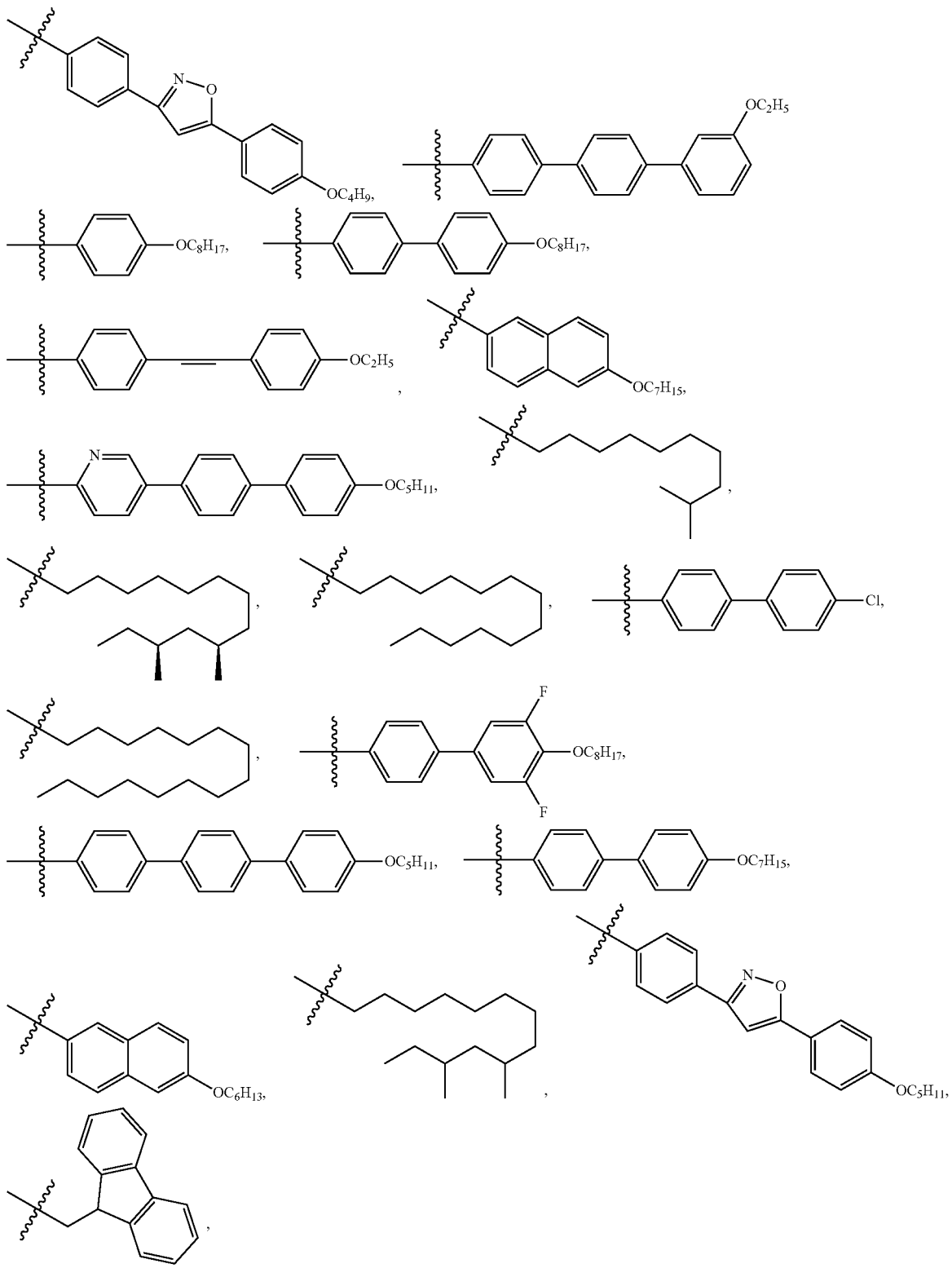

-continued
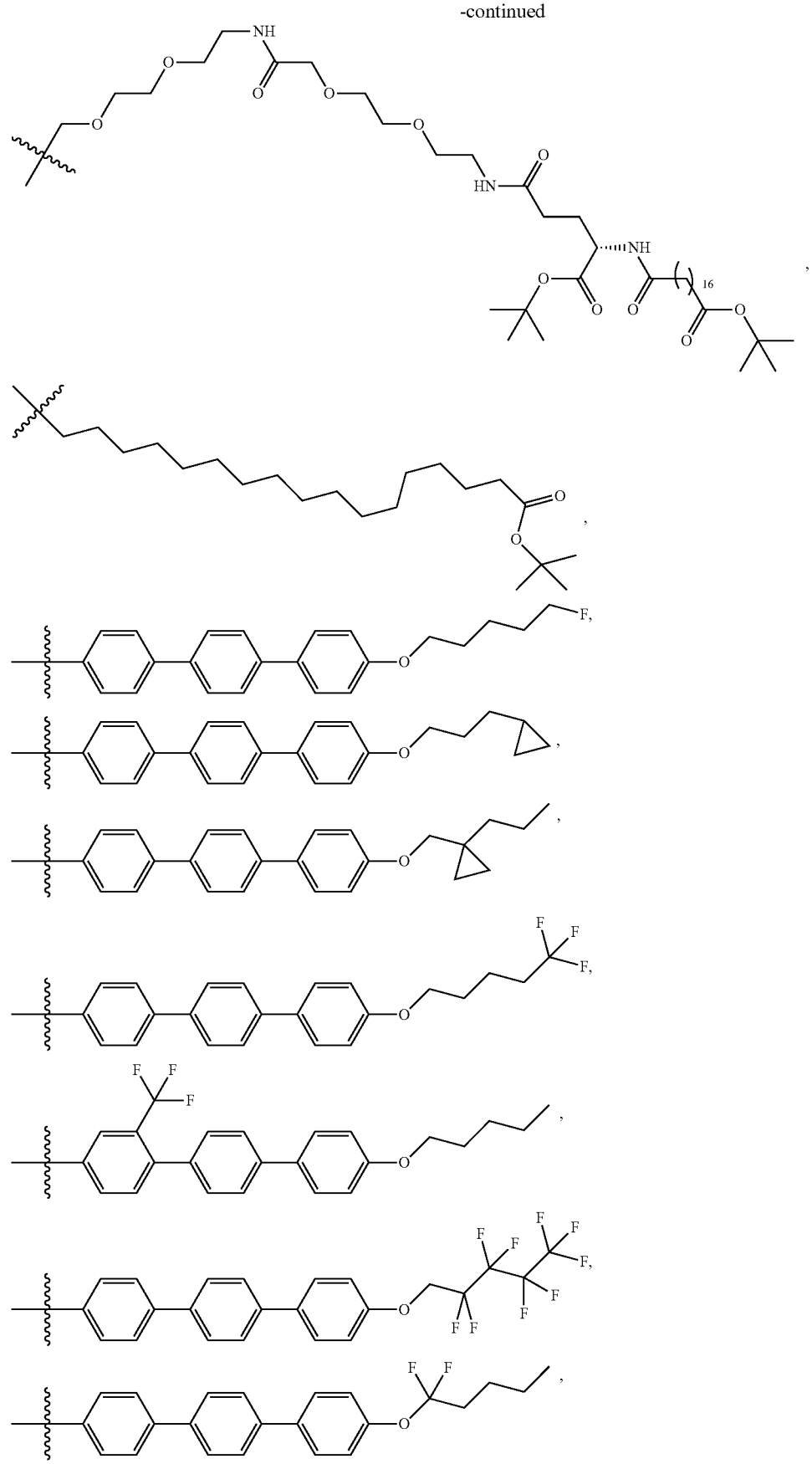

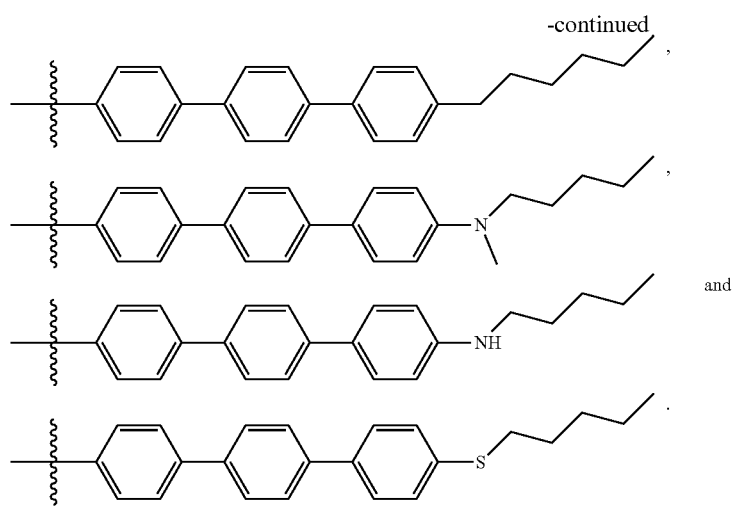
In some embodiments, R₁ may be selected from the group consisting of:
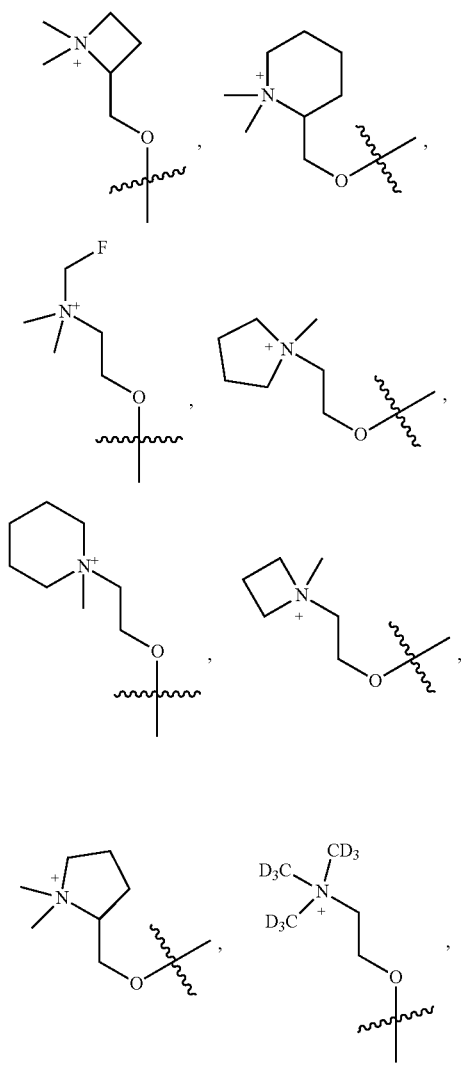
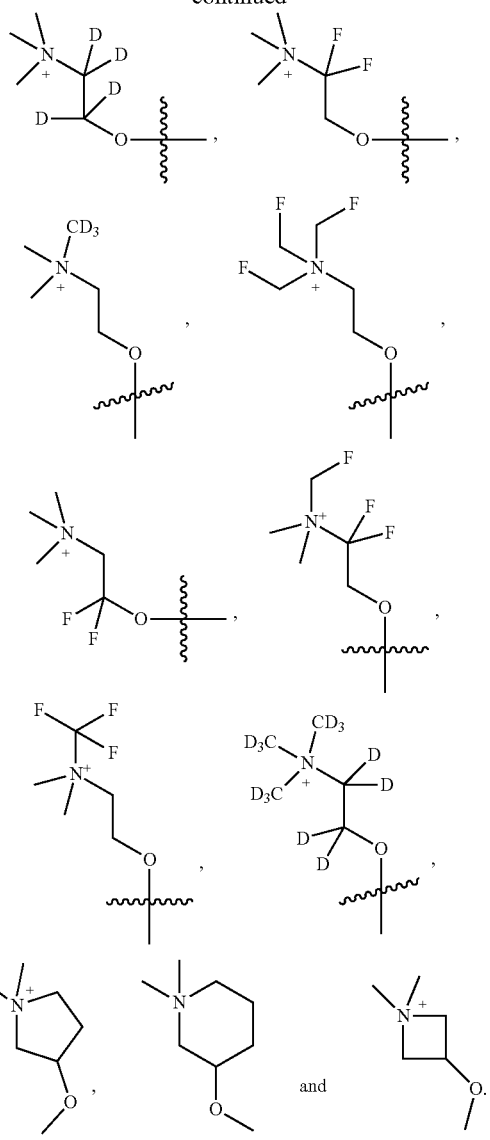

In other embodiments, $R_1$ may be selected from the group consisting of:

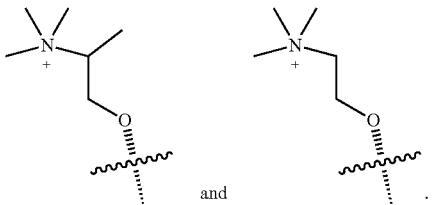

and .

The present disclosure provides a compound of formula II or a pharmaceutically acceptable salt or isomer thereof, wherein

II

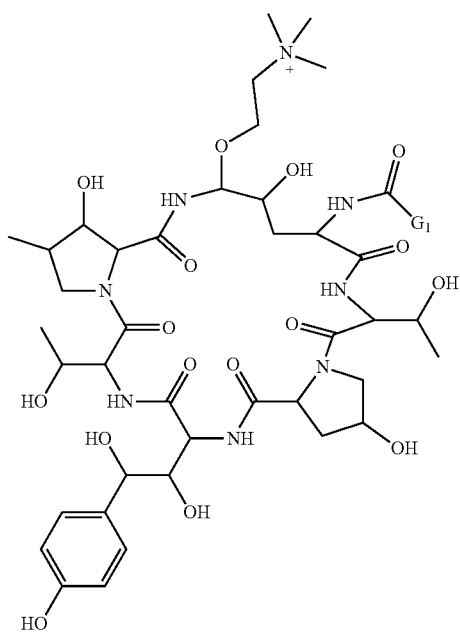

$G_1$ may be selected from the group consisting of

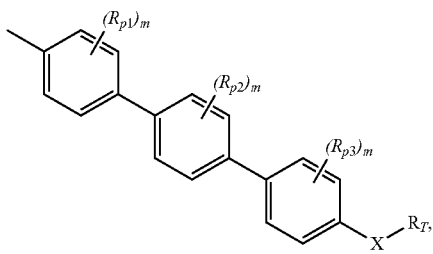

-continued

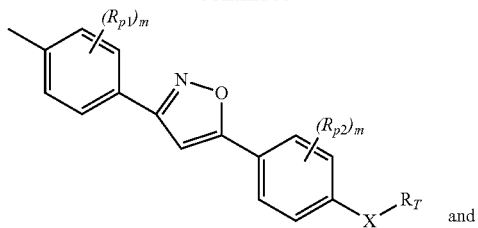

and wherein $R_{p1}$, $R_{p2}$ and $R_{p3}$ are independently selected from the group consisting of hydrogen, deuterium, halogen, $C_{1-6}$ lower alkyl, $C_{1-6}$ lower haloalkyl, $C_{2-10}$ alkenyl, $C_{2-10}$ alkynyl, aryl, heteroaryl, cyclohydrocarbyl, heterocyclyl and PEG;

X is independently selected from the group consisting of O, $C(R_{B}1)(R_{B2})$, $NR_{p4}$— and S;

$R_{p4}$ is hydrogen or $C_{1-3}$ lower alkyl;

$R_T$ may be $C_{1-5}$ linear or branched alkyl, wherein the alkyl is optionally substituted with one or more substituents selected from the group consisting of deuterium, hydroxy, amino, alkoxy, amino, NR'(R"), halogen, cyclohydrocarbyl and cyclohydrocarbylene

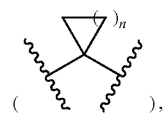

and when $R_{p1}$, $R_{p2}$ and $R_{p3}$ are all H and X is O, $R_T$ is not —$C_5H_{11}$; when X is O and $R_T$ is —$C_5H_{11}$, at least one of $R_{p1}$, $R_{p2}$ and $R_{p3}$ is not H; when $R_T$ is —$C_5H_{11}$ and $R_{p1}$, $R_{p2}$ and $R_{p3}$ are all H, X is not O;

$R_{B1}$ and $R_{B2}$ are each independently selected from the group consisting of H, —C(O)$R_J$ and $C_{1-10}$ lower alkyl;

$R_J$ is selected from the group consisting of hydrogen, $C_{1-10}$ lower alkyl, cyclohydrocarbyl and cyclohydrocarbylene;

m is an integer from 0 to 4; and n is an integer from 1 to 7.

The present disclosure also provides a compound of formula III or a pharmaceutically acceptable salt or isomer thereof, III
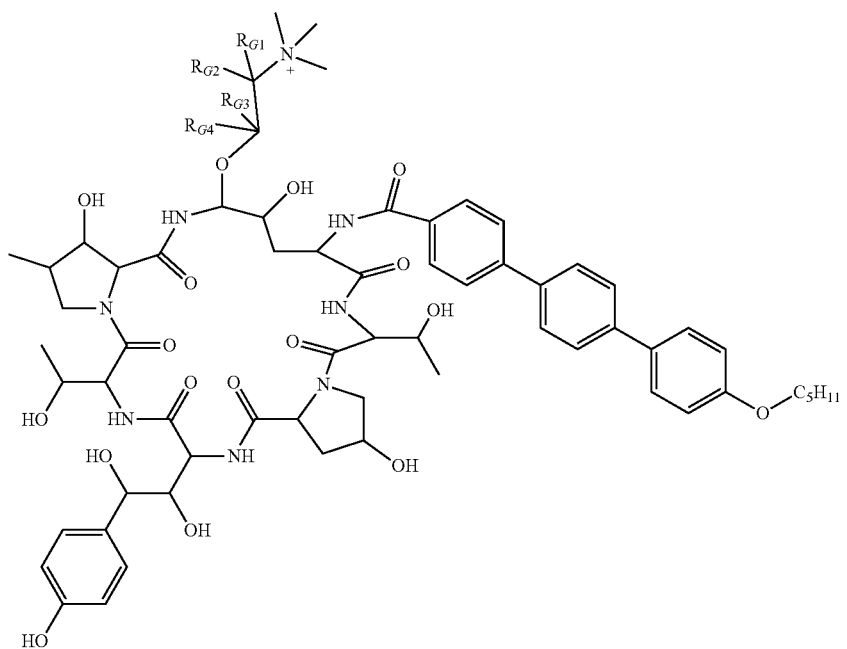
wherein $R_{G1}$, $R_{G2}$, $R_{G3}$ and $R_{G4}$ are independently selected from the group consisting of hydrogen, deuterium, halogen and lower alkyl, and at least one of $R_{G1}$, $R_{G2}$, $R_{G3}$ and $R_{G4}$ is not hydrogen.
The present disclosure provides the following compounds or pharmaceutically acceptable salts or isomers thereof,
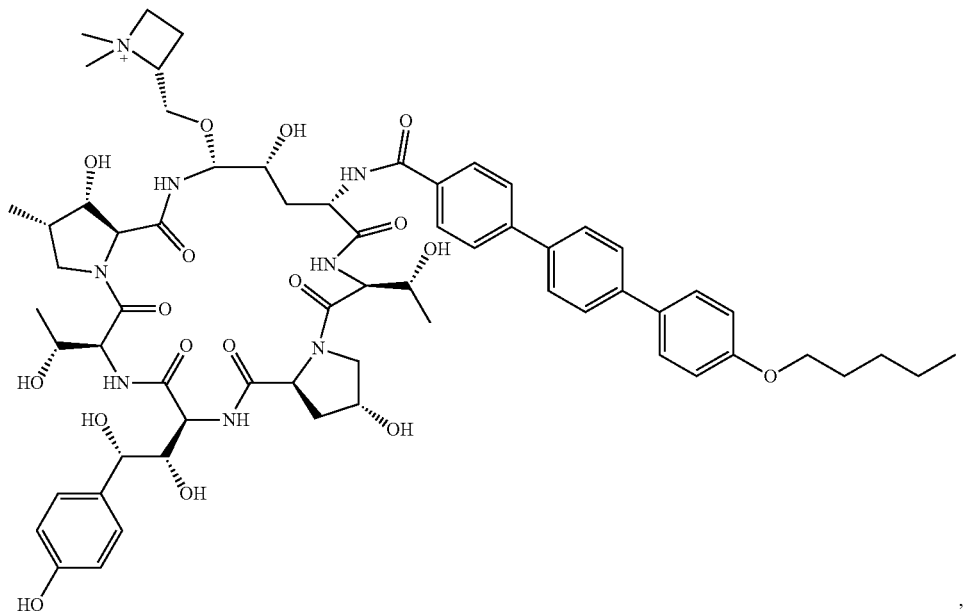
,

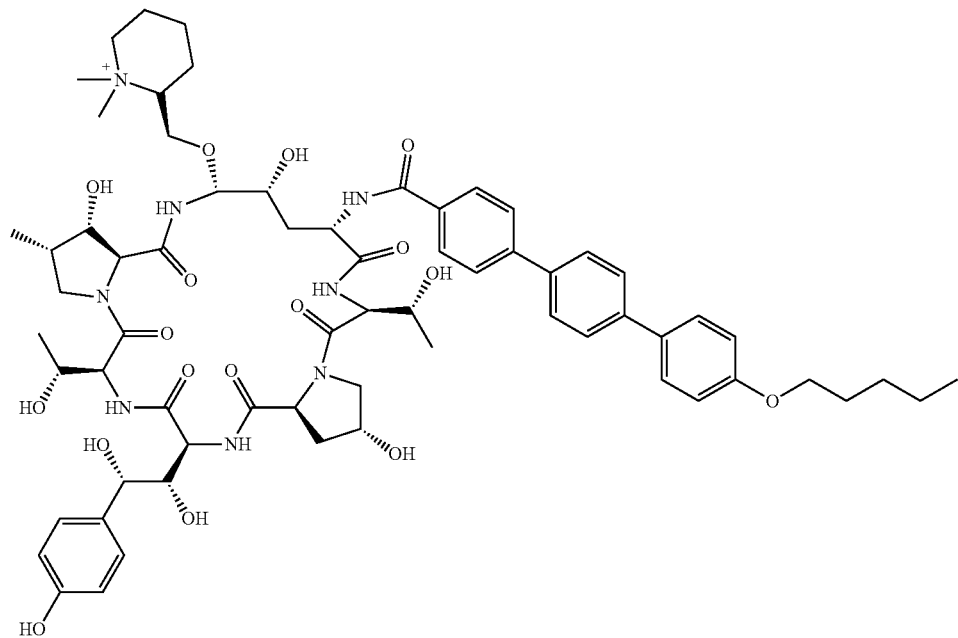
,
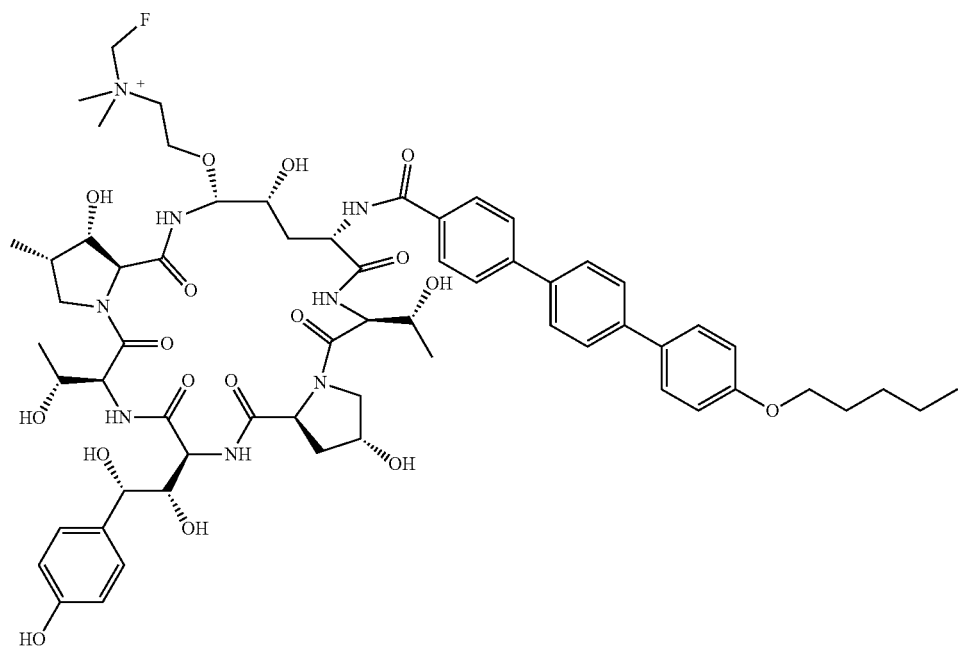

-continued
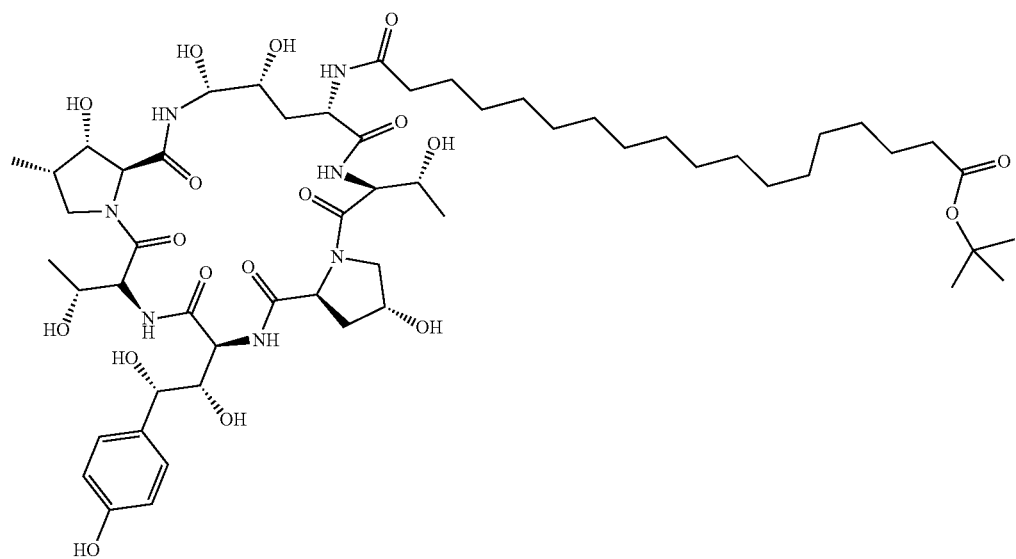
,
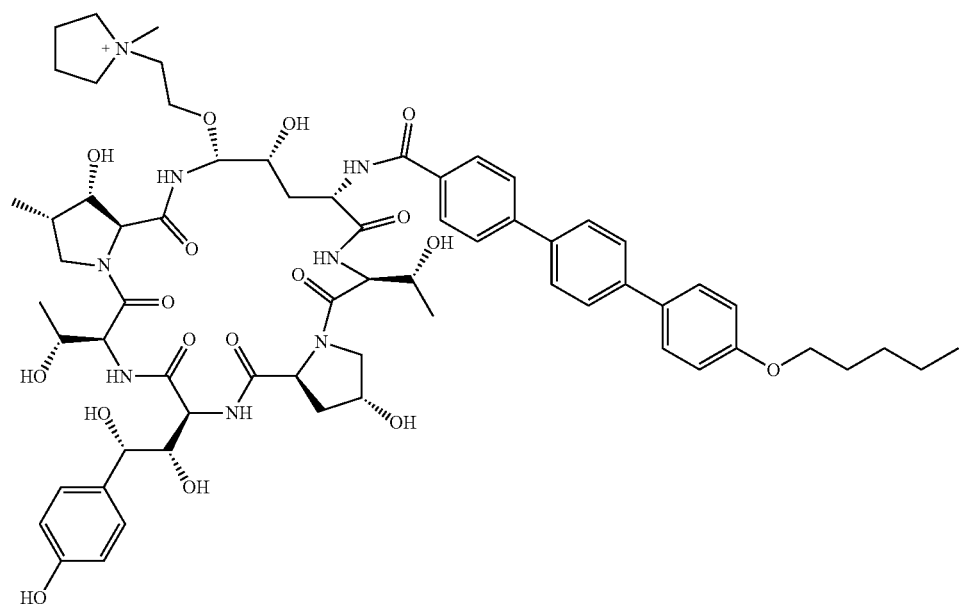
,
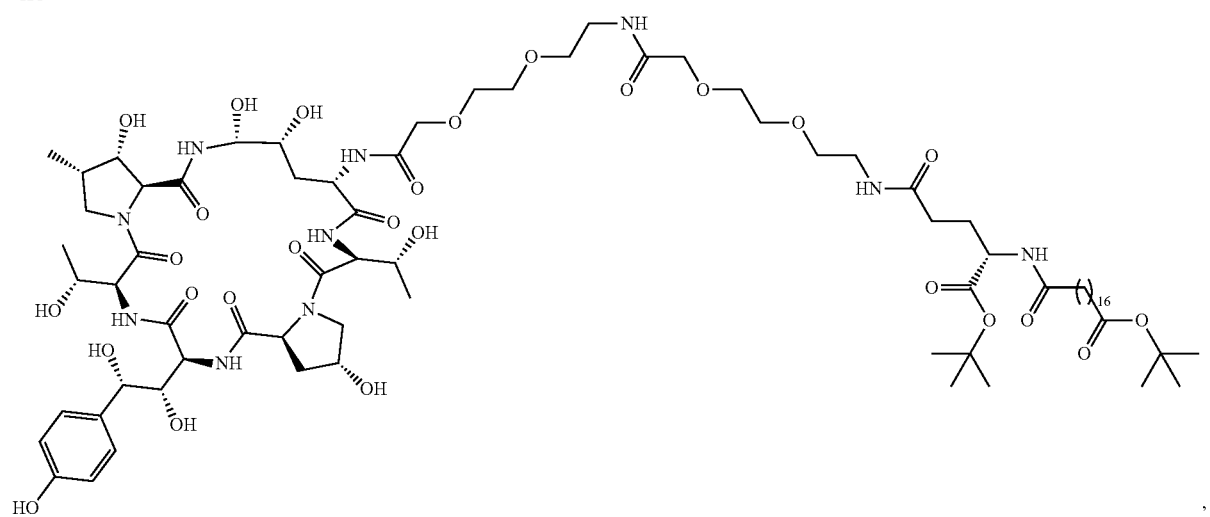

21
22
-continued
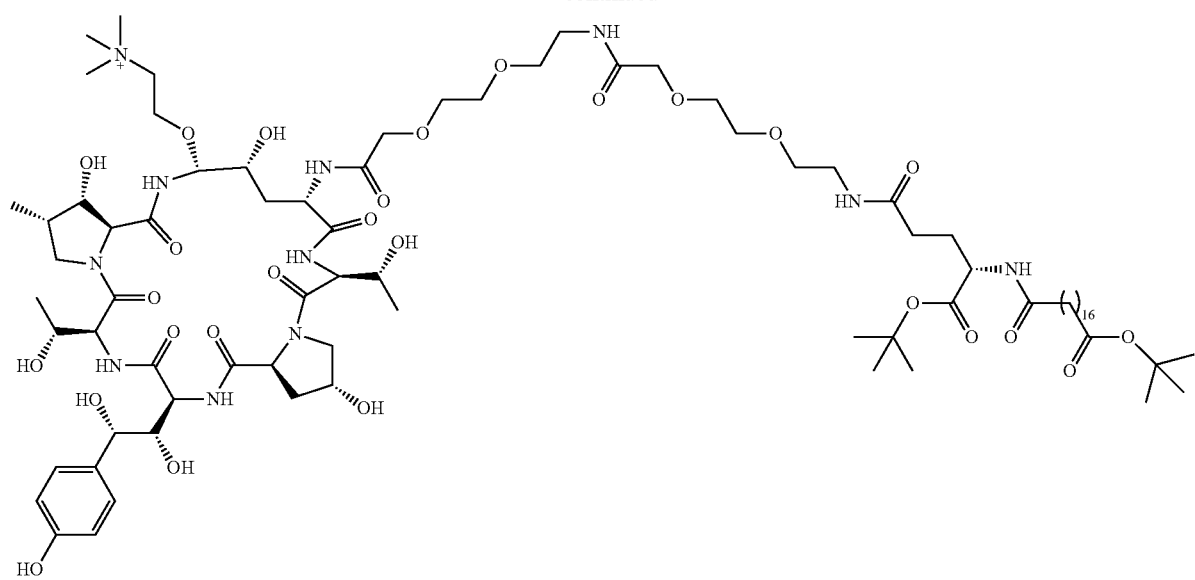
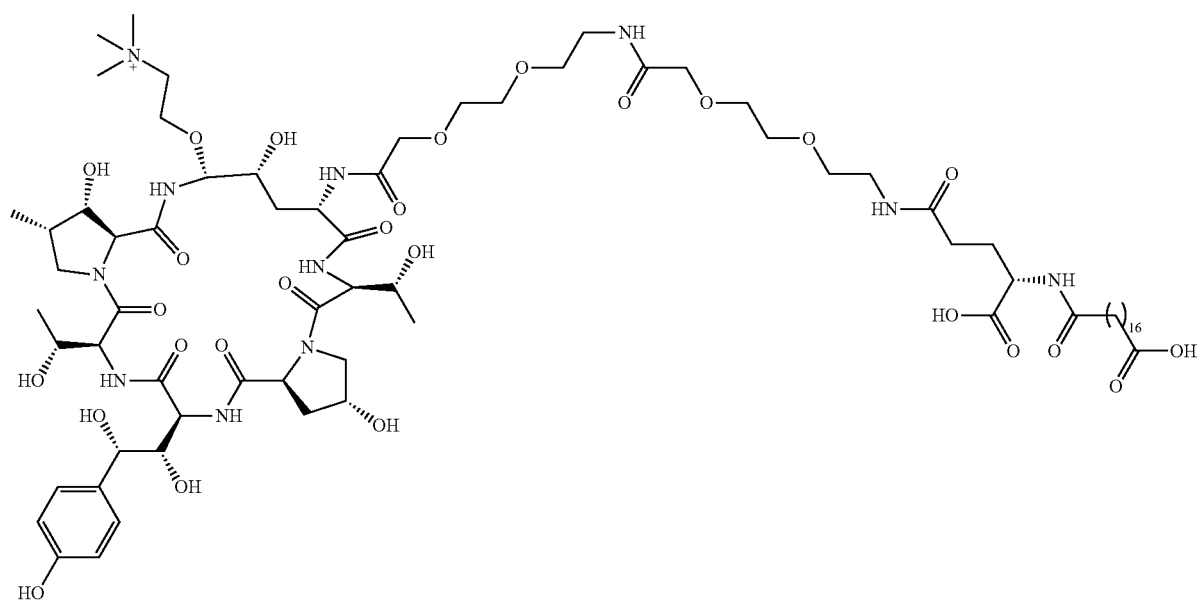

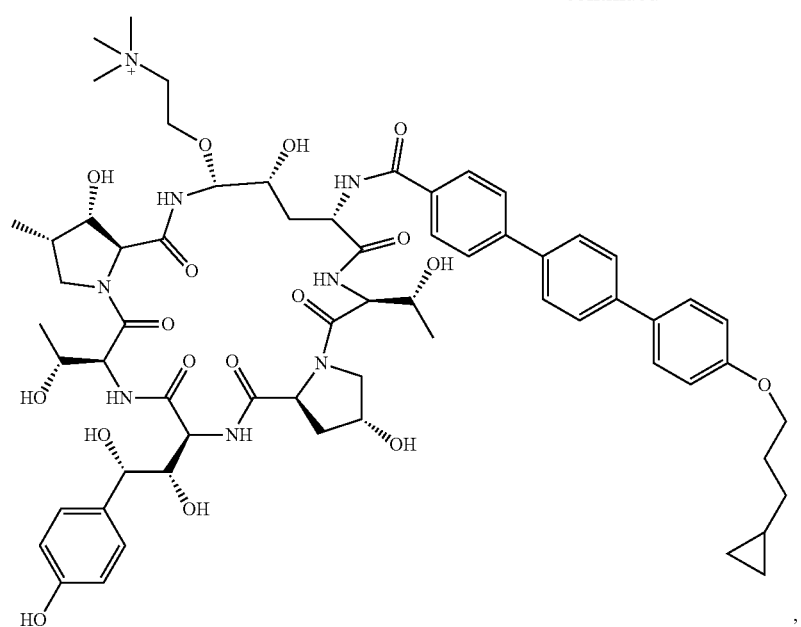
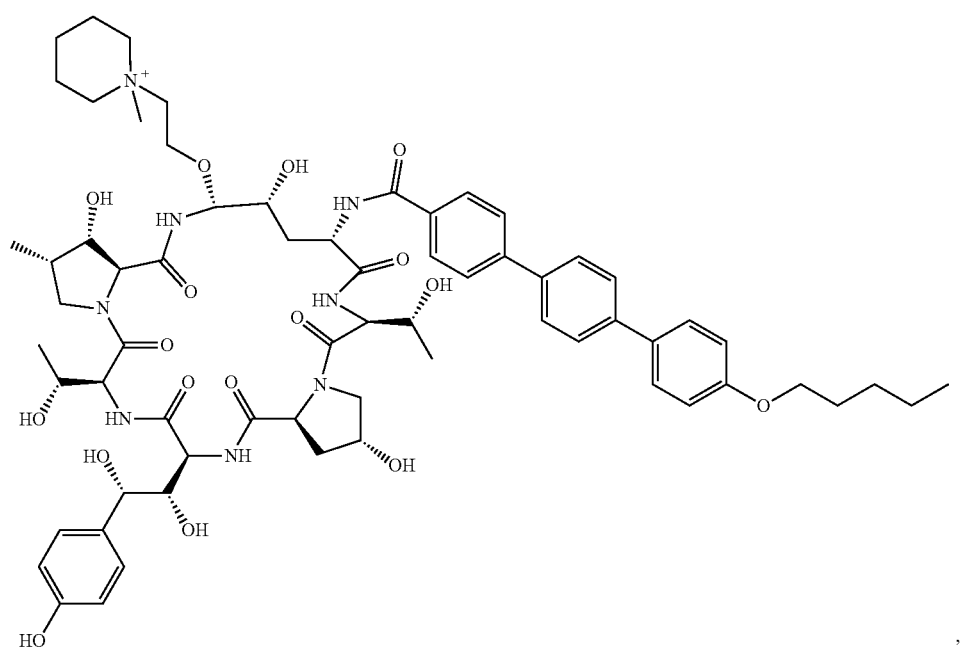

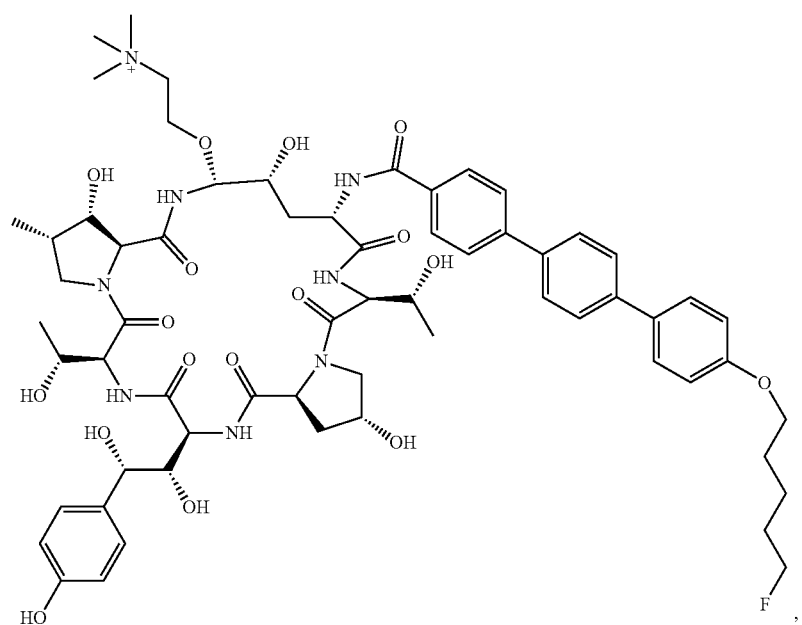
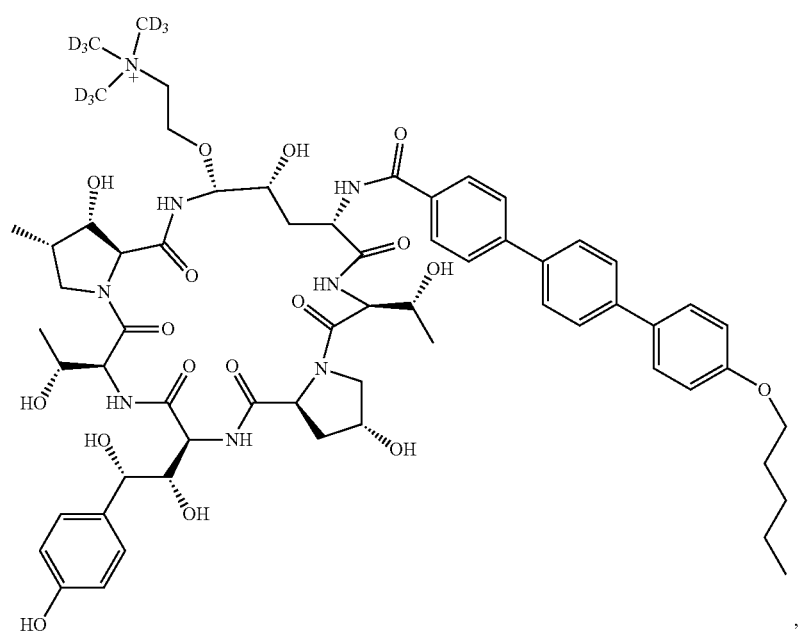

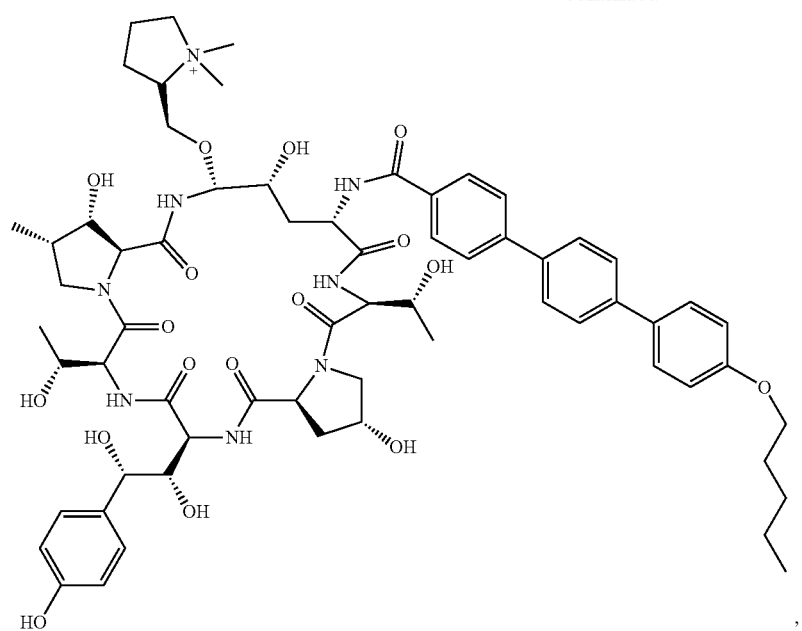
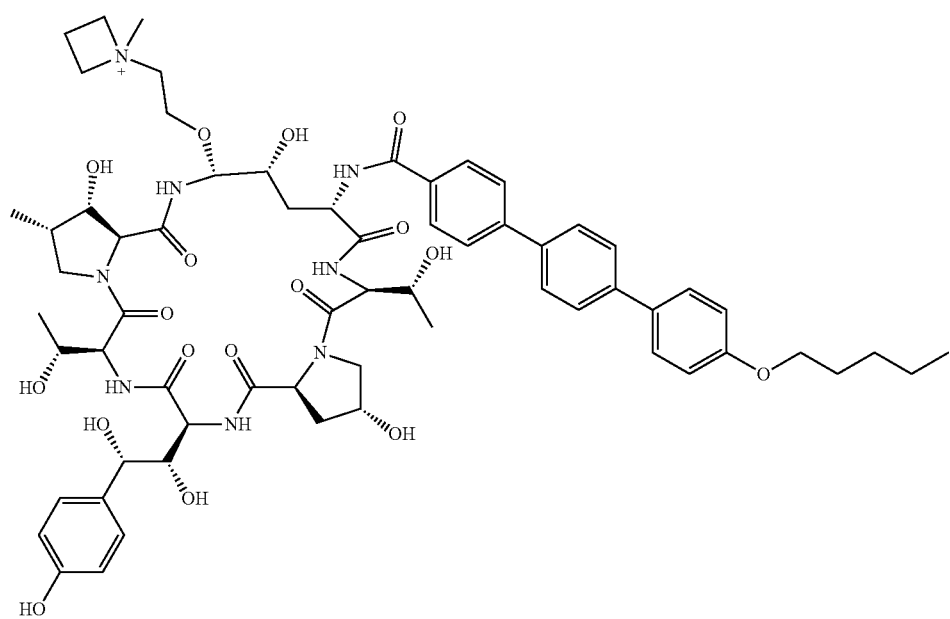

-continued
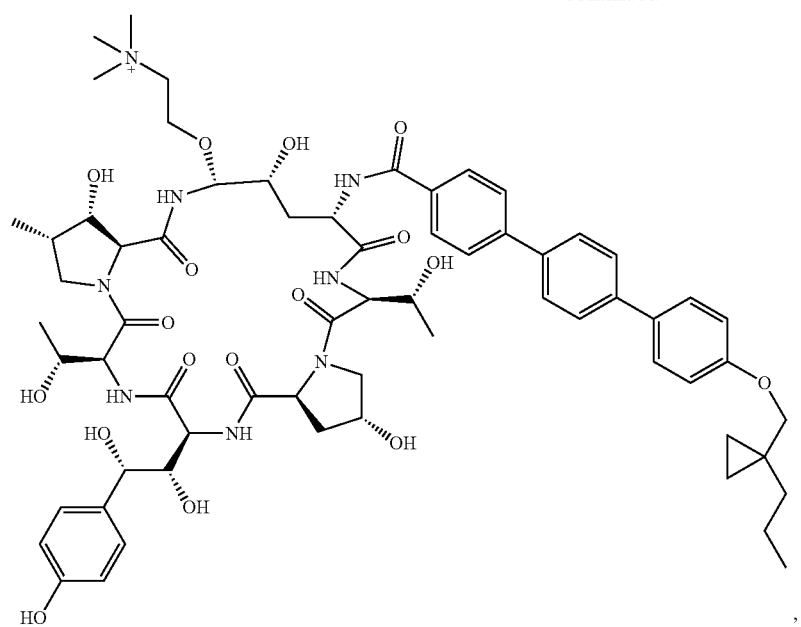
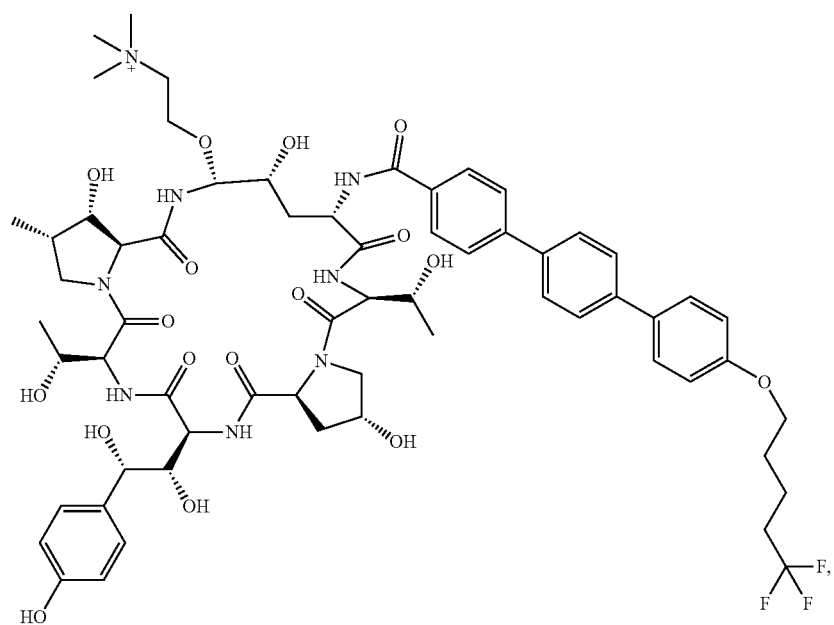

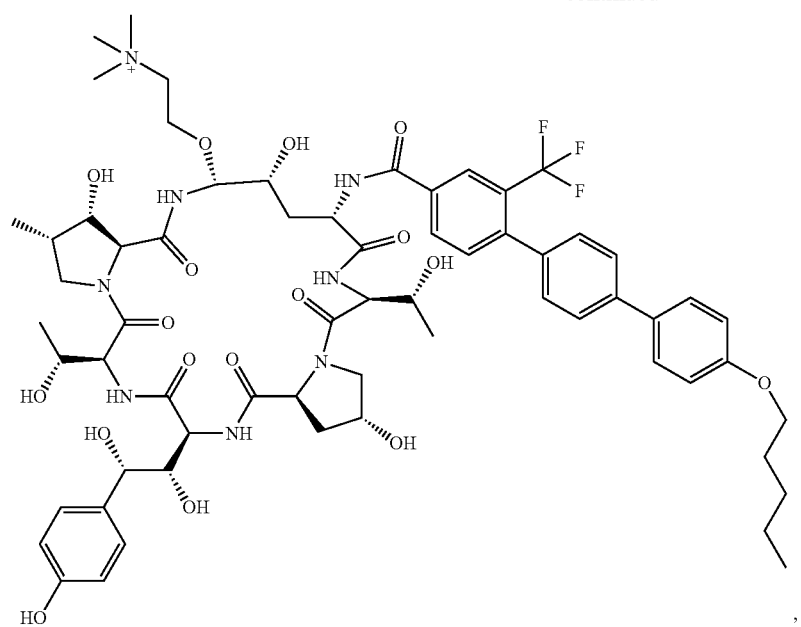
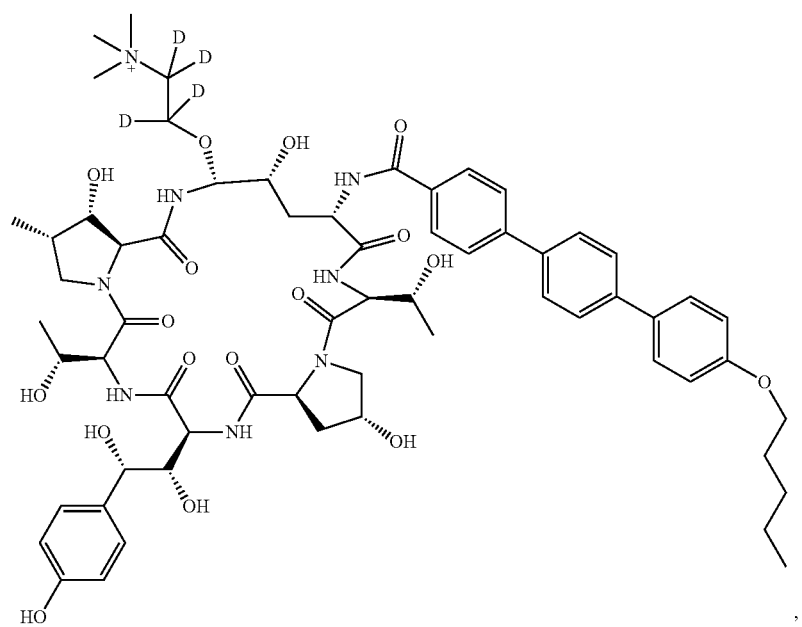

-continued
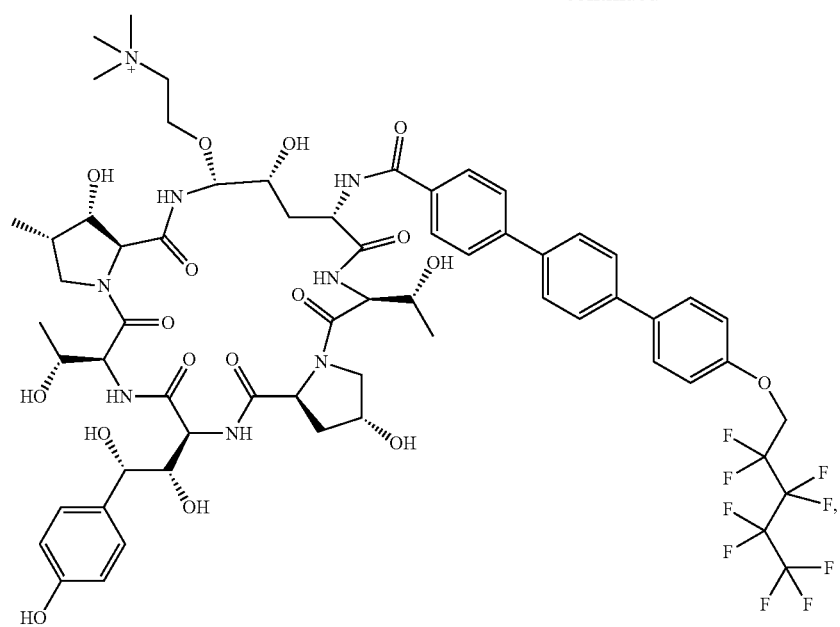
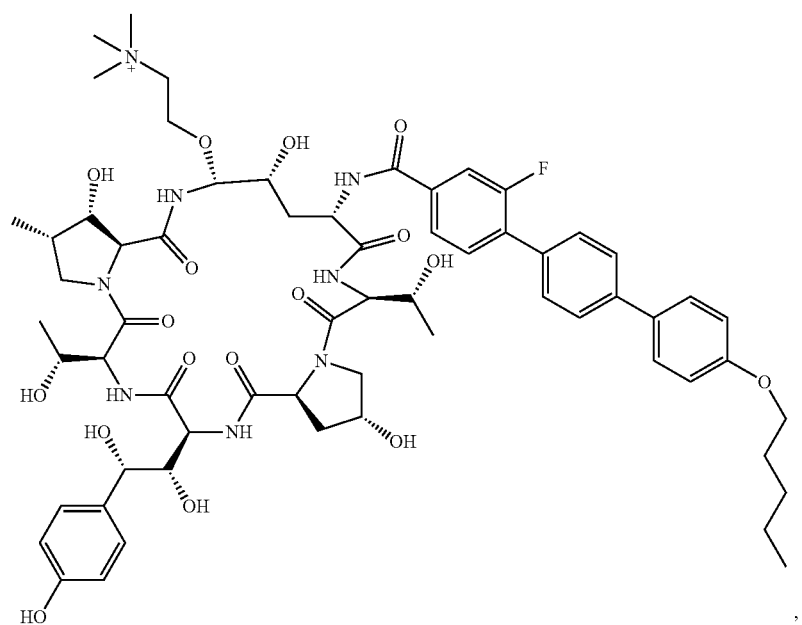

-continued
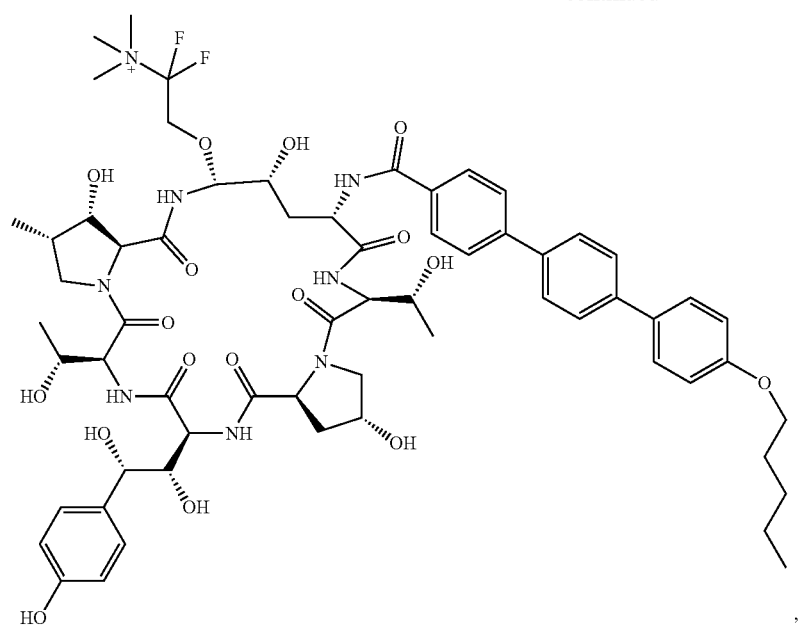
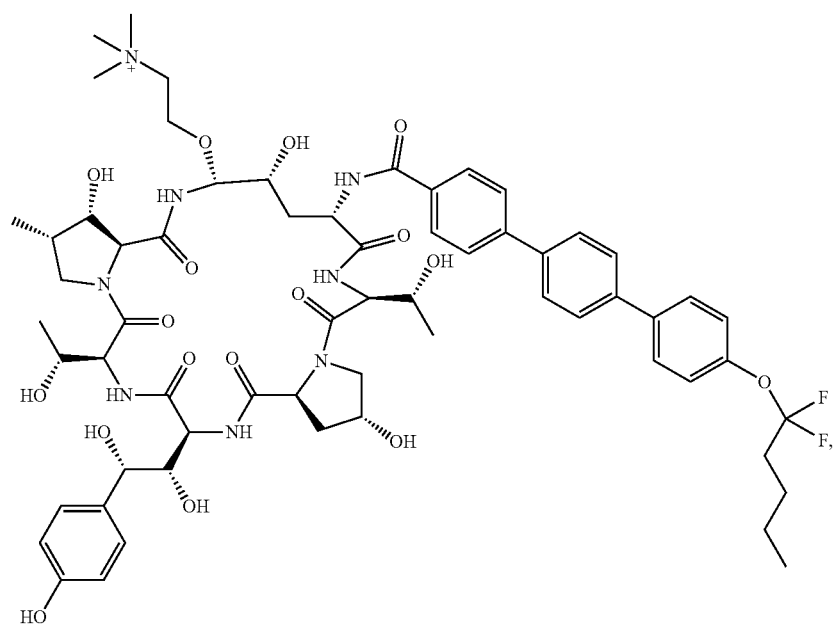

-continued
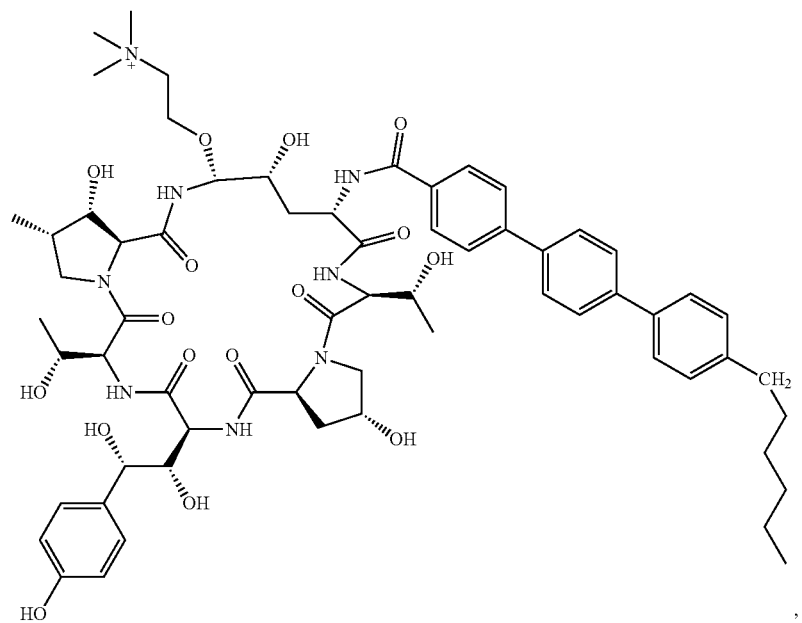
,
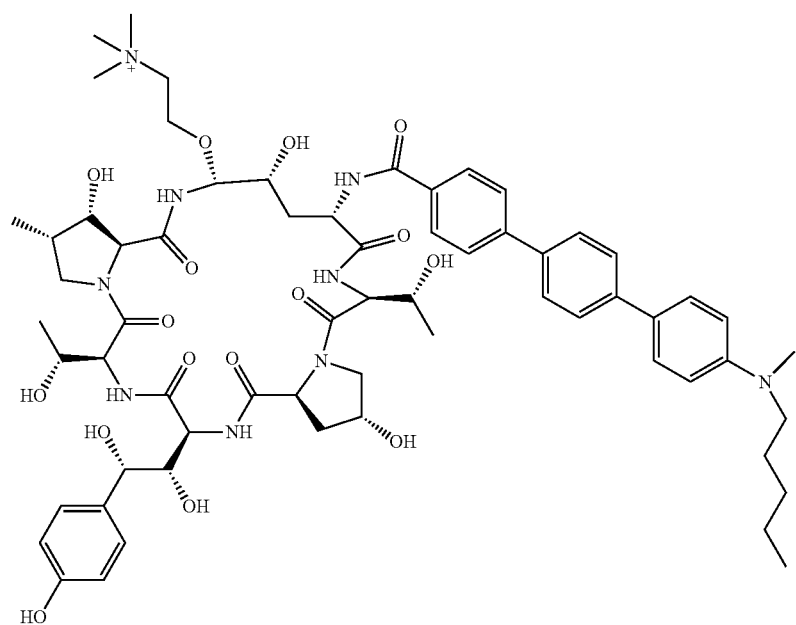
,

-continued
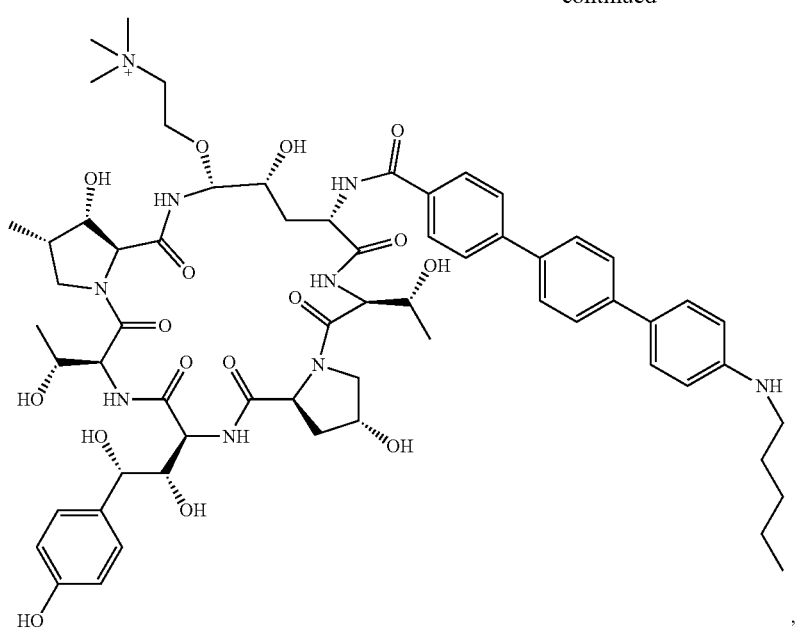
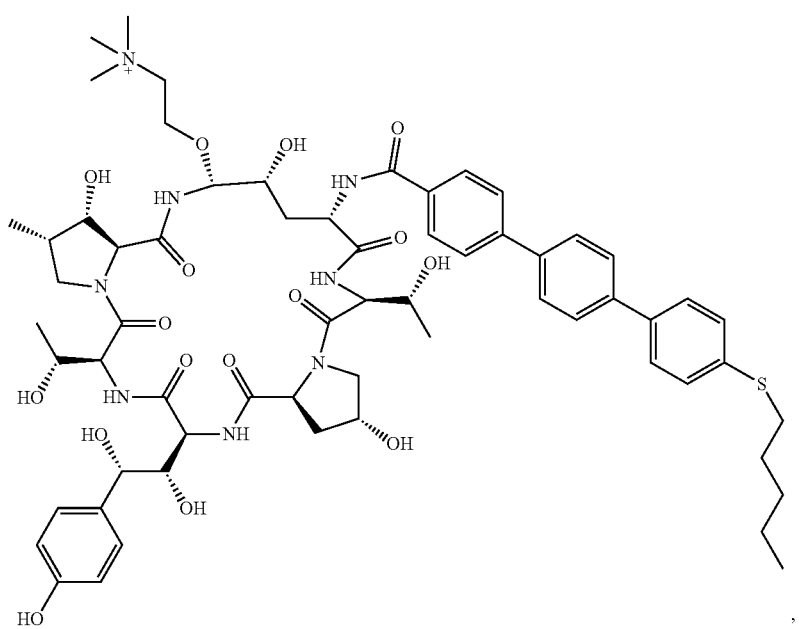

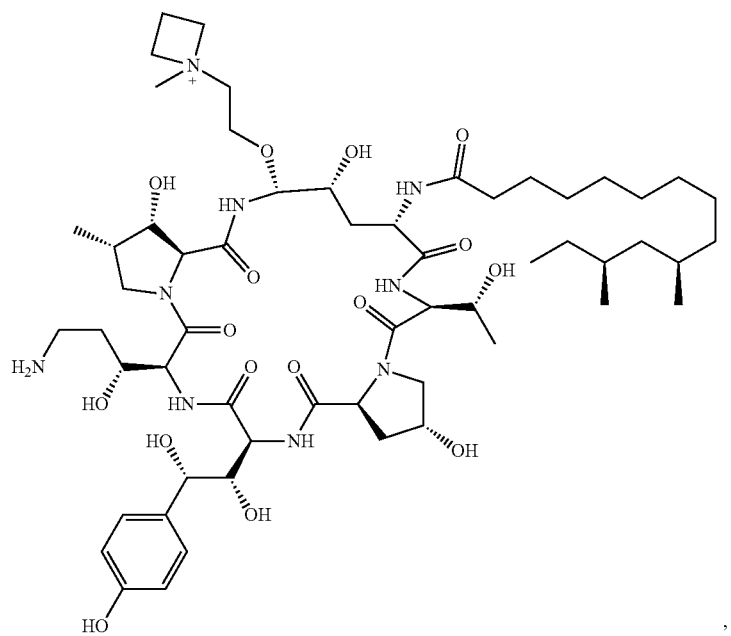
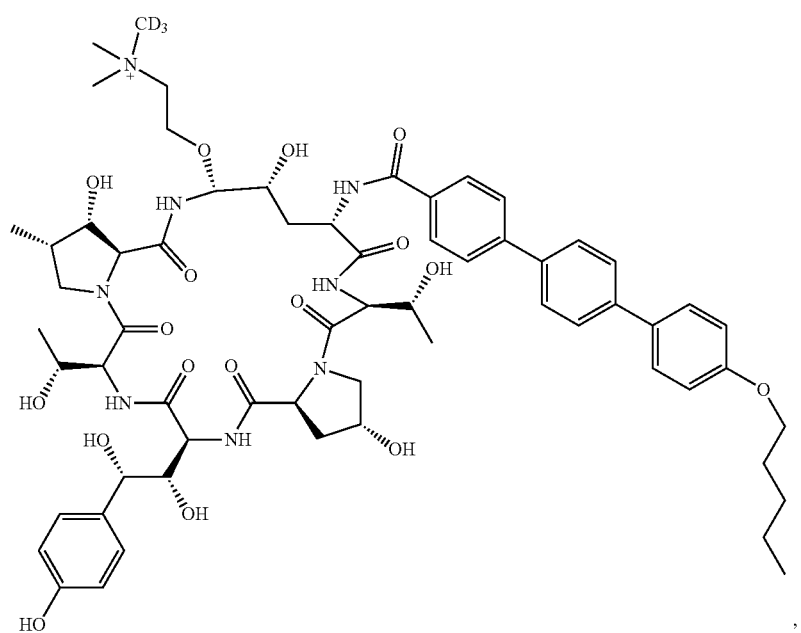

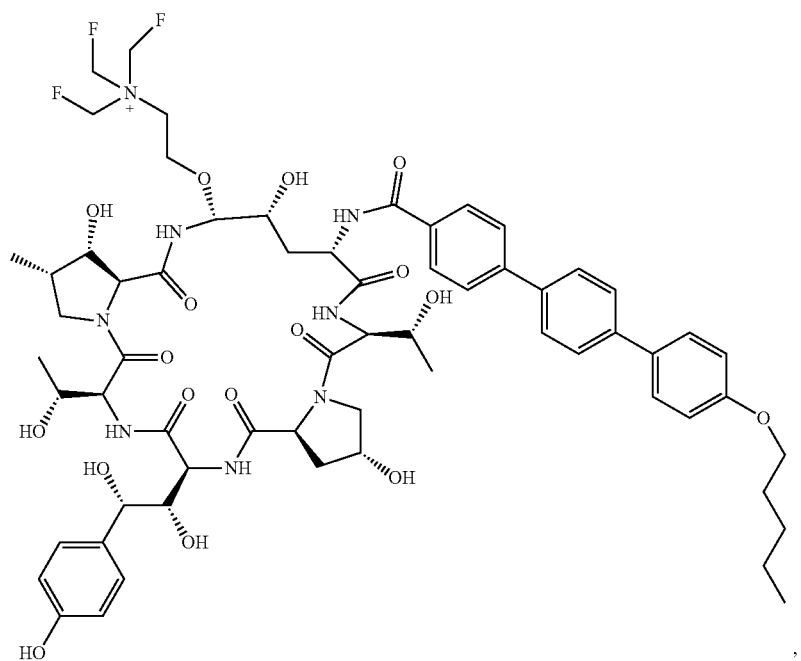
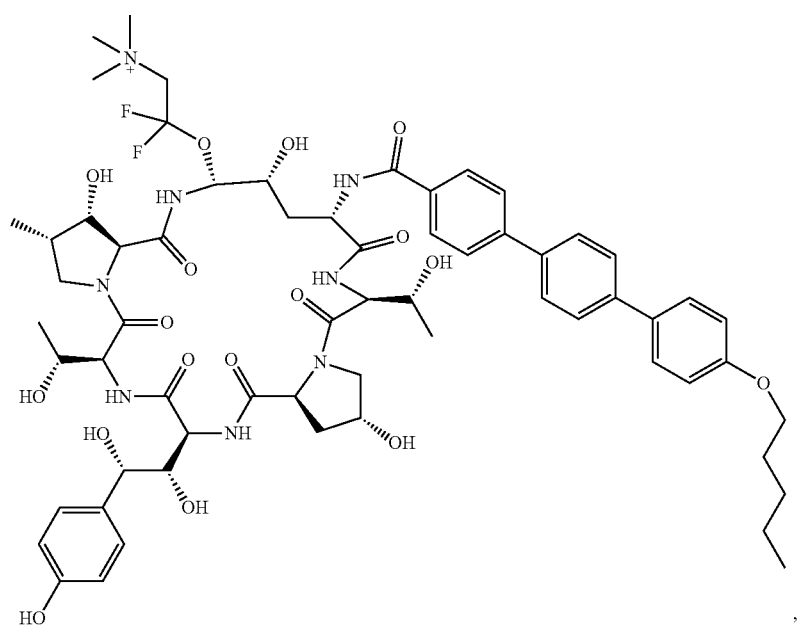

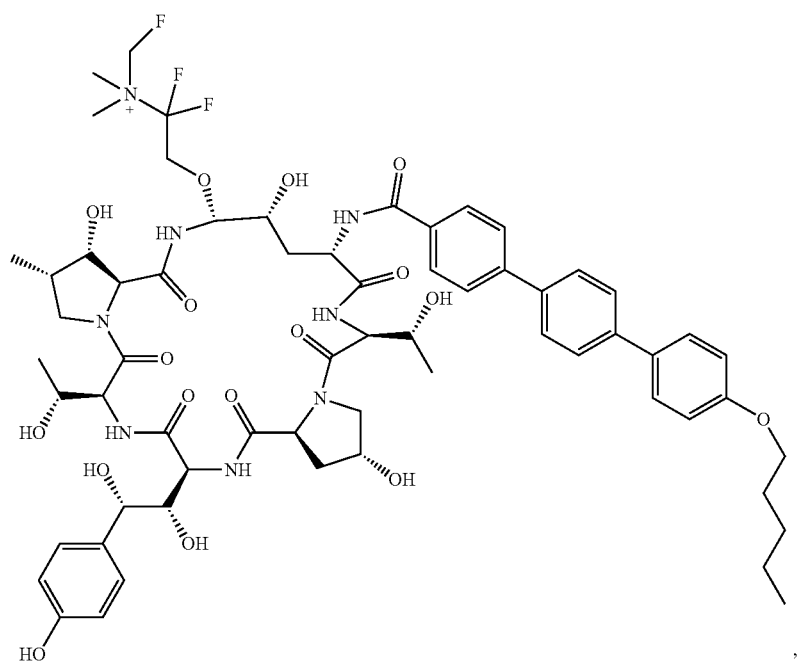
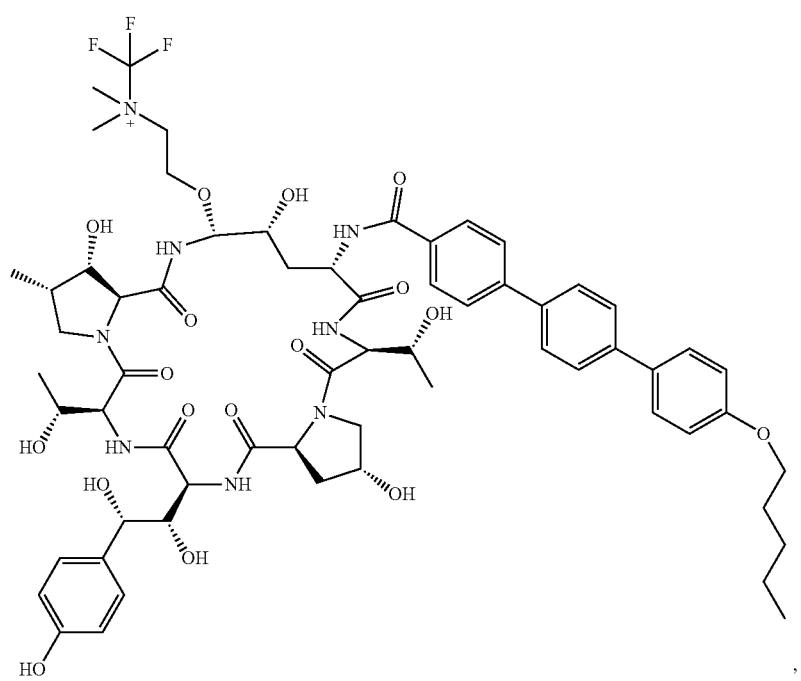

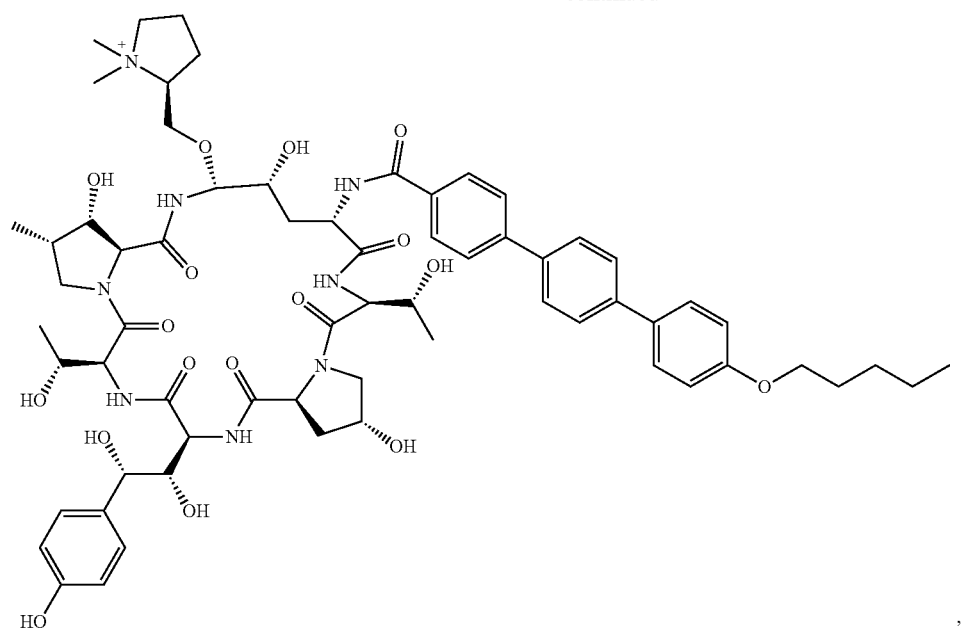
,
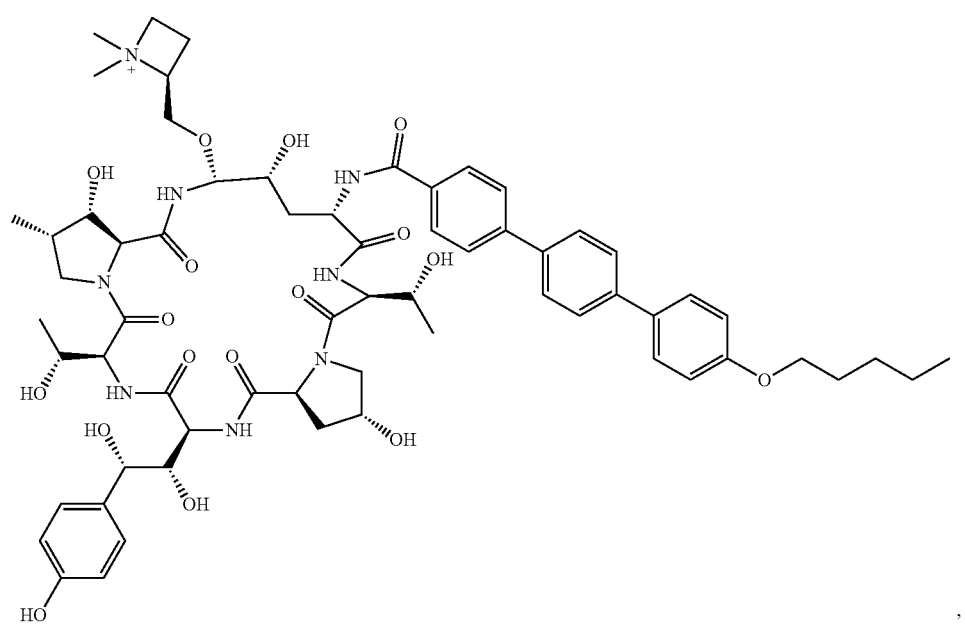
,

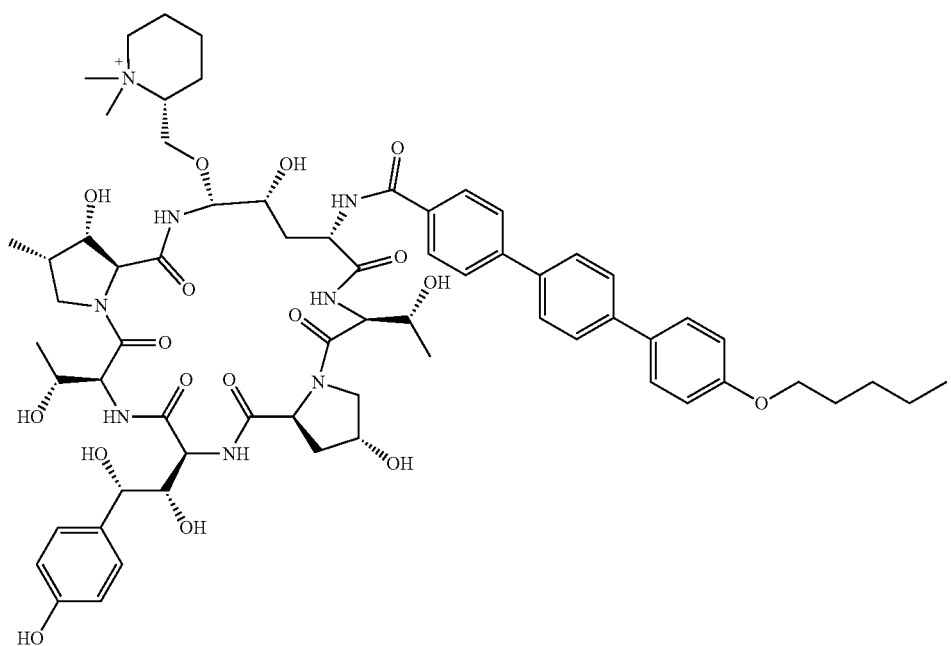
,
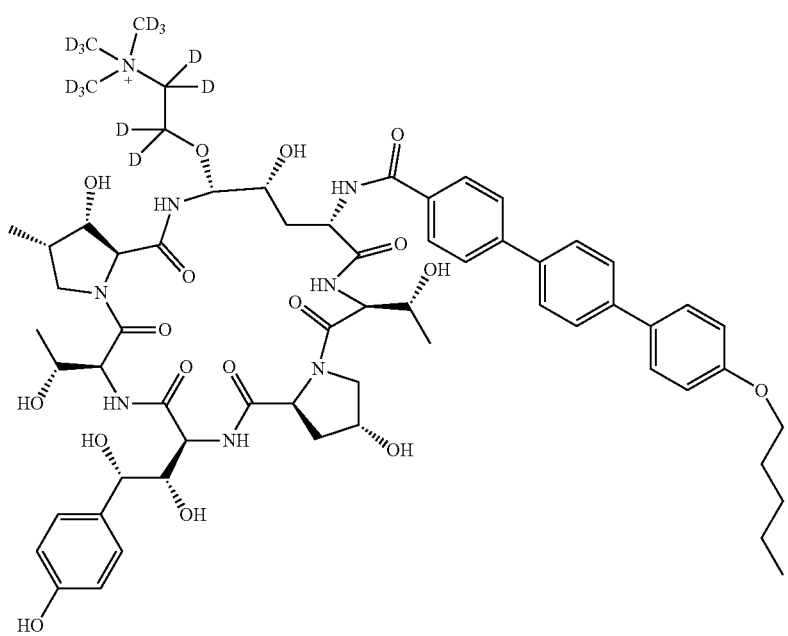
,

-continued
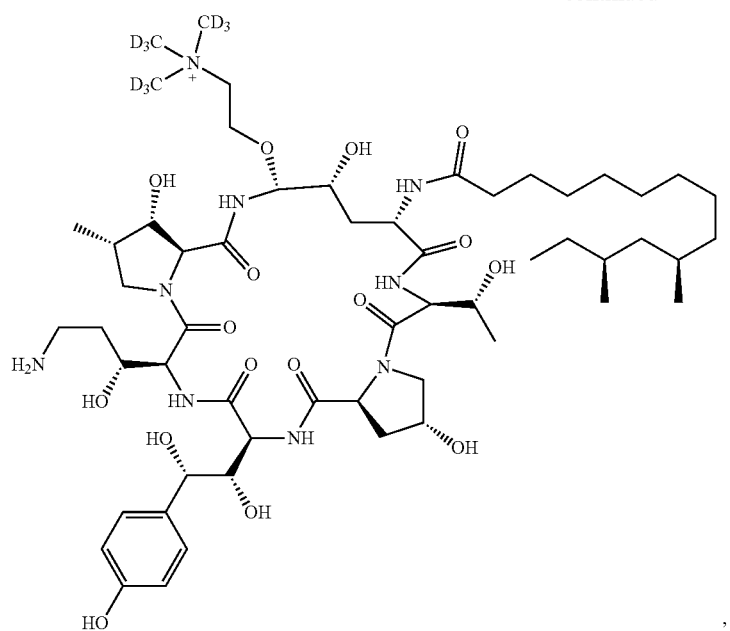
,
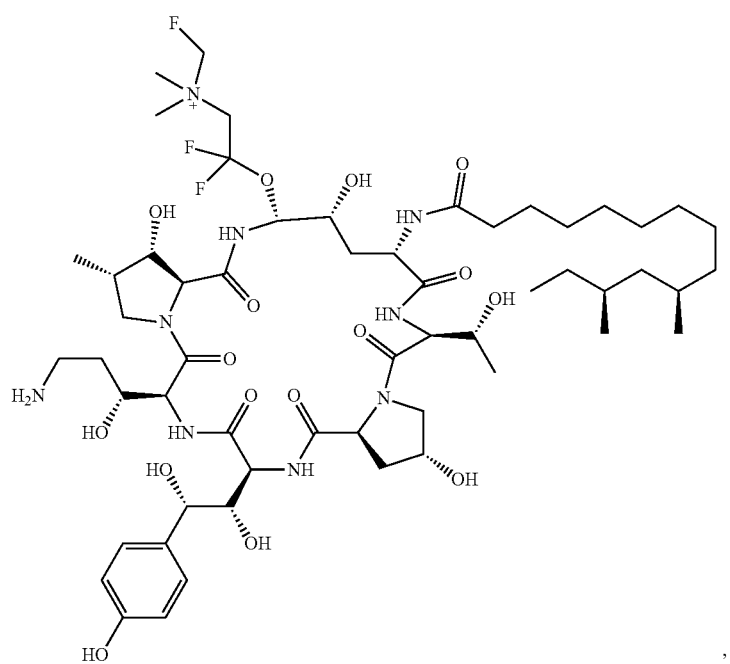
,

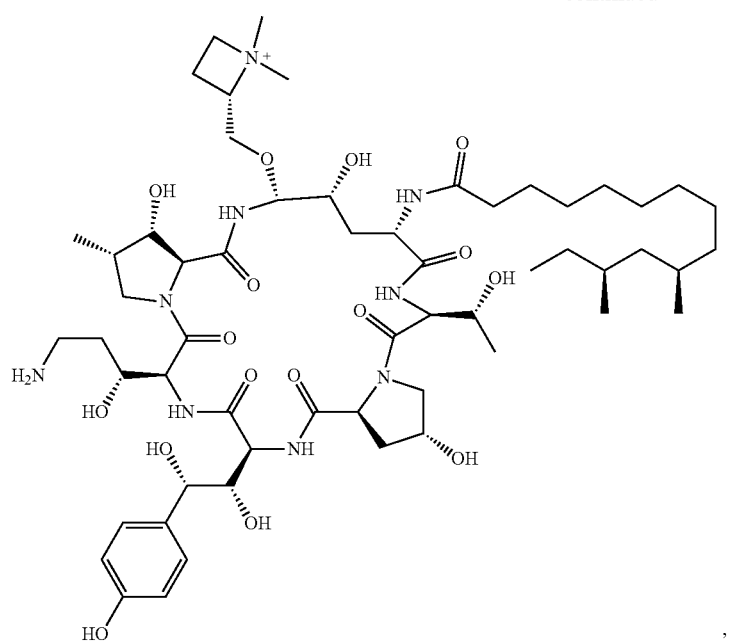
,
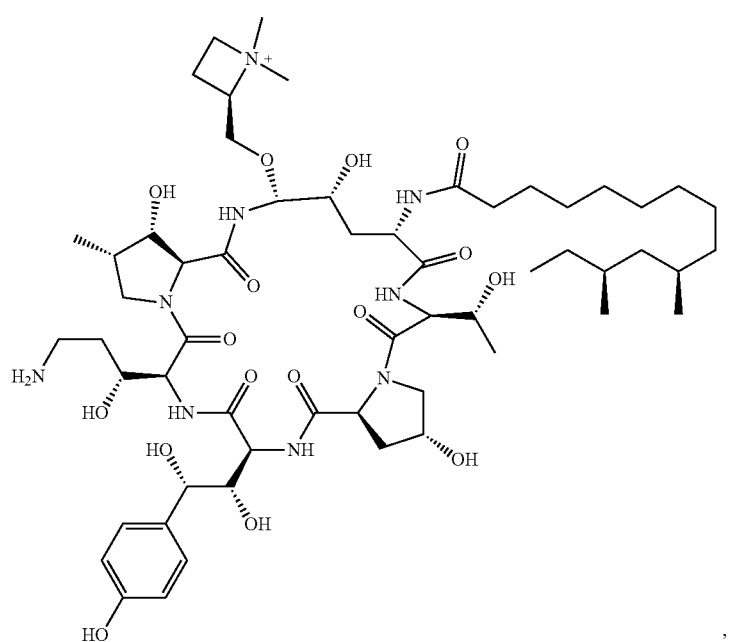
,

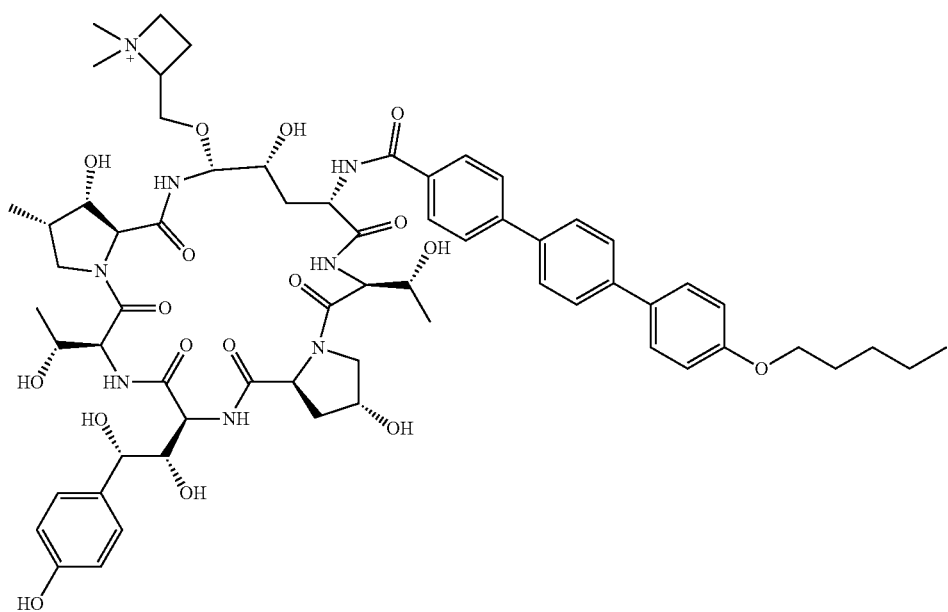
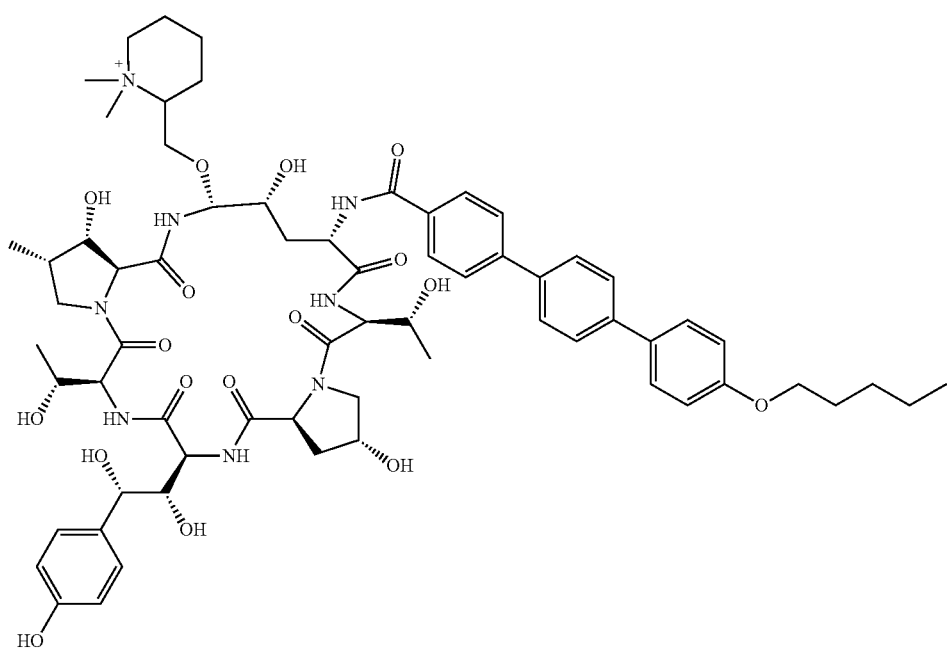

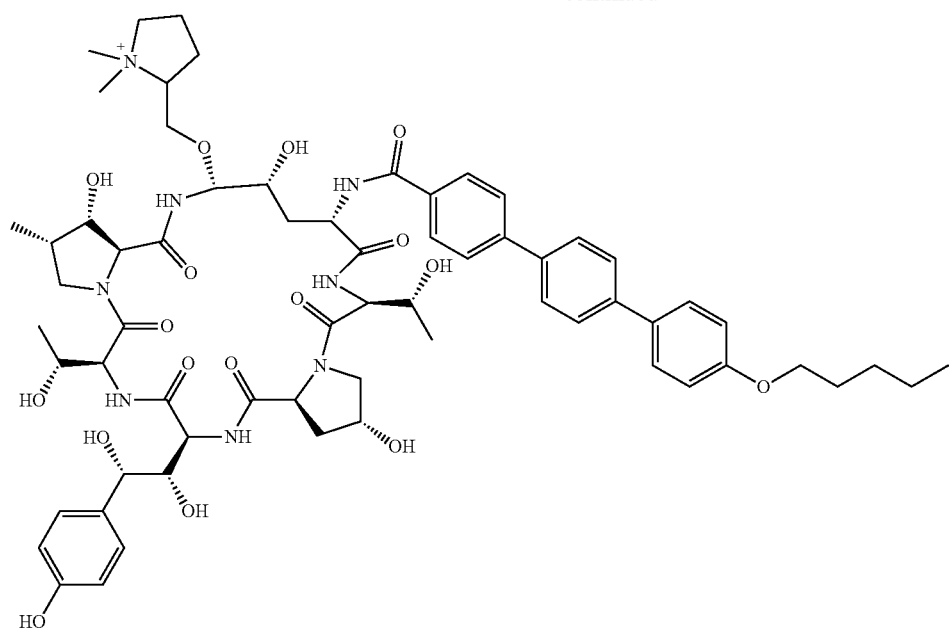
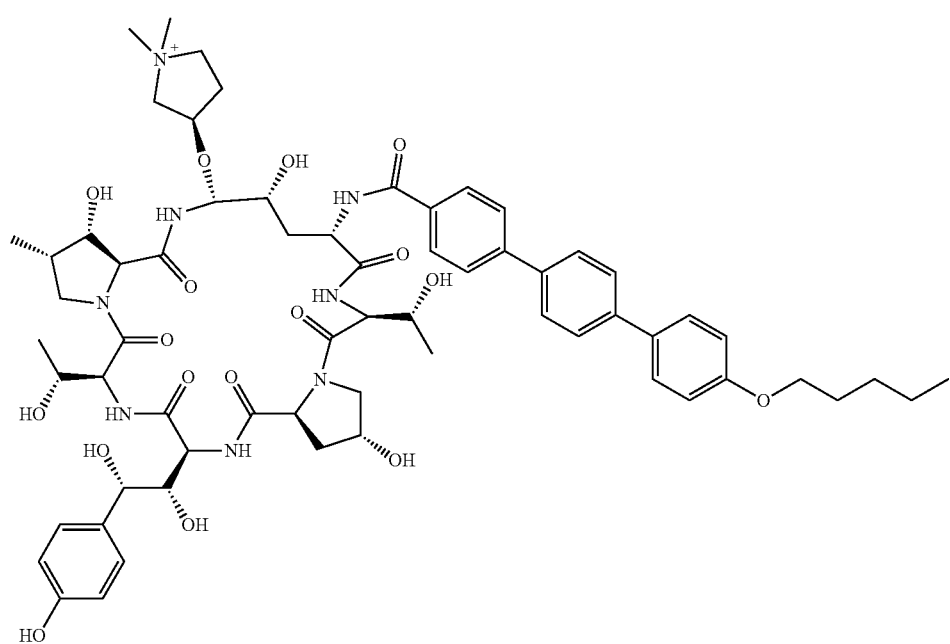

-continued
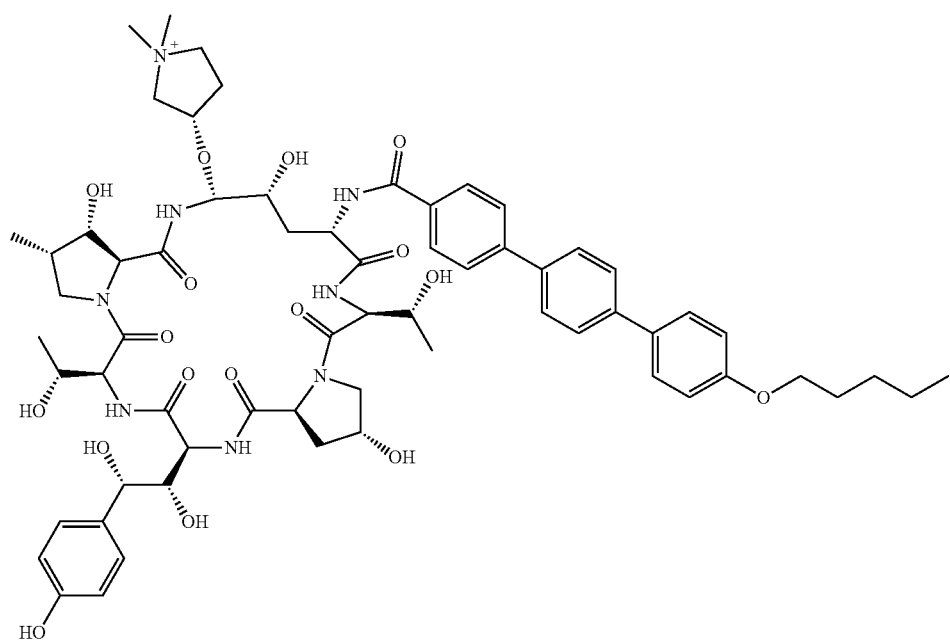
,
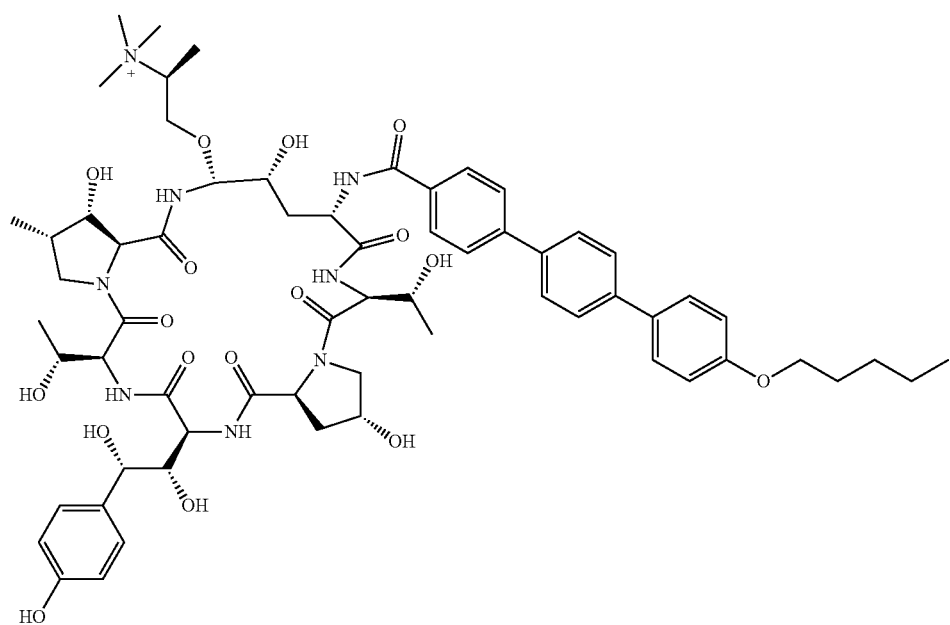
,

-continued
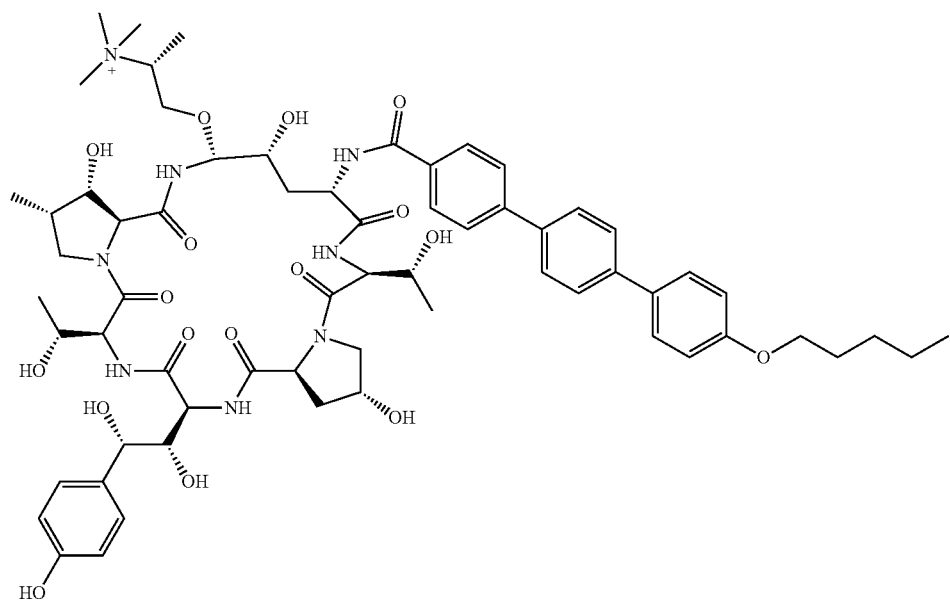
,
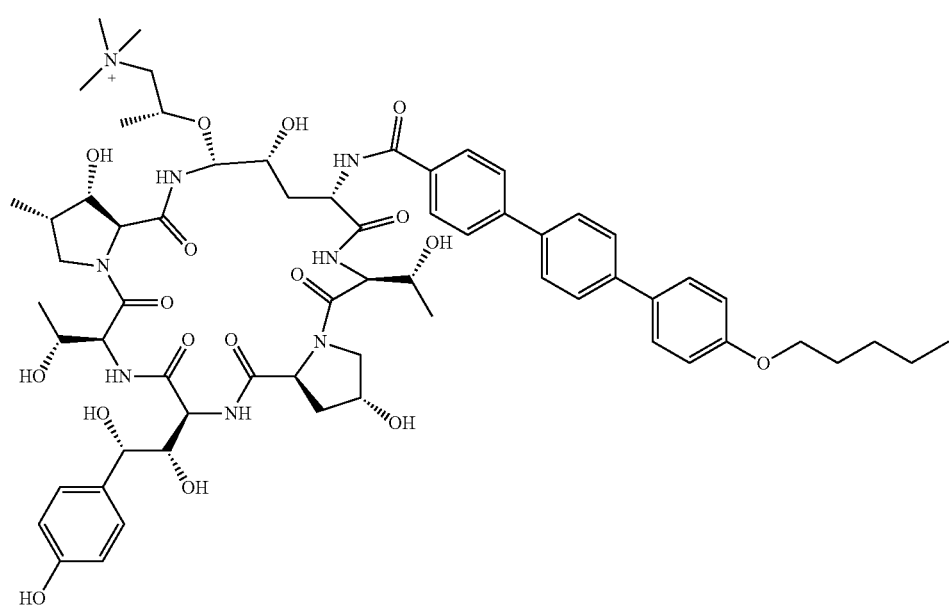
and

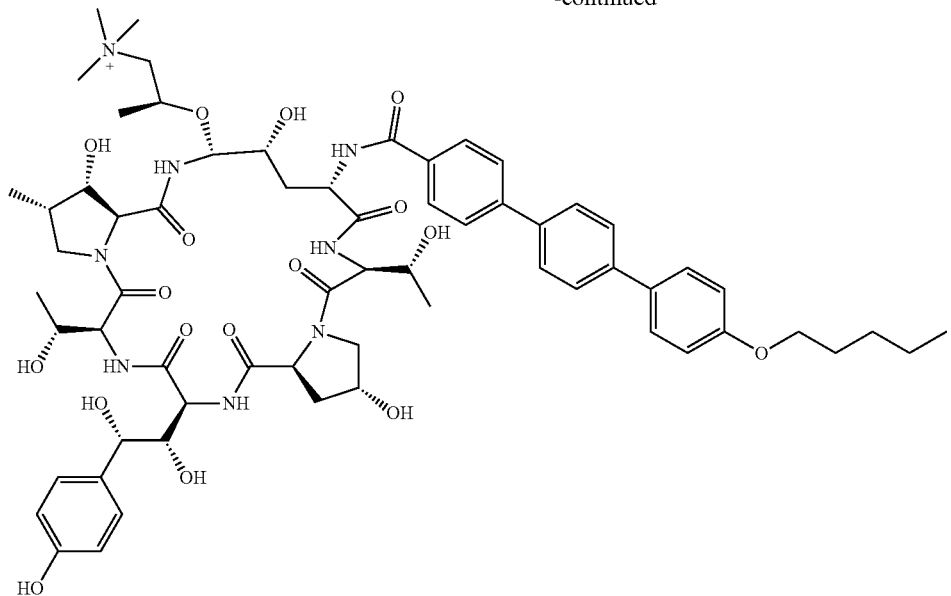

In certain embodiments, the pharmaceutically acceptable salt of the compound is selected from the group consisting of an acetate salt, a trifluoroacetate salt and a formate salt.

The present disclosure also provides a method for preparing the compound or the pharmaceutically acceptable salt thereof.

The present disclosure also provides a pharmaceutical composition comprising the compound or the pharmaceutically acceptable salt thereof, and a pharmaceutically acceptable excipient.

The present disclosure also provides a method for treating a fungal infection in a patient by administering to the patient an amount of the pharmaceutical composition of the present disclosure sufficient to treat the infection. In specific embodiments, the pharmaceutical composition is administered intravenously, topically or orally. The pharmaceutical composition may be administered to treat a bloodstream infection, a tissue infection (e.g., a lung, kidney or liver infection) or other types of infection in a patient. The fungal infection to be treated may be an infection selected from the group consisting of: tinea capitis, tinea corporis, tinea pedis, tinea unguium, perionychomycosis, chromophytosis, thrush, vaginal candidiasis, respiratory candidiasis, biliary tract candidiasis, esophageal candidiasis, urethral candidiasis, systemic candidiasis, mucosal and cutaneous candidiasis, aspergillosis, mucormycosis, paracoccidioidomycosis, North American blastomycosis, histoplasmosis, coccidioidomycosis, sporotrichosis, fungal sinusitis and chronic paranasal sinusitis. In certain embodiments, the infection to be treated is an infection caused by *Candida albicans, C. parapsilosis, C. glabrata, C. guilliermondii, C. krusei, C. lusitaniae, C. tropicalis, Aspergillus fumigatus, A. flavus, A. terreus, A. niger, A. candidus, A. clavatus* or *A. ochraceus.*

The present disclosure also provides a method for preventing a fungal infection in a patient by administering to the patient an amount of the pharmaceutical composition of the present invention sufficient to prevent the infection. For example, the method of the present disclosure may be used for prophylactic treatment in patients who are preparing for invasive medical procedures (e.g., patients who are preparing for surgery, such as transplant, stem-cell therapy, transplant, reconstructive surgery or long-term or frequent intravenous catheterization, or for treatment in intensive care units), in patients who have lowered immunity (e.g., patients who have cancer or HIV/AIDS, or are taking immunosuppressive agents), or in patients who are receiving long-term antibiotic therapy.

In one specific embodiment of the method of the present disclosure, the pharmaceutical composition comprises compound 1, or any other compound described herein, or a pharmaceutically acceptable salt thereof.

The present disclosure also provides a method for preventing, stabilizing or inhibiting the growth of fungi or killing fungi by contacting the fungi or a site favoring the growth of fungi with the compound of the present invention or the pharmaceutically acceptable salt thereof.

The term "sufficient amount" refers to an amount of drug required for treating or preventing an infection. The sufficient amount for implementing the present disclosure to therapeutically or prophylactically treat a condition caused or contributed to by an infection varies depending on the route of administration, the type of the infection, and the age, weight and general health of the patient.

By "fungal infection" is meant that pathogenic fungi affect the host. For example, an infection may include the overgrowth of fungi that are normally found in a patient or on the patient's skin, or the growth of fungi that are not normally found in a patient or on the patient's skin. More generally, a fungal infection may be any case in which the presence of a fungal population is detrimental to the host organism. Thus, a patient is "afflicted" with a fungal infection when an excess of the fungal population is present in the patient or on the patient's skin, or when the fungal population is causing damage to the patient's cells or other tissues.

The term "treatment" refers to the administration of a pharmaceutical composition for prophylactic and/or therapeutic purposes. By "preventing a disease" is meant prophylactically treating a subject who has not yet developed a disease but is susceptible to, or is at risk of developing, a specific disease. By "treating a disease" is meant treating a patient who is suffering from a disease to improve or stabilize the patient's condition.

The present disclosure also provides use of the compound or the pharmaceutically acceptable salt thereof in preparing a medicament for treating fungal infections.

The present disclosure also provides use of the compound or the pharmaceutically acceptable salt thereof in preparing a medicament for preventing fungal infections.

The present disclosure also provides use of the compound or the pharmaceutically acceptable salt thereof in preparing a medicament for preventing, stabilizing or inhibiting the growth of fungi or killing fungi. In some embodiments, the use comprises contacting the fungi or a part favoring the growth of fungi with the compound or the pharmaceutically acceptable salt or isomer thereof.

The compounds of the present disclosure may be synthesized, for example, by reacting echinocandin compounds with appropriate acyl, alkyl, carboxyl, hydroxy and/or amino groups under standard reaction conditions, as described in the examples.

For the semi-synthetic route to the disclosed compounds, the stereochemistry of the compounds will be determined by the starting materials. Thus, the non-natural echinocandin derivatives will typically be identical in stereochemistry to the naturally occurring echinocandin structures from which they are derived (representative stereochemistry is described in the examples).

The compounds of the present disclosure can be synthesized, for example, using the methods described in the examples.

Unless otherwise stated, the following terms used in the specification and claims have the following meanings.

"Alkyl" refers to a linear or branched alkane group containing preferably 1 to 10 carbon atoms, more preferably 1 to 6 carbon atoms; non-limiting examples include methyl, ethyl, n-propyl, isopropyl, n-butyl, sec-butyl, tert-butyl, pentyl, hexyl, heptyl, octyl, nonyl, decyl, etc. Unless otherwise specifically indicated in the specification, alkyl may be optionally substituted with one or more of the following substituents: halogen, cyano, nitro, oxo, thio, trimethylsilyl, etc. Unless otherwise stated, "lower alkyl" refers to a linear or branched alkane group containing 1 to 10 carbon atoms; non-limiting examples include methyl, ethyl, n-propyl, isopropyl, n-butyl, sec-butyl, tert-butyl, pentyl, hexyl, heptyl, octyl, nonyl, decyl, etc. Unless otherwise specifically indicated in the specification, lower alkyl may be optionally substituted with one or more of the following substituents: halogen, cyano, nitro, oxo, thio, trimethylsilyl, etc.

"Alkenyl" refers to an alkyl compound containing carbon-carbon double bonds in the molecule, wherein the alkyl is as defined above. Non-limiting examples include vinyl, 1-propen-2-yl, 1-buten-4-yl, 1-penten-5-yl, 1-buten-1-yl, etc. Unless otherwise indicated in the specification, alkenyl may be optionally substituted with one or more of the following substituents: halogen, cyano, nitro, oxo, thio, trimethylsilyl, etc.

"Alkynyl" refers to an alkyl compound containing carbon-carbon triple bonds in the molecule, wherein the alkyl is as defined above. Non-limiting examples include ethynyl, propynyl, pentynyl, butynyl, etc. Unless otherwise indicated in the specification, alkynyl may be optionally substituted with one or more of the following substituents: halogen, cyano, nitro, oxo, thio, trimethylsilyl, etc.

"$C_{10-36}$ lipophilic unit" refers to substituted or unsubstituted alkyl, substituted or unsubstituted alkenyl, substituted or unsubstituted alkynyl, substituted or unsubstituted cyclohydrocarbyl, substituted or unsubstituted aryl, substituted or unsubstituted heteroaryl, substituted or unsubstituted heterocyclyl, etc., containing 10-36 carbon atoms.

"Aryl" refers to a hydrocarbon ring system group containing hydrogen atoms, 6 to 14 carbon atoms and at least one aromatic ring. It may be a monocyclic, bicyclic or tricyclic ring system, and may include a spiro ring system. Aryl groups include, but are not limited to, those derived from acenaphthene, anthracene, azulene, benzene, 6,7,8,9-tetrahydro-5H-benzo[7]annulene, fluorene, indene, naphthalene, phenalene and phenanthrene. Unless otherwise specifically indicated in the specification, aryl may be optionally substituted with one or more substituents independently selected from the group consisting of alkyl, alkenyl, alkynyl, halogen, haloalkyl, haloalkenyl, haloalkynyl, cyano, nitro, etc.

"Cyclohydrocarbyl" refers to a stable non-aromatic monocyclic or polycyclic hydrocarbyl group consisting of carbon and hydrogen atoms only, which may comprise a spiro or bridged ring system, and contains 3 to 15 carbon atoms, 3 to 10 carbon atoms or 5 to 7 carbon atoms; it is saturated or unsaturated, and is linked to the remainder of the molecule by a single bond. Monocyclic cyclohydrocarbyl groups include non-bridged cyclohydrocarbyl groups such as cyclopropyl, cyclobutyl, cyclopentyl, cyclohexyl, cycloheptyl and cyclooctyl. Polycyclic groups include fused, spiro, or bridged cyclohydrocarbyl groups, for example, C10 groups such as adamantyl (bridged) and decalinyl (fused), and C7 groups such as bicyclo[3.2.0]heptyl (fused), norbornyl and norbornenyl (bridged); and substituted polycyclic groups, for example, substituted C7 groups such as 7,7-dimethylbicyclo[2.2.1]heptyl (bridged). Unless otherwise specifically indicated in the specification, cyclohydrocarbyl may be optionally substituted with one or more substituents independently selected from the group consisting of alkyl, alkenyl, alkynyl, halogen, haloalkyl, haloalkenyl, haloalkynyl, oxo, thio, cyano, nitro, etc.

"Cycloalkyl" refers to a saturated monocyclic or polycyclic hydrocarbon substituent containing 3 to 15 carbon atoms, 3 to 10 carbon atoms or 5 to 7 carbon atoms. Non-limiting examples of monocyclic cycloalkyl include cyclopropyl, cyclobutyl, cyclopentyl, cyclohexyl, cycloheptyl, cyclooctyl, etc.; polycyclic cycloalkyl groups include spiro, fused and bridged cycloalkyl groups.

"Halogen" refers to bromine, chlorine, fluorine or iodine.

"Heterocyclyl" refers to a stable 3- to 18-membered non-aromatic ring group containing 1 to 12 carbon atoms and 1 to 6 heteroatoms selected from the group consisting of nitrogen, oxygen and sulfur. Unless otherwise specifically indicated in the specification, heterocyclyl may be a monocyclic, bicyclic, tricyclic or tetracyclic system, and may include spiro or bridged ring systems; the nitrogen, carbon or sulfur atoms in heterocyclyl may optionally be oxidized; the nitrogen atoms may optionally be quaternized; and heterocyclyl may be partially or fully saturated. Unless otherwise specifically indicated in the specification, heterocyclyl groups include those that are optionally substituted with one or more substituents selected from the group consisting of alkyl, alkenyl, alkynyl, halogen, haloalkyl, haloalkenyl, haloalkynyl, oxo, thio, cyano, nitro, etc.

"Heteroaryl" refers to a 5- to 14-membered ring system group containing hydrogen atoms, 1 to 13 carbon atoms, 1 to 6 heteroatoms selected from the group consisting of nitrogen, oxygen and sulfur, and at least one aromatic ring. Heteroaryl may be a monocyclic, bicyclic, tricyclic or tetracyclic system, and may include spiro ring systems; the nitrogen, carbon or sulfur atoms in heteroaryl may optionally be oxidized; and the nitrogen atoms may optionally be quaternized. The aromatic ring of heteroaryl does not necessarily contain heteroatoms, provided that one ring of heteroaryl contains heteroatoms. For example, 1,2,3,4-tetrahydroisoquinolin-7-yl is considered a "heteroaryl" group. Unless otherwise specifically indicated in the specification, heteroaryl groups include those that are optionally substituted with one or more substituents selected from the group consisting of alkyl, alkenyl, alkynyl, halogen, haloalkyl, haloalkenyl, haloalkynyl, oxo, thio, cyano, nitro, etc.

"PEG" refers to polyethylene glycol, and unless otherwise defined, "PEG" includes ethylene oxide polymers of any length. The PEG may also be optionally substituted with one or more substituents selected from the group consisting of deuterium, alkyl, alkenyl, alkynyl, halogen, haloalkyl, haloalkenyl, haloalkynyl, oxo, thio, cyano, nitro, etc.

DETAILED DESCRIPTION

Figure 1:
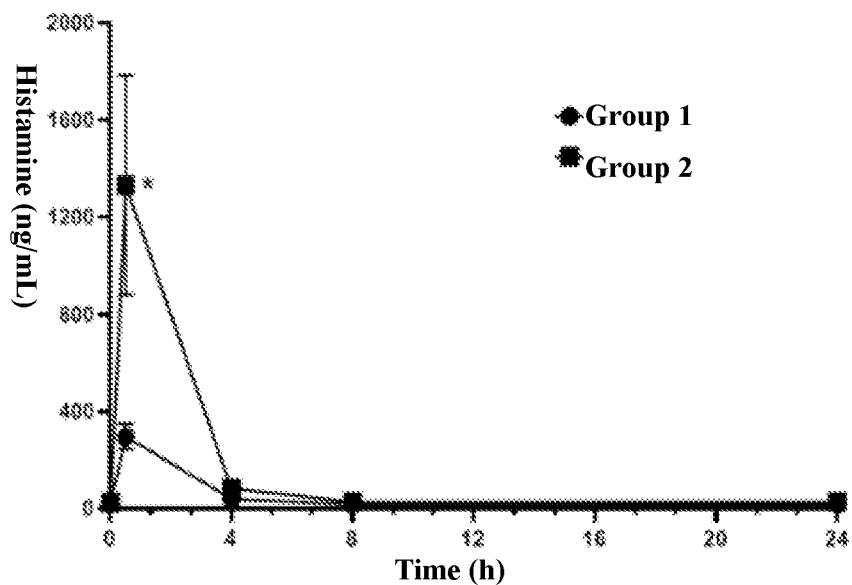
FIG. 1 shows changes in histamine concentration after intravenous administration of compounds.

The present invention is further described below with reference to examples, but these examples are not intended to limit the scope of the present invention.

Experimental procedures without specific conditions indicated in the following examples, are generally conducted according to conventional conditions, or according to conditions recommended by the manufacturers of the starting materials or commercial products. Reagents without specific origins indicated are commercially available conventional reagents.

Anidulafungin and caspofungin were both purchased from Taizhou KEDE Chemical. Rezafungin was synthesized according to CN103889221A.

HPLC Purity Analysis Method:

| Instrument | HPLC (Agilent 1260) | | |
|---|---|---|---|
| Chromatography column | Welch Xtimate C18 (3 μm, 4.6 mm × 150 mm) | | |
| Oven temperature | 30° C. | | |
| Mobile phase | Time (min) | A: 0.05% TFA in water | B: 0.05% TFA in ACN |
| Gradient: program | 0.0 | 95 | 5 |
| | 15.00 | 50 | 50 |
| | 21.00 | 47 | 53 |
| | 30.00 | 5 | 95 |
| | 30.10 | 95 | 5 |
| | 35.00 | 95 | 5 |
| Flowrate | 1.0 mL/min | | |
| Detector | UV 214 nm | | |
| Eluent | ACN | | |
| Calculation method | Area % | | |

LC-MS Analysis Method:

| Instrument | LCMS (Agilent 6120) | | |
|---|---|---|---|
| Chromatography column | Welch Boltimate C18 (4.6 × 50 mm × 2.7 μm) | | |
| Mobile phase | Time (min) | A: 0.05% FA in water | B: 0.05% FA in can |
| Gradient program | 0.01 | 90 | 10 |
| | 5.5 | 5 | 95 |
| | 7.0 | 5 | 95 |
| | 7.1 | 90 | 10 |
| | 9.0 | 90 | 10 |
| Flowrate | 0.8 mL/min | | |
| Oven temperature | 40° C. | | |
| Detector | UV 214 nm | | |
| Ion source | ESI | | |
| Mass range of scanning | 100~2000 | | |
| Mode | Positive polarity | | |

Example 1
Step 1
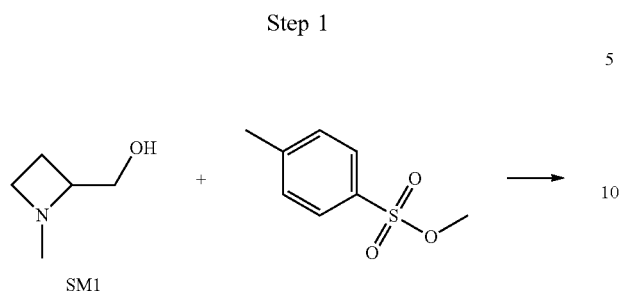 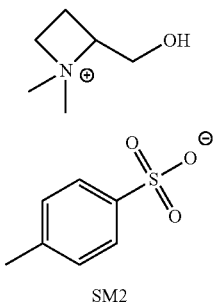
Compound SM1 (510 mg, 5.04 mmol) was dissolved in acetone (5.1 mL), and methyl p-toluenesulfonate (938 mg, 5.04 mmol) was added dropwise. The reaction mixture was heated at reflux for 4 h, and a white solid precipitated. The reaction mixture was filtered, and the filter cake was dried in vacuo to give compound SM2 (385 mg, 98% purity, 26.7% yield). MS: 116.1[M$^+$].
Step 2
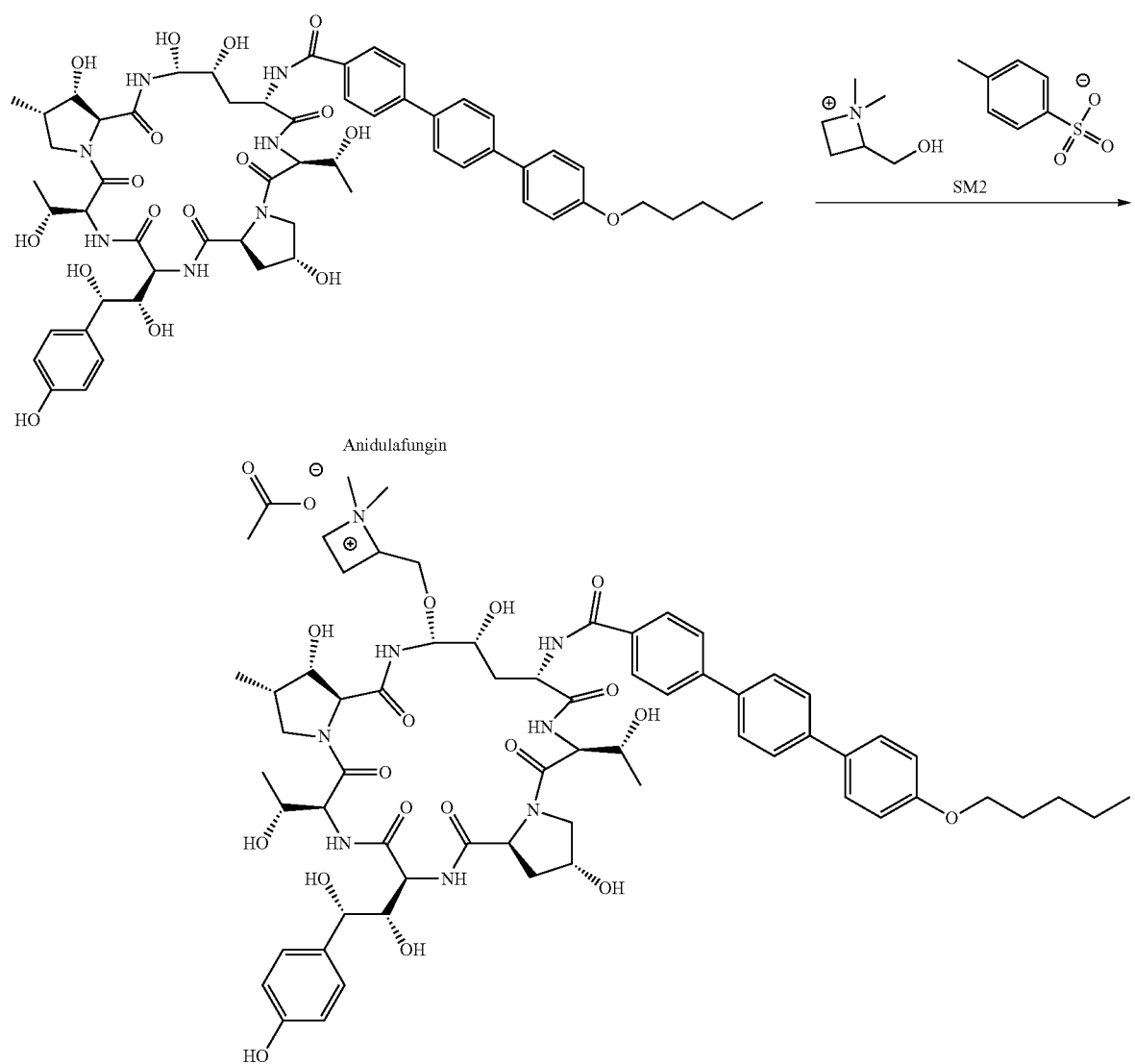

Anidulafungin (114 mg, 0.1 mmol) was dissolved in tetrahydrofuran (10 mL) under nitrogen, and phenylboronic acid (24 mg, 0.2 mmol) was added. The reaction mixture was stirred at room temperature for 2 h and concentrated in vacuo to dryness to remove the solvent. 10 mL of acetonitrile was added, followed by addition of compound SM2 (170 mg, 0.6 mmol) and p-toluenesulfonic acid (86 mg, 0.5 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (79 mg, 97.6% purity, 60.8% yield). HRMS: 1237.6021[M$^+$].

$^1$H NMR (400 MHz, METHANOL-d$_4$) δ 7.98-8.01 (m, 2H), 7.82 (d, J=8.3 Hz, 2H), 7.71-7.78 (m, 4H), 7.63 (d, J=8.8 Hz, 2H), 7.17 (d, J=8.6 Hz, 2H), 7.03 (d, J=8.8 Hz, 2H), 6.79 (d, J=8.6 Hz, 2H), 5.40-5.42 (m, 1H), 5.00-5.05 (m, 11H), 4.58-4.80 (m, 7H), 4.41 (d, J=4.4 Hz, 1H), 4.34-4.36 (m, 2H), 4.25-4.32 (m, 2H), 3.97-4.24 (m, 8H), 3.89-3.96 (m, 1H), 3.82-3.87 (m, 1H), 3.48-3.53 (m, 1H), 3.12-3.17 (m, 6H), 2.45-2.57 (m, 4H), 2.27-2.35 (m, 1H), 2.05-2.15 (m, 2H), 1.79-1.87 (m, 5H), 1.40-1.53 (m, 4H), 1.26-1.32 (m, 6H), 1.10 (d, J=6.8 Hz, 3H), 0.99 (t, J=7.2 Hz, 3H).

Example 2

Step 1

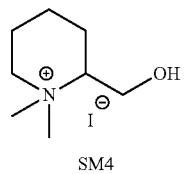

Compound SM3 (1.29 g, 10 mmol) was dissolved in acetone (13 mL), and iodomethane (1.42 g, 10 mmol) was added dropwise. The reaction mixture was heated at reflux for 4 h, and a white solid precipitated. The reaction mixture was filtered, and the filter cake was dried in vacuo to give compound SM4 (2.54 g, 98% purity, 89.2% yield). MS: 144.1[M$^+$].

Step 2

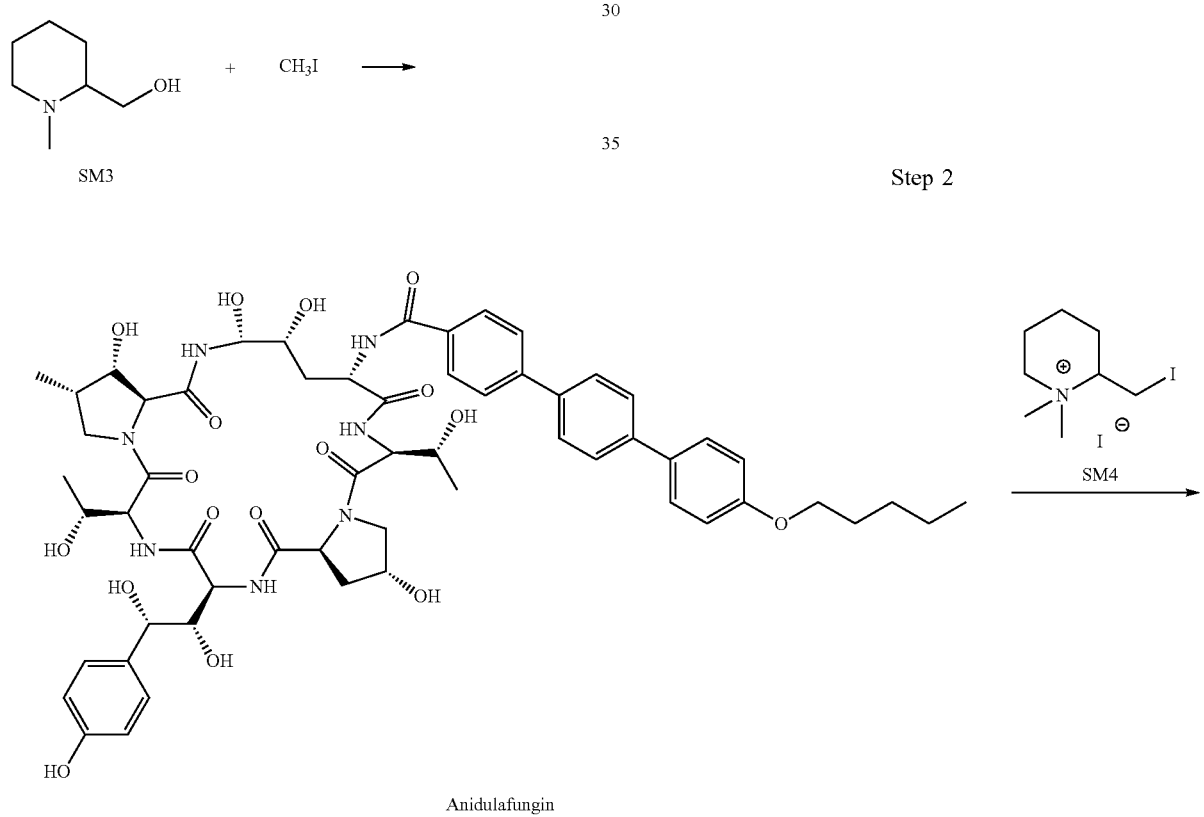

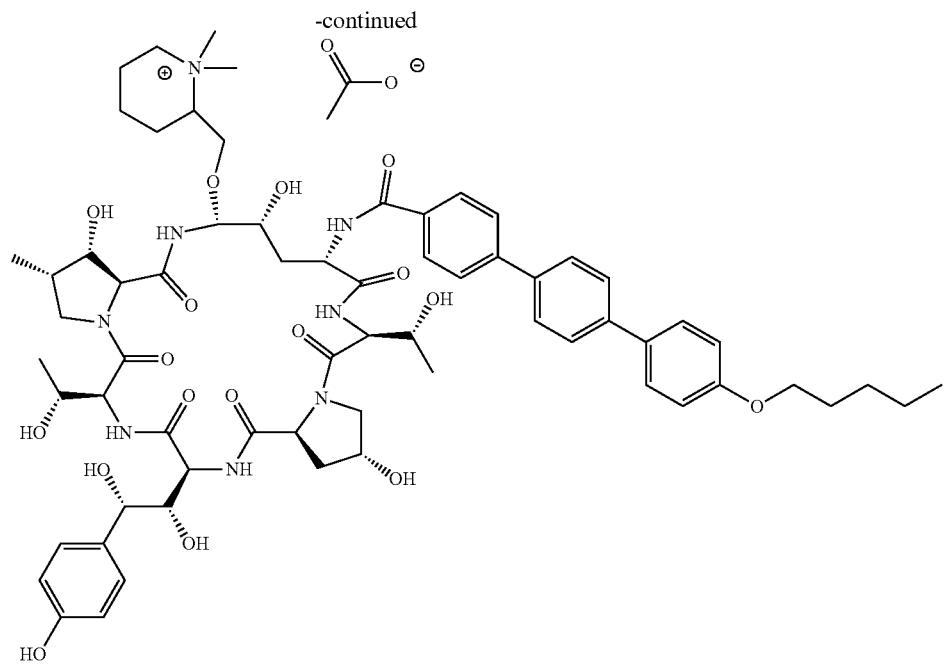

Anidulafungin (114 mg, 0.1 mmol) was dissolved in tetrahydrofuran (10 mL) under nitrogen, and phenylboronic acid (24 mg, 0.2 mmol) was added. The reaction mixture was stirred at room temperature for 2 h and concentrated in vacuo to dryness to remove the solvent. 10 mL of acetonitrile was added, followed by addition of compound SM4 (171 mg, 0.6 mmol) and D-(+)-camphorsulfonic acid (120 mg, 0.5 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (61 mg, 97.0% purity, 46.2% yield). HRMS: 1265.6327[M+].

$^1$H NMR (400 MHz, METHANOL-$d_4$) δ 8.01 (d, J=8.3 Hz, 2H), 7.83 (dd, J=0.49, 8.3 Hz, 2H), 7.71-7.79 (m, 4H), 7.63 (d, J=8.80 Hz, 2H), 7.17 (d, J=8.6 Hz, 2H), 7.03 (d, J=8.80 Hz, 2H), 6.79 (d, J=8.6 Hz, 2H), 5.34-5.41 (m, 1H), 5.00-5.05 (m, 1H), 4.58-4.80 (m, 7H), 4.40 (d, J=4.4 Hz, 1H), 4.32-4.38 (m, 2H), 4.25-4.32 (m, 2H), 4.18-4.22 (m, 1H), 4.15-4.24 (m, 1H), 3.81-4.15 (m, 8H), 3.43-3.52 (m, 2H), 3.21 (d, J=6.6 Hz, 3H), 3.04 (d, J=6.6 Hz, 3H), 2.42-2.59 (m, 2H), 2.24-2.36 (m, 1H), 2.05-2.12 (m, 2H), 1.80-1.88 (m, 9H), 1.42-1.53 (m, 5H), 1.28 (d, J=6.4 Hz, 6H), 1.10 (d, J=6.9 Hz, 3H), 0.99 (t, J=7.1 Hz, 3H).

Example 3

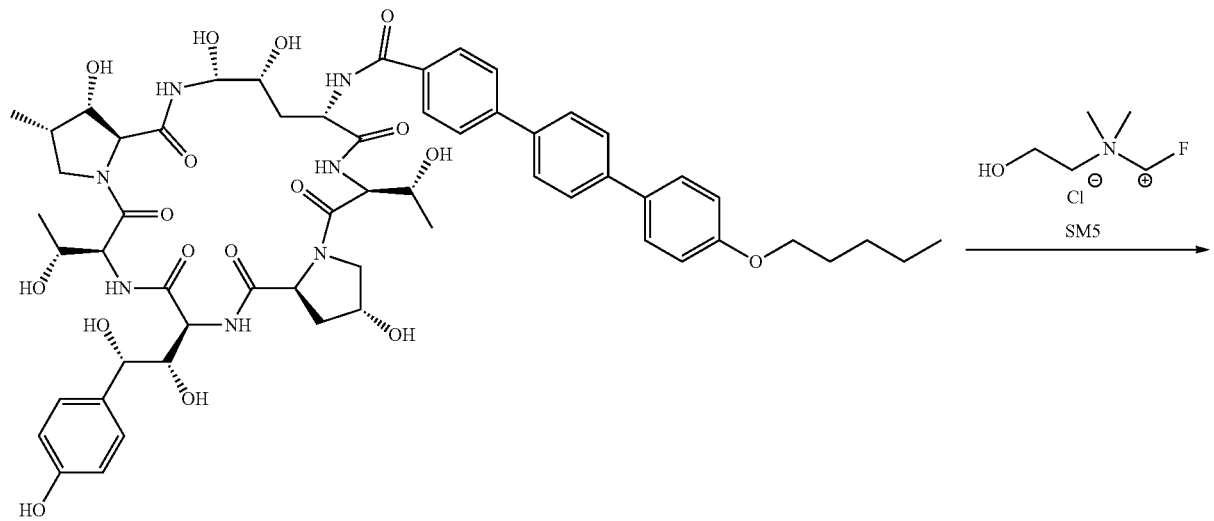

Anidulafungin

-continued

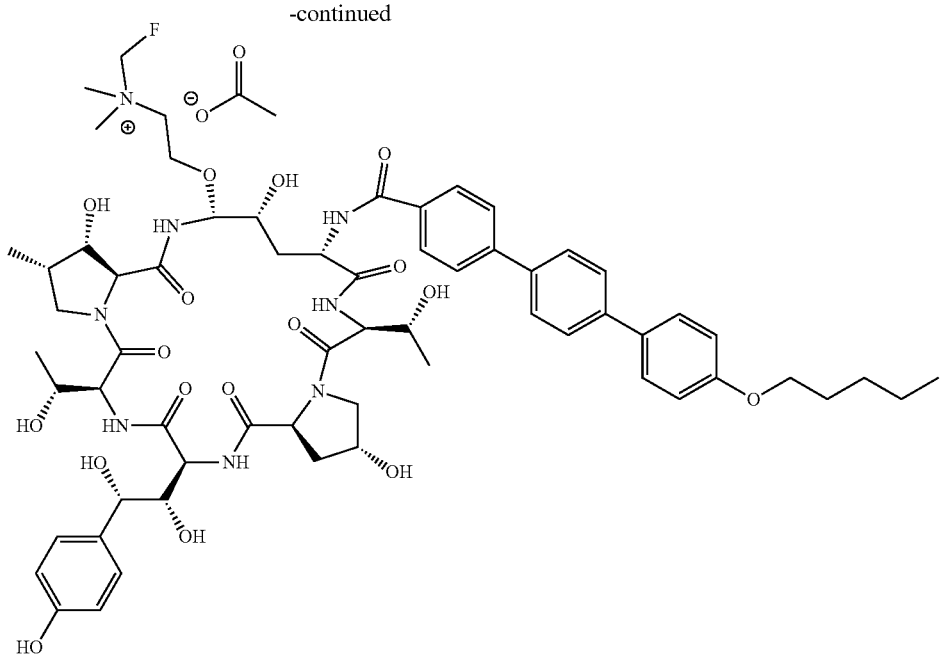

Anidulafungin (114 mg, 0.1 mmol) was dissolved in tetrahydrofuran (10 mL) under nitrogen, and phenylboronic acid (24 mg, 0.2 mmol) was added. The reaction mixture was stirred at room temperature for 2 h and concentrated in vacuo to dryness to remove the solvent. 10 mL of dioxane was added, followed by addition of compound SM5 (73 mg, 0.6 mmol) and p-toluenesulfonic acid (86 mg, 0.5 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (68 mg, 97.8% purity, 52.3% yield). HRMS: 1243.5924[M+].

$^1$H NMR (400 MHz, METHANOL-$d_4$) δ 7.97 (d, J=8.0 Hz, 2H), 7.79 (d, J=8.0 Hz, 2H), 7.69-7.75 (m, 4H), 7.61 (d, J=8.4 Hz, 2H), 7.15 (d, J=8.0 Hz, 2H), 7.01 (d, J=8.4 Hz, 2H), 6.76 (d, J=8.0 Hz, 2H), 5.45 (d, J=17.6 Hz, 2H), 5.36 (s, 1H), 5.05 (s, 1H), 4.73-4.77 (m, 1H), 4.58-4.61 (m, 3H), 4.16-4.40 (m, 6H), 3.81-4.10 (m, 8H), 3.63-3.73 (m, 2H), 3.46-3.50 (m, 1H), 3.20 (s, 6H), 2.42-2.53 (m, 2H), 2.26-2.29 (m, 1H), 2.05-2.11 (m, 2H), 1.78-1.84 (m, 2H), 1.40-1.52 (m, 4H), 1.25-1.30 (m, 7H), 1.07 (d, J=6.8 Hz, 3H), 0.97 (t, J=7.2 Hz, 3H).

Example 4

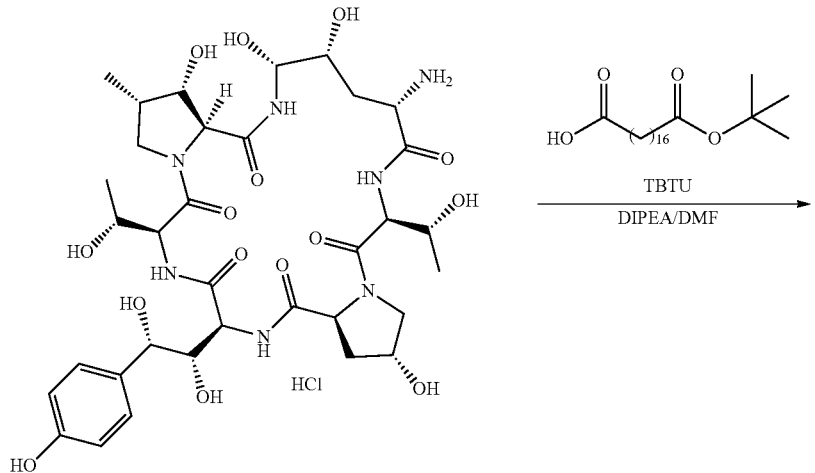

Echinocandin B

-continued

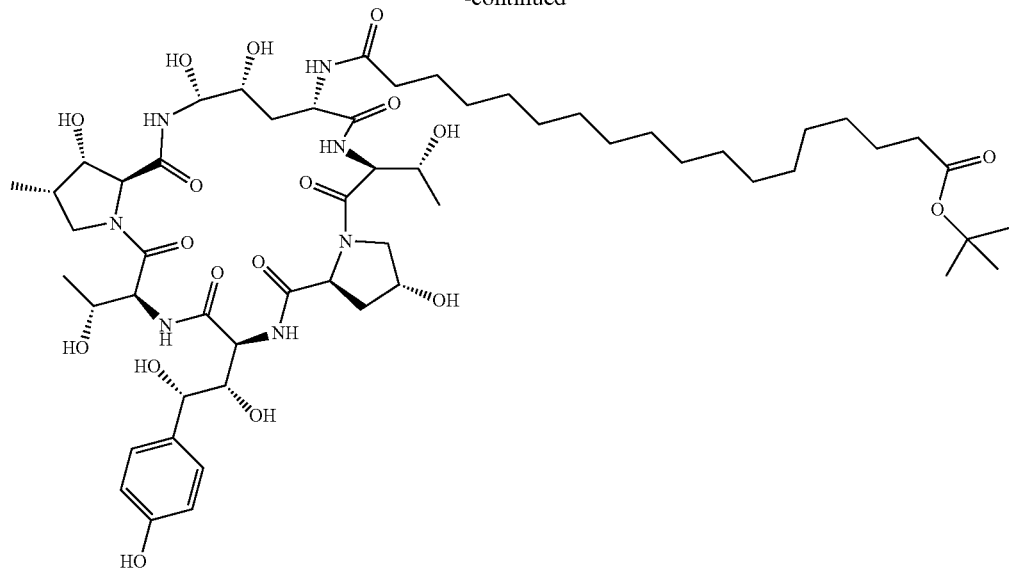

Echinocandin B (50 mg, 0.06 mmol) and mono-tert-butyl octadecanedioate (24.43 mg, 1.1 eq.) were dissolved in DMF (2 mL), and the resulting solution was stirred in an ice-water bath. TBTU (28.9 mg, 1.5 eq.) and DIPEA (15.5 mg, 2 eq.) were added. The reaction mixture was stirred in the ice-water bath for another 1.5 h, quenched with water (5.0 mL), and extracted with ethyl acetate (5 mL×5). The organic phases were combined, washed with saturated brine (5 mL×2), dried over anhydrous sodium sulfate, and concentrated. The residue was purified by preparative HPLC to give a product (55.2 mg, 97.1% purity, 80% yield). HRMS: 1150.6482[M+1].

$^1$H NMR (400 MHz, DMSO$_{d6}$): δ 9.31 (s, 1H), 8.06-7.94 (m, 3H), 7.40 (s, br, 1H), 7.29 (d, 1H, J=9.2 Hz), 7.02 (d, 2H, J=8.4 Hz), 6.68 (d, 2H, J=8.0 Hz), 5.45 (d, 1H, J=6.4 Hz), 5.19 (d, 1H, J=3.2 Hz), 5.14 (d, 1H, J=4.4 Hz), 5.10 (d, 1H, J=5.2 Hz), 5.04-4.91 (m, 3H), 4.75-4.64 (m, 4H), 4.42 (s, 1H), 4.36-4.28 (m, 2H), 4.21-4.16 (m, 3H), 4.04-4.01 (m, 1H), 4.00-3.93 (m, 3H), 3.88-3.84 (m, 1H), 3.79-3.77 (m, 1H), 3.71-3.68 (m, 1H), 3.19 (t, 1H, J=8.0 Hz), 2.35-2.34 (m, 1H), 2.24-2.15 (m, 3H), 2.08-2.08 (m, 2H), 1.90-1.82 (m, 2H), 1.69-1.59 (m, 1H), 1.47-1.43 (m, 5H), 1.39 (s, 9H), 1.24 (s, 24H), 1.08-1.06 (m, 6H), 0.96 (d, 3H, J=6.8 Hz).

Example 5

Step 1

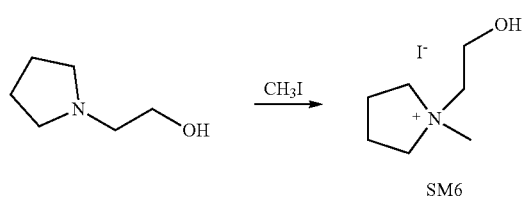

N-(2-hydroxyethyl)-pyrrolidine (2.30 g, 20 mmol) was dissolved in 40 mL of acetone, and iodomethane (2.84 g, 1.0 eq.) was slowly added. The reaction mixture was heated at reflux with stirring for 4 h and concentrated until half of the solvent remained, and a solid precipitated. The solid was collected by filtration and dried to give compound SM6 as a white solid (4.88 g, 95% yield). MS: 130.0[M$^+$].

$^1$H NMR (400 MHz, D$_2$O): δ 4.09 (d, 2H, J=2.0 Hz), 3.63-3.56 (m, 6H), 3.15 (s, 3H), 2.26 (s, 4H).

Step 2

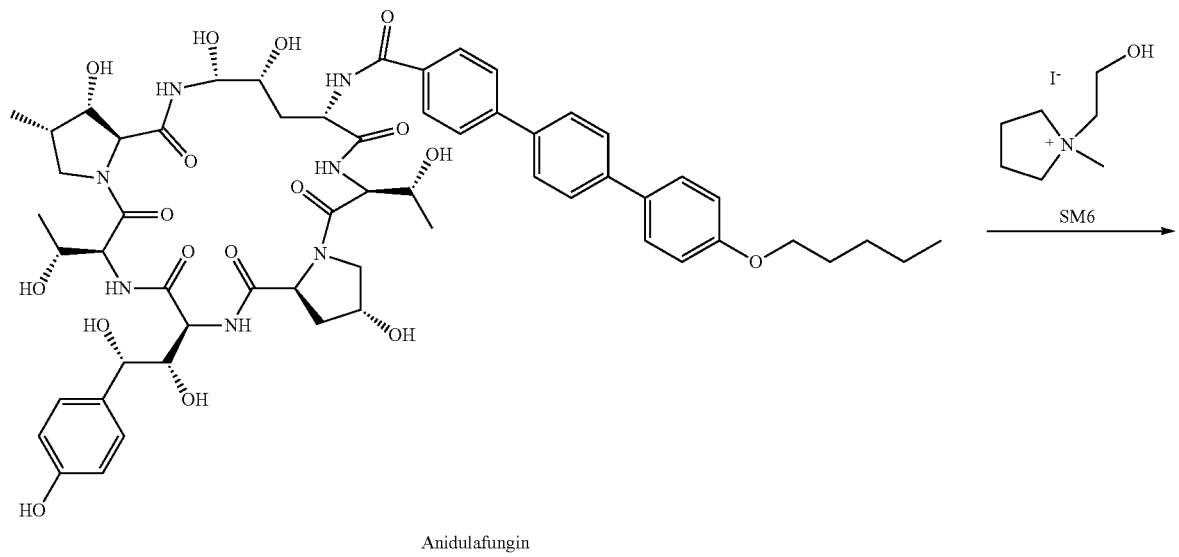
Anidulafungin

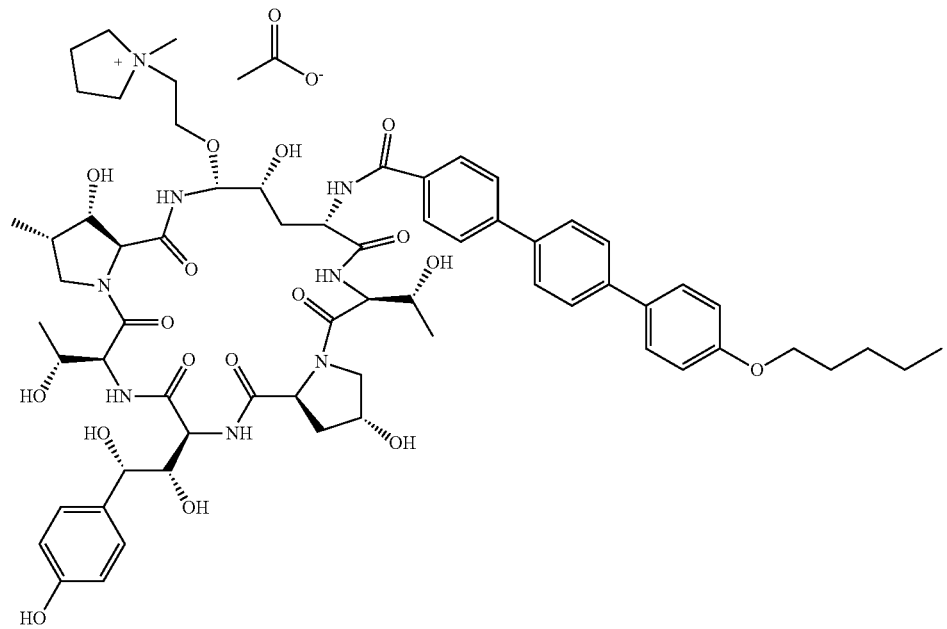

Anidulafungin (300 mg, 0.26 mmol) and phenylboronic acid (64.2 mg, 2 eq.) were dissolved in THF (10 mL). The reaction mixture was stirred at room temperature for 1 h and concentrated to dryness. Anhydrous acetonitrile (10 mL) was added, followed by addition of compound SM6 (422.7 mg, 6 eq.) and p-toluenesulfonic acid (340 mg, 7.5 eq.). The reaction mixture was stirred at room temperature under nitrogen for 5 h, quenched with aqueous sodium acetate solution, and concentrated to give a crude product, which was then purified by preparative HPLC to give an acetate salt (259 mg, 96.5% purity, 76% yield). HRMS: 1251.6174 [M+].

$^1$H NMR (400 MHz, CD$_3$OD): δ 8.00 (d, 2H, J=8.4 Hz), 7.83 (d, 2H, J=8.0 Hz), 7.77 (m, 4H), 7.63 (d, 2H, J=8.8 Hz), 7.17 (d, 2H, J=8.4 Hz), 7.03 (d, 2H, J=8.8 Hz), 6.78 (d, 2H, J=8.8 Hz), 5.45 (d, 1H, J=2.0 Hz), 5.06 (d, 1H, J=3.2 Hz), 4.81-4.76 (m, 1H), 4.62-4.60 (m, 3H), 4.41 (d, 1H, J=4.4 Hz), 4.36-4.33 (m, 2H), 4.28-4.25 (m, 2H), 4.22-4.18 (m, 1H), 4.11-3.83 (m, 8H), 3.68-3.42 (m, 8H), 3.09 (s, 3H), 2.55-2.44 (m, 2H), 2.33-2.27 (m, 1H), 2.23-2.03 (m, 6H), 1.92 (s, 3H), 1.87-1.80 (m, 2H), 1.55-1.40 (m, 4H), 1.28 (d, 6H, J=5.6 Hz), 1.09 (d, 3H, J=7.2 Hz), 0.92 (t, 3H, J=6.4 Hz).

Example 6

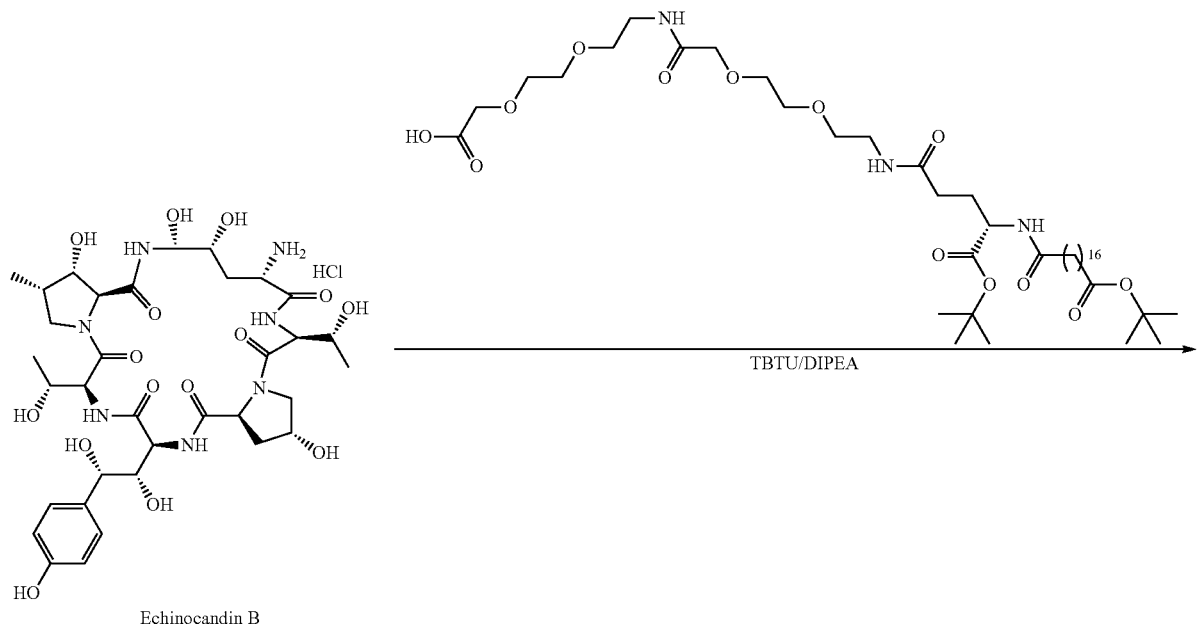

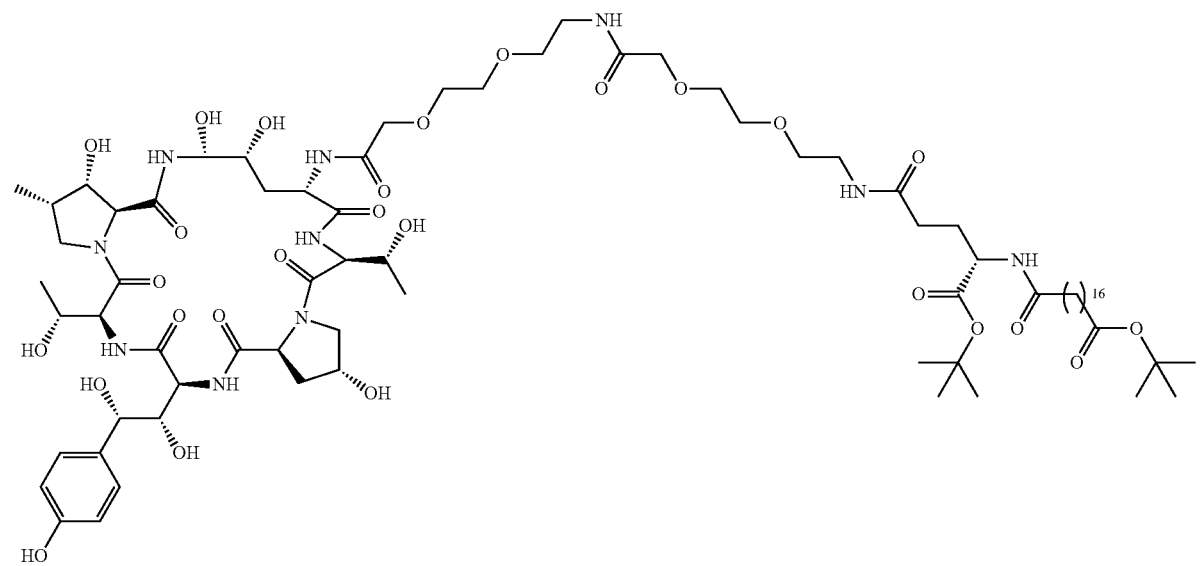

Echinocandin B (100 mg, 0.12 mmol) and semaglutide side chain (100.9 mg, 1.0 eq.) were dissolved in DMF (4 mL), and the resulting solution was stirred in an ice-water bath. TBTU (58 mg, 1.5 eq.) and DIPEA (31 mg, 2 eq.) were added. The reaction mixture was stirred in the ice-water bath for another 1.5 h and added dropwise to 100 mL of ice water, and a solid precipitated. The solid was collected by filtration, dried, and slurried with acetonitrile to give a product (120 mg, 95.8% purity, 61.5% yield). HRMS: 1625.8989[M+1].

$^1$H NMR (400 MHz, DMSO$_{d6}$): δ 9.31 (s, 1H), 8.05 (d, 2H, J=7.6 Hz), 7.95 (d, 1H, J=8.4 Hz), 7.90-7.88 (m, 1H), 7.73-7.69 (m, 2H), 7.43-7.31 (m, 2H), 7.02 (d, 2H, J=8.4 Hz), 6.69 (d, 2H, J=8.0 Hz), 5.52 (d, 1H, J=5.6 Hz), 5.20 (d, 1H, J=2.8 Hz), 5.15 (d, 1H, J=3.6 Hz), 5.10 (d, 1H, J=5.6 Hz), 5.01-4.91 (m, 3H), 4.80-4.60 (m, 4H), 4.42 (s, 1H), 4.37-4.33 (m, 3H), 4.22-4.17 (m, 2H), 4.05-3.57 (m, 11H), 3.57 (s, br, 9H), 3.48-3.45 (m, 2H), 3.43-3.40 (m, 2H), 3.30-3.28 (m, 2H), 3.21-3.18 (m, 3H), 2.36-2.33 (m, 1H), 2.24-2.05 (m, 7H), 1.94-1.84 (m, 3H), 1.76-1.62 (m, 2H), 1.47 (s, br, 5H), 1.39 (s, 18H), 1.24 (s, 24H), 1.08-1.06 (m, 6H), 0.96 (d, 3H, J=6.8 Hz).

Example 7

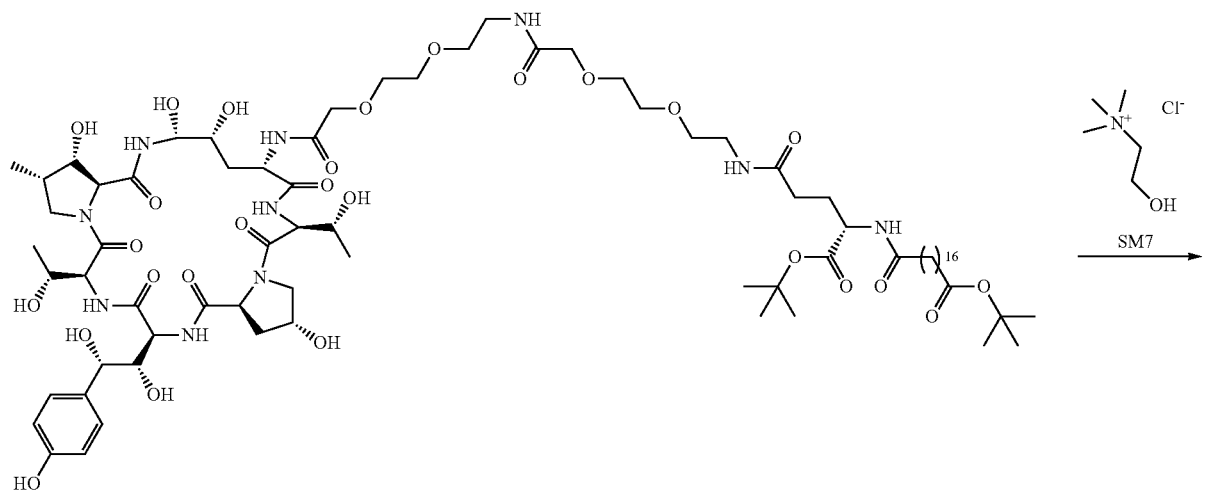

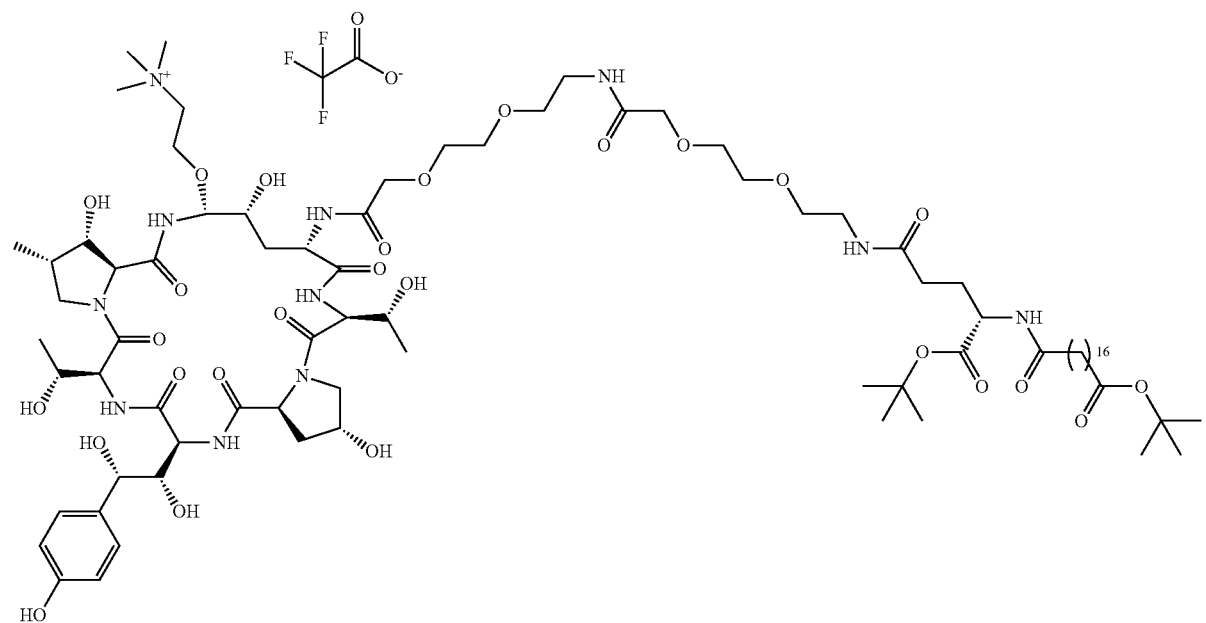

The compound of Example 6 (100 mg, 0.0615 mmol) and phenylboronic acid (15 mg, 2 eq.) were dissolved in THF (4 mL). The reaction mixture was stirred at room temperature for 1 h and concentrated to dryness. Compound SM7 (101.6 mg, 6 eq.) and p-toluenesulfonic acid (53 mg, 5 eq.) were added. The reaction mixture was stirred at room temperature under nitrogen for another 5 h, quenched with aqueous sodium acetate solution, and concentrated to give a crude product, which was then purified by preparative HPLC to give a trifluoroacetate salt (44.9 mg, 96.5% purity, 40% yield). HRMS: 1710.9867[M$^+$].

$^1$H NMR (400 MHz, CD$_3$OD): δ 8.48 (d, 1H, J=8.4 Hz), 8.41 (d, 1H, J=8.8 Hz), 8.23 (d, 1H, J=7.6 Hz), 8.04-7.99 (m, 2H), 7.60-7.54 (m, 2H), 7.15 (d, 2H, J=8.0 Hz), 6.77 (d, 2H, J=8.4 Hz), 5.51 (d, 1H, J=9.6 Hz), 5.05-4.89 (m, 1H), 4.60-4.45 (m, 4H), 4.37-4.32 (m, 3H), 4.28-4.25 (m, 3H), 4.13-3.82 (m, 10H), 3.76-3.63 (m, 10H), 3.59-3.56 (m, 3H), 3.54-3.56 (m, 3H), 3.53-3.46 (m, 3H), 3.41-3.38 (m, 3H), 3.21 (m, 9H), 2.55-2.44 (m, 2H), 2.36-2.21 (m, 6H), 2.17-2.06 (m, 2H), 1.92-1.83 (m, 2H), 1.64-1.56 (m, 4H), 1.49 (s, 9H), 1.46 (s, 9H), 1.31 (s, 24H), 1.22 (d, 6H, J=6.4 Hz), 1.08 (d, 3H, J=6.4 Hz).

Example 8
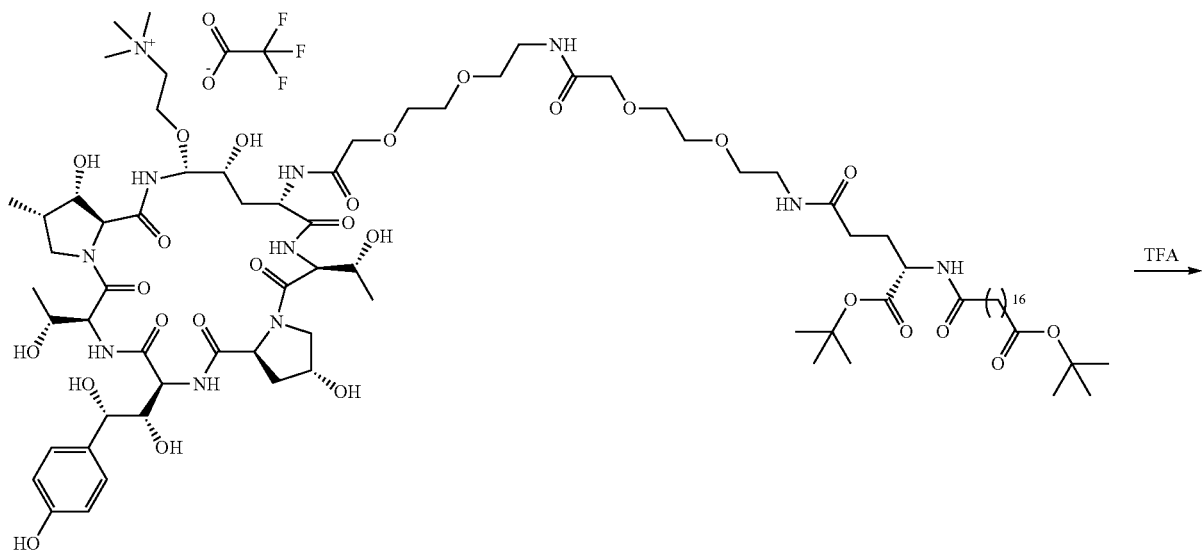
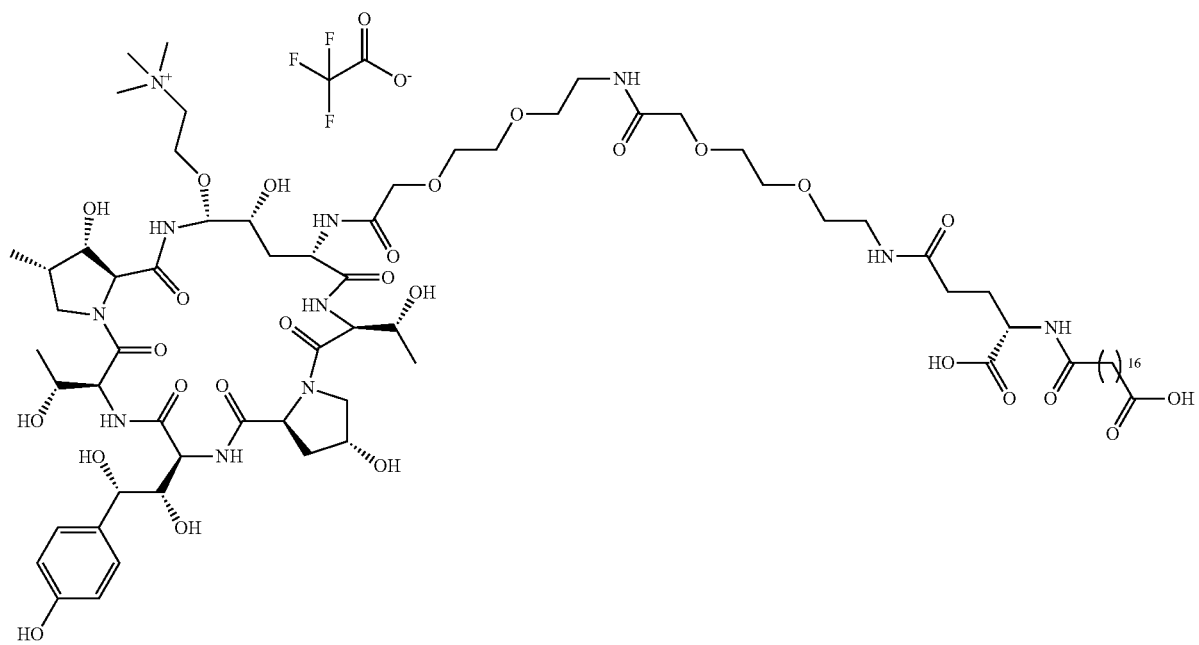
The trifluoroacetate salt of the compound of Example 7 (24 mg, 0.014 mmol) was dissolved in TFA (1 mL), and the resulting solution was stirred in an ice-water bath for 5 h and concentrated to dryness. The residue was purified by preparative HPLC to give a trifluoroacetate salt (7.2 mg, 97.8% purity, 30% yield). HRMS: 1598.8629[M⁺].

Example 9

Step 1

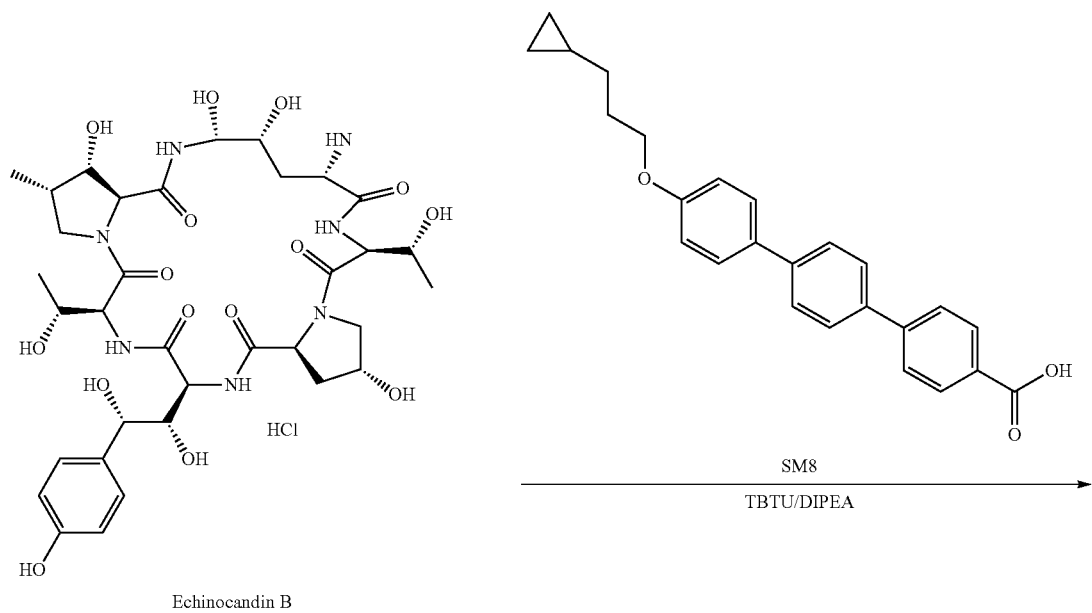

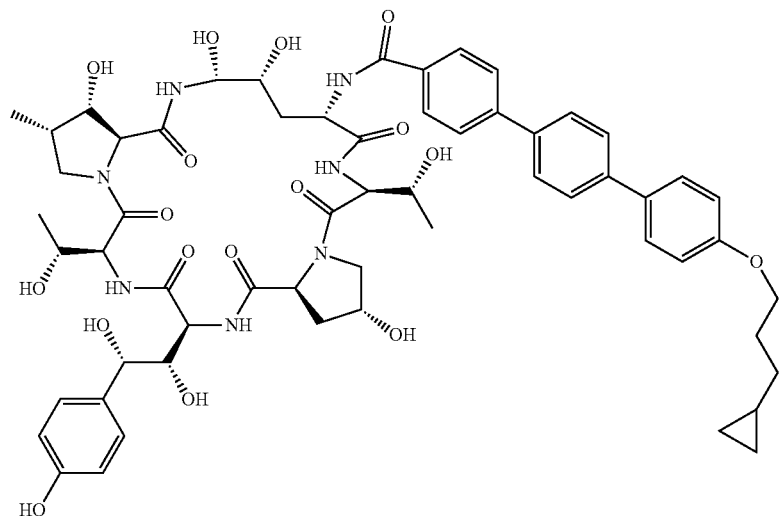

Echinocandin B (200 mg, 0.2397 mmol) and SM8 (89 mg, 1.0 eq.) were dissolved in DMF (5 mL), and the resulting solution was stirred in an ice-water bath. TBTU (115 mg, 1.5 eq.) and DIPEA (62 mg, 2 eq.) were added. The reaction mixture was stirred in the ice-water bath for another 1.5 h and purified by reversed-phase column chromatography to give a product (234 mg, 85% yield). MS: 1152.5[M+1].

$^1$H NMR (400 MHz, CD$_3$OD): δ 7.96 (d, 2H, J=6.0 Hz), 7.77-7.69 (m, 6H), 7.62 (d, 2H, J=8.4 Hz), 7.17 (d, 2H, J=8.4 Hz), 7.02 (d, 2H, J=8.8 Hz), 6.78 (d, 2H, J=8.4 Hz), 5.37 (d, 1H, J=2.8 Hz), 5.05-5.02 (m, 1H), 4.89-4.88 (m, 1H), 4.70-4.58 (m, 5H), 4.39-4.33 (m, 3H), 4.28-4.22 (m, 3H), 4.10-4.07 (m, 2H), 4.03-4.00 (m, 1H), 3.93-3.83 (m, 2H), 3.45-3.40 (m, 1H), 2.55-2.44 (m, 2H), 2.25-2.06 (m, 3H), 1.98-1.91 (m, 2H), 1.46-1.37 (m, 2H), 1.31-1.27 (m, 6H), 1.08 (d, 3H, J=6.8 Hz), 0.77-0.74 (m, 1H), 0.50-0.46 (m, 2H), 0.10-0.06 (m, 2H).

Step 2

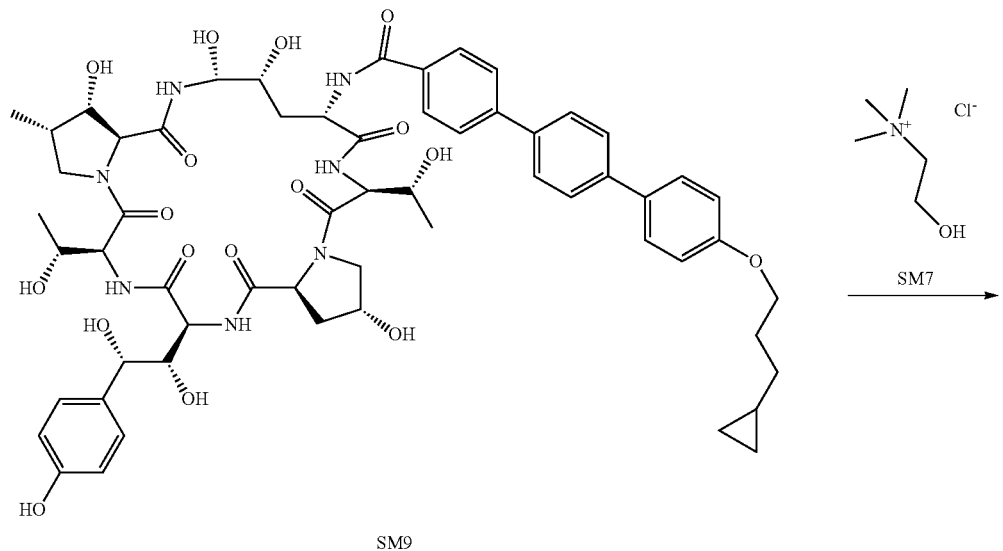

SM9

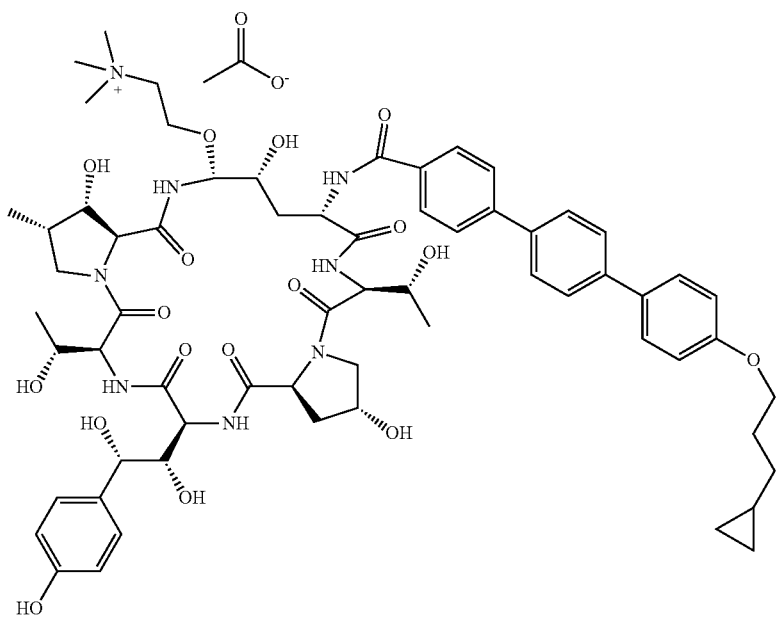

SM9 (140 mg, 0.1214 mmol) and phenylboronic acid (0.728 mg, 2 eq.) were dissolved in THF (5 mL). The reaction mixture was stirred at room temperature for 1 h and concentrated to dryness. Compound SM7 (200 mg, 6 eq.), p-toluenesulfonic acid (105 mg, 5 eq.) and anhydrous acetonitrile (5 mL) were added. The reaction mixture was stirred at room temperature under nitrogen for 5 h, quenched with aqueous sodium acetate solution, and concentrated to give a crude product, which was then purified by preparative HPLC to give an acetate salt (102 mg, 95.8% purity, 65% yield). HRMS: 1237.6022[M+].

$^1$H NMR (400 MHz, CD$_3$OD): δ 7.99 (d, 2H, J=8.4 Hz), 7.82 (d, 2H, J=8.0 Hz), 7.78-7.71 (m, 4H), 7.62 (d, 2H, J=8.4 Hz), 7.17 (d, 2H, J=8.4 Hz), 7.03 (d, 2H, J=8.4 Hz), 6.78 (d, 2H, J=8.4 Hz), 5.46 (d, 1H, J=8.4 Hz), 5.08-5.05 (m, 1H), 4.90-4.77 (m, 2H), 4.63-4.59 (m, 3H), 4.41-4.33 (m, 3H), 4.29-4.26 (m, 2H), 4.21-4.18 (m, 1H), 4.11-3.90 (m, 7H), 3.84 (d, 1H, J=11.2 Hz), 3.64-3.62 (m, 1H), 3.67-3.48 (m, 2H), 3.17 (s, 9H), 2.55-2.44 (m, 2H), 2.34-2.27 (m, 1H), 2.13-2.02 (m, 2H), 1.97-1.90 (m, 2H), 1.46-1.41 (m, 2H), 1.29 (s, 3H), 1.27 (s, 3H), 1.10 (d, 3H, J=6.8 Hz) 0.80-0.74 (m, 1H), 0.50-0.46 (m, 2H), 0.10-0.06 (m, 2H).

Example 10

Step 1

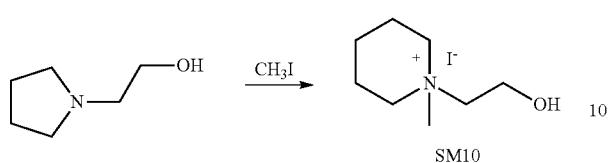

N-(2-hydroxyethyl)-pyrrolidine (6.5 g, 50 mmol) was dissolved in 25 mL of acetonitrile, and iodomethane (7.09 g, 1.0 eq.) was slowly added. The reaction mixture was heated at reflux with stirring for 4 h and concentrated until half of the solvent remained, and a solid precipitated. The solid was collected by filtration and dried to give compound SM10 as a white solid (12.1 g, 90% yield). MS: 144.0[M$^+$].

Step 2

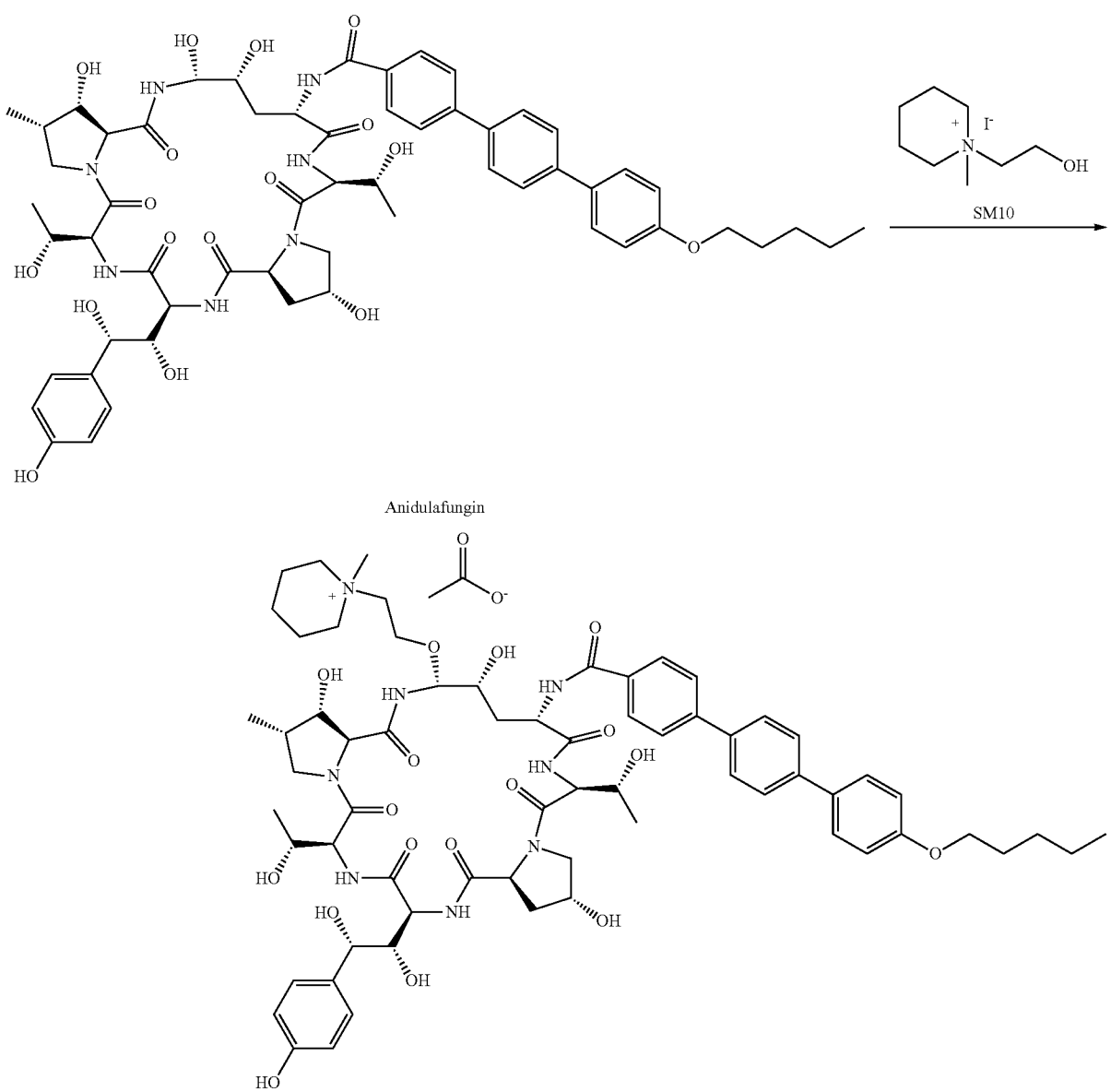

Anidulafungin (100 mg, 0.0877 mmol) was dissolved in tetrahydrofuran (10 mL) under nitrogen, and phenylboronic acid (21.4 mg, 0.1754 mmol) was added. The reaction mixture was stirred at room temperature for 2 h and concentrated in vacuo to dryness to remove the solvent. 10 mL of dioxane was added, followed by addition of compound SM10 (162.6 mg, 0.6 mmol) and p-toluenesulfonic acid (75.5 mg, 0.44 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (47.6 mg, 97.1% purity, 41% yield). HRMS: 1265.6324 [M+].

$^1$H NMR (400 MHz, METHANOL-$d_4$) δ 7.98 (d, J=8.4 Hz, 2H), 7.81 (d, J=8.4 Hz, 2H), 7.70-7.76 (m, 4H), 7.61 (d, J=8.8 Hz, 2H), 7.15 (d, J=8.4 Hz, 2H), 7.01 (d, J=8.8 Hz, 2H), 6.76 (d, J=8.4 Hz, 2H), 5.42 (d, J=1.6 Hz, 1H), 5.04 (d, J=3.2 Hz, 11H), 4.74-4.78 (m, 1H), 4.58-4.61 (m, 3H), 4.16-4.40 (m, 6H), 3.81-4.10 (m, 8H), 3.38-3.65 (m, 7H), 3.09 (s, 3H), 2.42-2.53 (m, 2H), 2.26-2.28 (m, 1H), 2.03-2.12 (m, 2H), 1.90 (s, 3H), 1.78-1.83 (m, 6H), 1.38-1.63 (m, 6H), 1.26-1.30 (m, 7H), 1.08 (d, J=7.2 Hz, 3H), 0.97 (t, J=7.2 Hz, 3H).

Example 11

Step 1

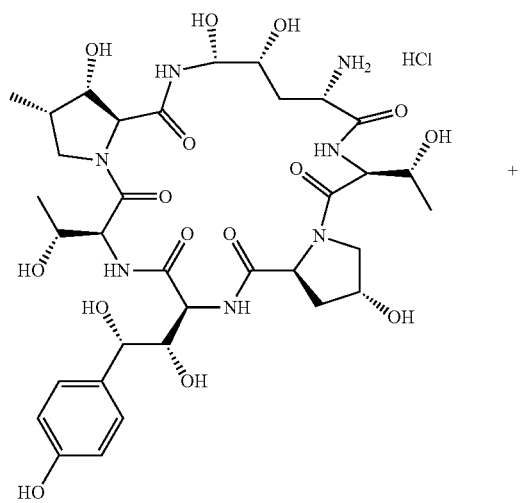

Echinocandin B

+

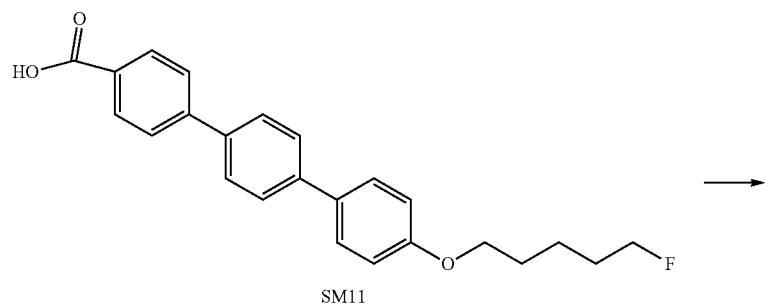

SM11

-continued
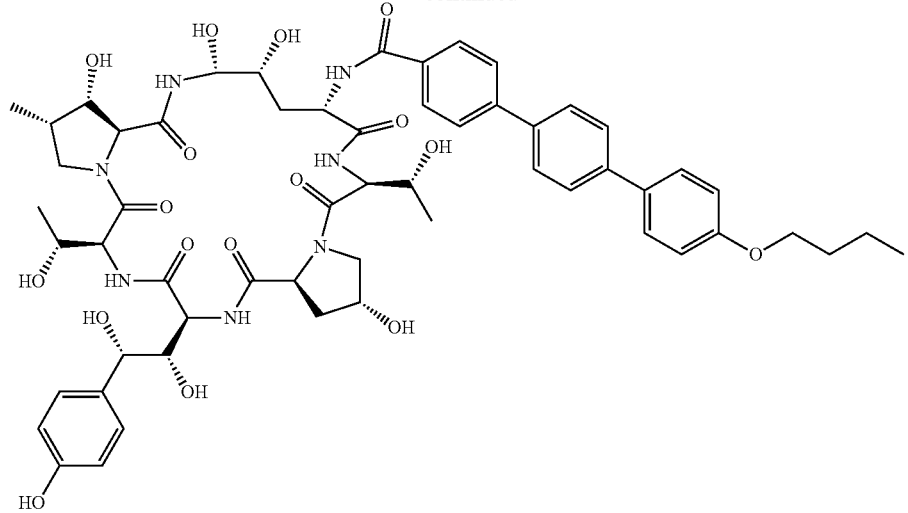
SM12
Echinocandin B (300 mg, 0.36 mmol) and SM11 (147 mg, 1.1 eq.) were dissolved in DMF (15 mL), and the resulting solution was stirred in an ice-water bath. TBTU (174 mg, 1.5 eq.) and DIPEA (141 mg, 3 eq.) were added. The reaction mixture was stirred in the ice-water bath for another hour and purified by reversed-phase column chromatography (MECN/$H_2O$) to give compound SM12 (392 mg, 96% purity, 70.6% yield). MS: 1158.5[M+1].
Step 2
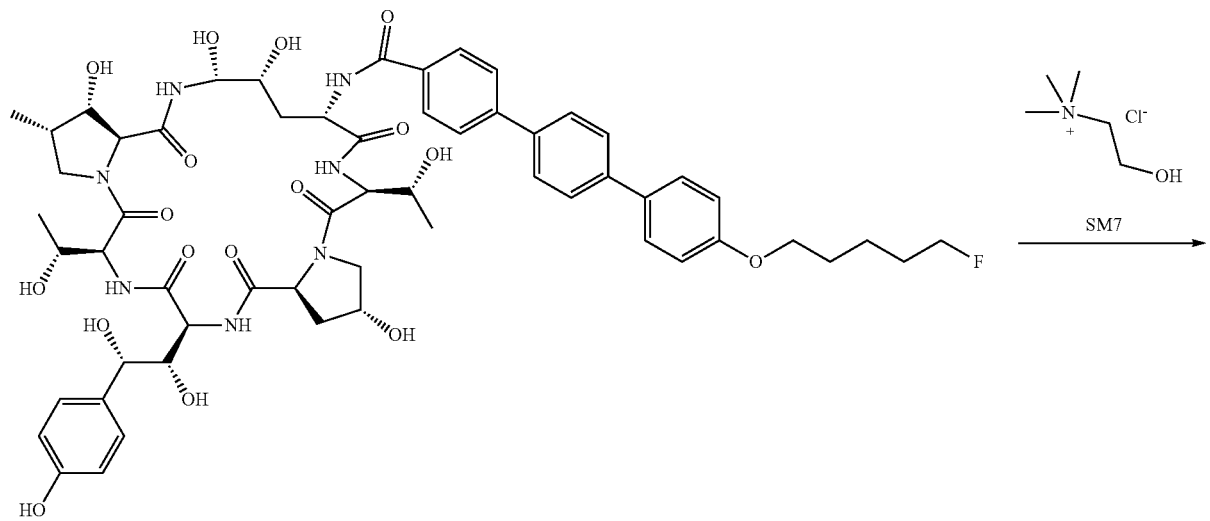
SM12

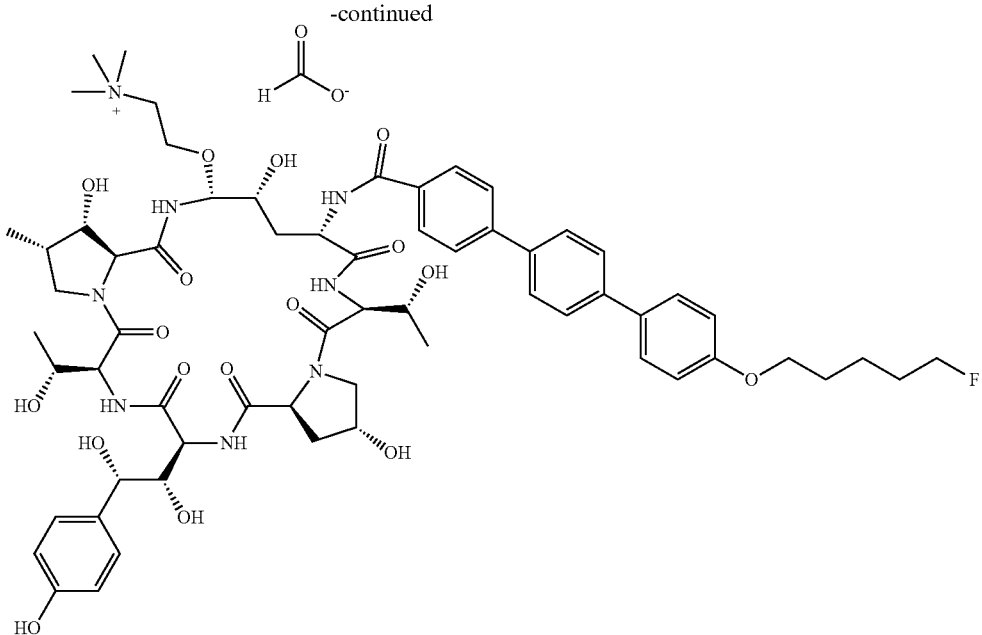

-continued

SM12 (100 mg, 0.086 mmol) was dissolved in tetrahydrofuran (10 mL) under nitrogen, and phenylboronic acid (21.3 mg, 0.173 mmol) was added. The reaction mixture was stirred at room temperature for 2 h and concentrated in vacuo to dryness to remove the solvent. 10 mL of dioxane was added, followed by addition of compound SM7 (108 mg, 0.777 mmol) and camphorsulfonic acid (100 mg, 0.43 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give a formate salt (39.5 mg, 97.0% purity, 35.5% yield). HRMS: 1243.5936[M-].

$^1$H NMR (400 MHz, METHANOL-$d_4$) δ 8.54 (s, 1H), 7.98 (d, J=8.0 Hz, 2H), 7.81 (d, J=8.0 Hz, 2H), 7.70-7.76 (m, 4H), 7.61 (d, J=8.4 Hz, 2H), 7.15 (d, J=8.4 Hz, 2H), 7.02 (d, J=8.0 Hz, 2H), 6.76 (d, J=8.4 Hz, 2H), 5.42 (s, 11H), 5.04 (s, 1H), 4.71-4.78 (m, 1H), 4.48-4.58 (m, 4H), 4.16-4.42 (m, 7H), 4.05 (t, J=6.4 Hz, 3H), 3.81-4.01 (m, 3H), 3.47-3.65 (m, 4H), 3.22 (s, 9H), 2.42-2.53 (m, 2H), 2.25-2.32 (m, 1H), 2.00-2.11 (m, 2H), 1.73-1.88 (m, 4H), 1.59-1.66 (m, 2H), 1.26-1.37 (m, 8H), 1.08 (d, J=6.8 Hz, 3H).

Example 12

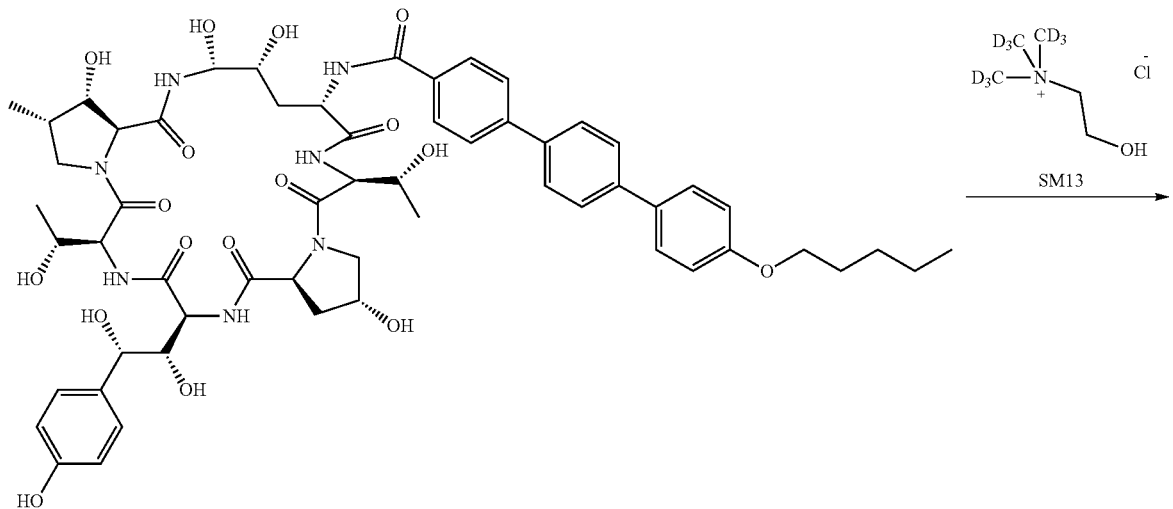

Anidulafungin

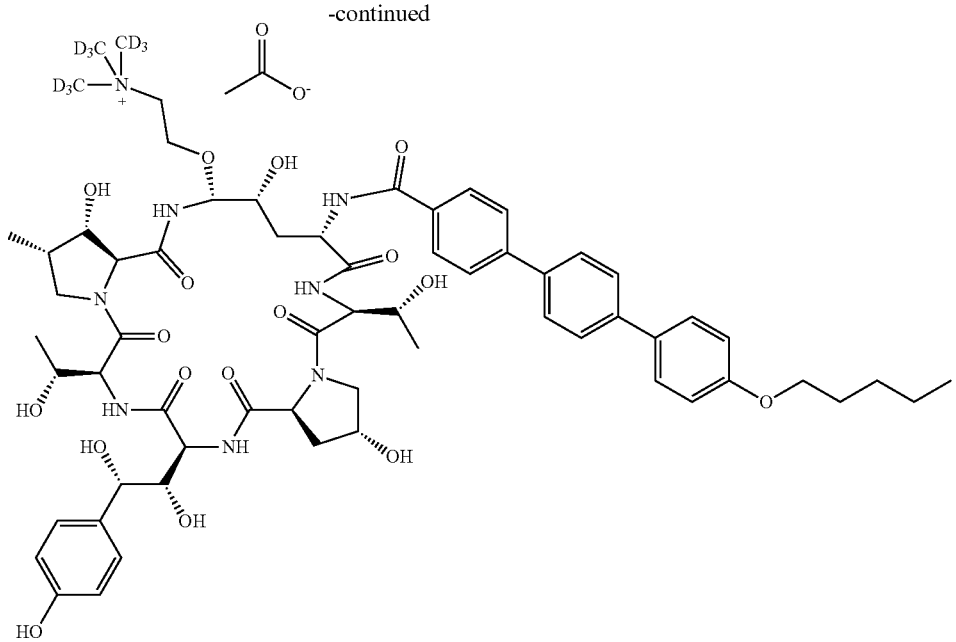

Anidulafungin (200 mg, 0.175 mmol) was dissolved in tetrahydrofuran (20 mL) under nitrogen, and phenylboronic acid (42.8 mg, 0.351 mmol) was added. The reaction mixture was stirred at room temperature for 2 h and concentrated in vacuo to dryness to remove the solvent. 20 mL of dioxane was added, followed by addition of compound SM13 (235 mg, 1.58 mmol) and p-toluenesulfonic acid (151 mg, 0.877 mmol). The reaction mixture was stirred at room temperature for 16 h, quenched with 1 N aqueous sodium acetate solution (2 mL), and concentrated by rotary evaporation to remove the solvent. The resulting crude product was purified by preparative chromatography to give an acetate salt (48.3 mg, 97.7% purity, 21.3% yield). HRMS: 1234.6581[M$^+$].

Example 13

Step 1

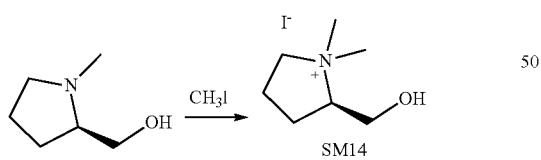

N-methyl-D-prolinol (1.15 g, 10 mmol) was dissolved in 20 mL of acetone, and iodomethane (1.56 g, 1.1 eq.) was slowly added. The reaction mixture was heated at reflux with stirring for 4 h and concentrated until half of the solvent remained, and a solid precipitated. The solid was collected by filtration and dried to give compound SM14 as a white solid (2.44 g, 95% yield). MS: 130.0[M$^+$].

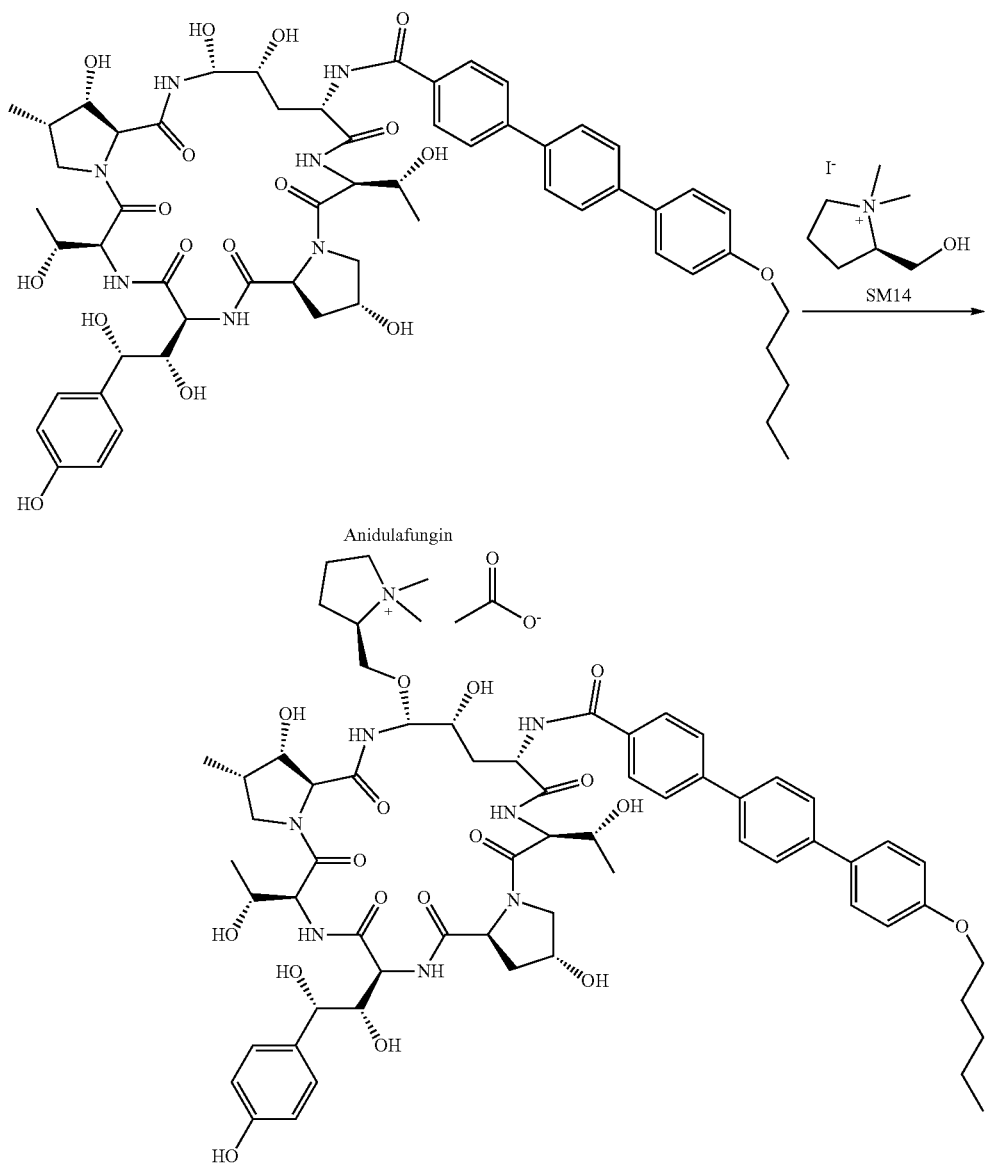

Anidulafungin (100 mg, 0.0877 mmol) and phenylboronic acid (21.39 mg, 2 eq.) were dissolved in THF (5 mL). The reaction mixture was stirred at room temperature for 1 h and concentrated to dryness. Compound SM14 (135.2 mg, 6 eq.), p-toluenesulfonic acid (75.6 mg, 5 eq.) and anhydrous dioxane (5 mL) were added. The reaction mixture was stirred at room temperature under nitrogen for 5 h, quenched with aqueous sodium acetate solution, and concentrated to give a crude product, which was then purified by preparative HPLC to give an acetate salt (57.5 mg, 95.8% purity, 50% yield). HRMS: 1251.6173 [M+].

$^1$H NMR (400 MHz, METHANOL-$d_4$) δ 7.98 (d, J=8.8 Hz, 2H), 7.81 (d, J=8.0 Hz, 2H), 7.69-7.76 (m, 4H), 7.61 (d, J=9.2 Hz, 2H), 7.15 (d, J=8.8 Hz, 2H), 7.01 (d, J=8.8 Hz, 2H), 6.76 (d, J=8.4 Hz, 2H), 5.42 (d, J=2.4 Hz, 1H), 5.03 (d, J=3.2 Hz, 1H), 4.92-4.93 (m, 1H), 4.74-4.78 (m, 1H), 4.57-4.61 (m, 3H), 4.38 (d, J=4.0 Hz, 1H), 4.32-4.34 (m, 2H), 4.24-4.28 (m, 2H), 4.16-4.20 (m, 1H), 4.06-4.10 (m, 1H), 3.97-4.04 (m, 4H), 3.81-3.92 (m, 4H), 3.46-3.63 (m, 3H), 3.21 (s, 3H), 3.00 (s, 3H), 2.42-2.52 (m, 2H), 2.26-2.31 (m, 2H), 1.92-2.15 (m, 5H), 1.90 (s, 3H), 1.78-1.85 (m, 2H), 1.40-1.52 (m, 4H), 1.25-1.28 (m, 6H), 1.08 (d, J=6.8 Hz, 3H), 0.97 (t, J=6.8 Hz, 3H).

Example 14

Step 1

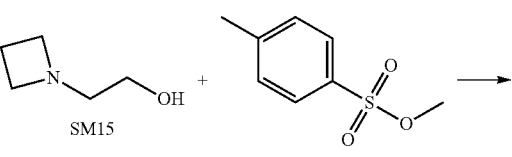

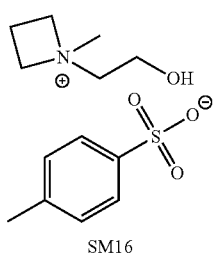
SM16
Compound SM15 (1.02 g, 10.08 mmol) was dissolved in acetonitrile (10 mL), and methyl p-toluenesulfonate (1.88 g, 10.08 mmol) was added dropwise. The reaction mixture was heated at reflux for 4 h. The solvent was removed by rotary evaporation to give crude compound SM16, which was directly used in the next step. MS: 116.1[M$^+$].
Step 2
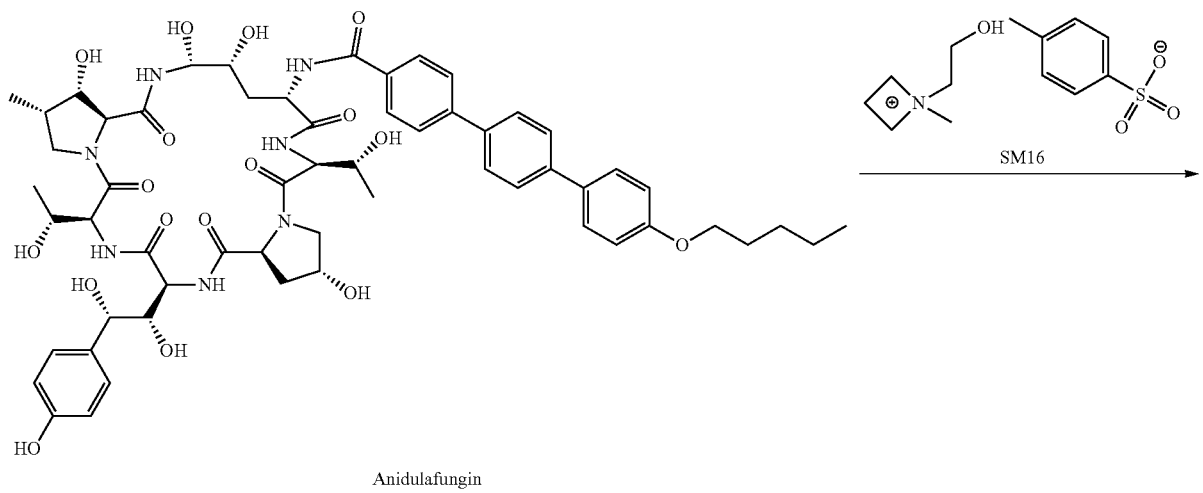
Anidulafungin
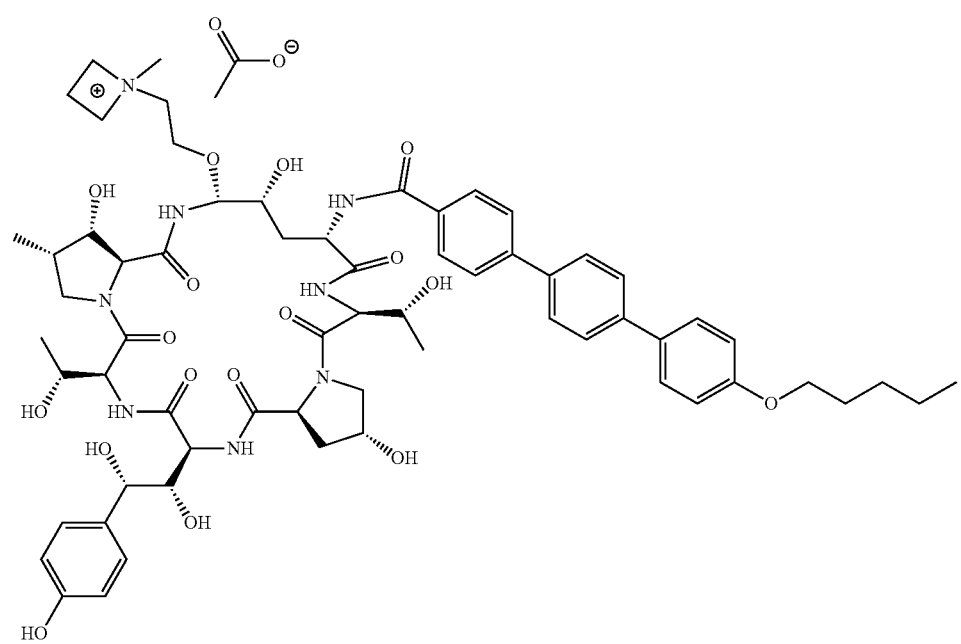

Anidulafungin (1.14 g, 1 mmol) was dissolved in tetrahydrofuran (40 mL) under nitrogen, and phenylboronic acid (244 mg, 2 mmol) was added. The reaction mixture was stirred at room temperature for 2 h and concentrated in vacuo to dryness to remove the solvent. 50 mL of dioxane was added, followed by addition of compound SM16 (2.86 g, 10 mmol) and camphorsulfonic acid (1.16 g, 5 mmol). The reaction mixture was stirred at room temperature for 16 h, quenched with 1 N aqueous sodium acetate solution (10 mL), and concentrated by rotary evaporation to remove the solvent. The resulting crude product was purified by preparative chromatography to give an acetate salt (563 mg, 95.4% purity, 43.4% yield). HRMS: 1237.6023[M$^+$].

$^1$H NMR (400 MHz, METHANOL-d$_4$) δ 7.97 (d, J=8.3 Hz, 2H), 7.80-7.82 (m, 2H), 7.69-7.76 (m, 4H), 7.61 (d, J=8.8 Hz, 2H), 7.14 (d, J=8.6 Hz, 2H), 7.01 (d, J=8.8 Hz, 2H), 6.76 (d, J=8.6 Hz, 2H), 5.35-5.36 (m, 1H), 5.02-5.03 (m, 1H), 4.86 (d, J=5.1 Hz, 1H), 4.74 (dd, J=5.3, 12.1 Hz, 1H), 4.44-4.65 (m, 5H), 4.39 (d, J=4.4 Hz, 1H), 4.31-4.33 (m, 2H), 4.22-4.26 (m, 2H), 4.06-4.20 (m, 4H), 4.02 (t, J=6.5 Hz, 3H), 3.81-3.98 (m, 4H), 3.51-3.69 (m, 2H), 3.43-3.50 (m, 1H), 3.19 (s, 3H), 2.60-2.72 (m, 1H), 2.34-2.56 (m, 3H), 2.21-2.33 (m, 1H), 1.97-2.14 (m, 2H), 1.75-1.87 (m, 5H), 1.39-1.52 (m, 4H), 1.24-1.28 (m, 6H), 1.07 (d, J=6.8 Hz, 3H), 0.92-1.01 (m, 3H).

Example 15

Step 1

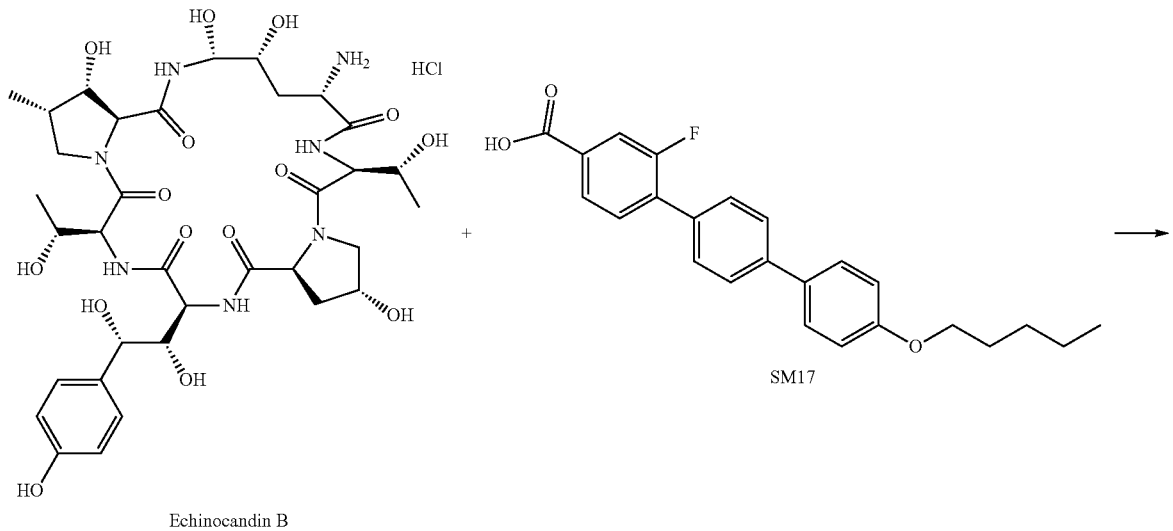

Echinocandin B

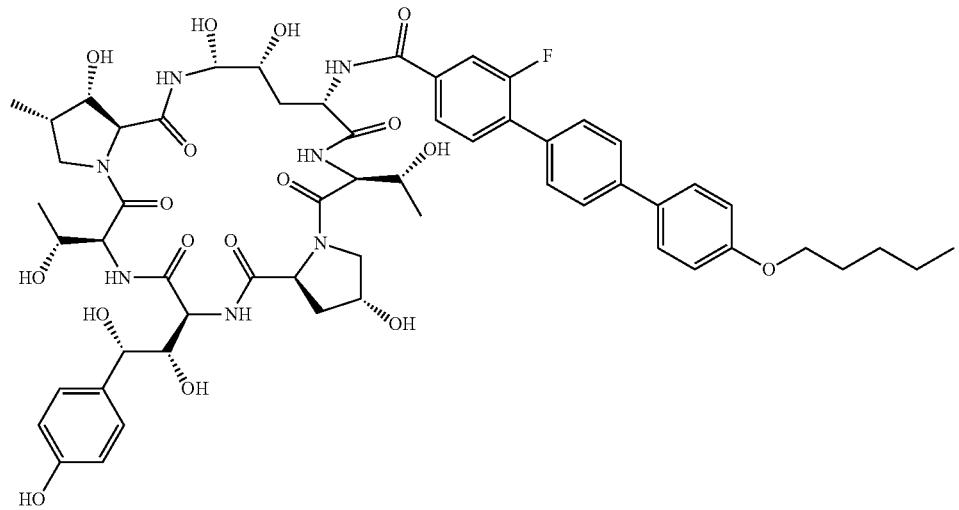

SM18

Echinocandin B (250 mg, 0.3 mmol) and SM17 (114 mg, 1.0 eq.) were dissolved in DMF (2.5 mL), and the resulting solution was stirred in an ice-water bath. TBTU (145 mg, 1.5 eq.) and DIPEA (78 mg, 2.0 eq.) were added. The reaction mixture was stirred in the ice-water bath for another hour and purified by reversed-phase column chromatography (MECN/H$_2$O) to give compound SM18 (298 mg, 97% purity, 72.6% yield). MS: 1158.5[M+1].

Step 2

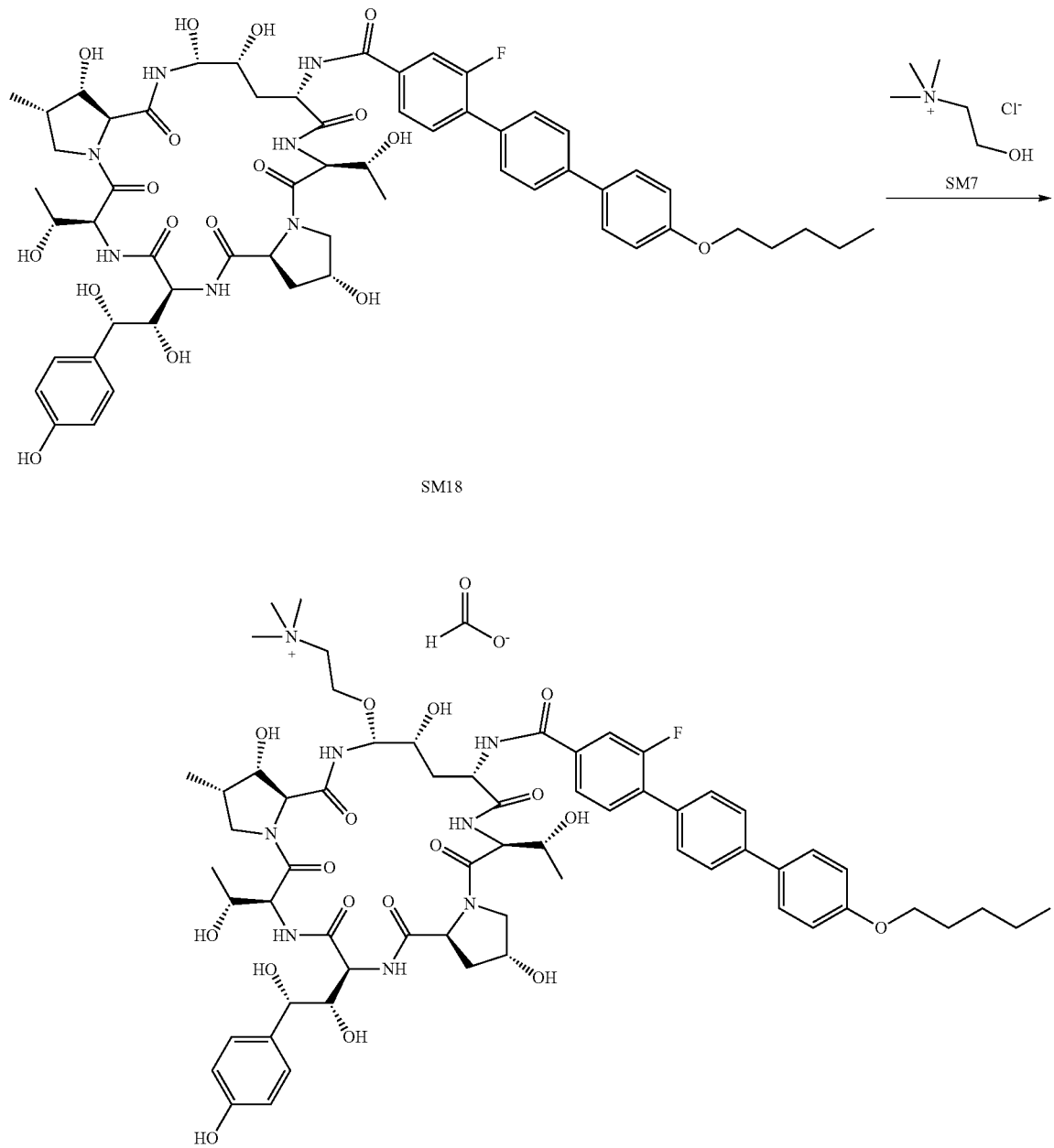

SM18 (150 mg, 0.13 mmol) was dissolved in tetrahydrofuran (7.5 mL) under nitrogen, and phenylboronic acid (31.6 mg, 0.259 mmol) was added. The reaction mixture was stirred at room temperature for 2 h and concentrated in vacuo to dryness to remove the solvent. 7.5 mL of dioxane was added, followed by addition of compound SM7 (108 mg, 0.777 mmol) and camphorsulfonic acid (150 mg, 0.65 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give a formate salt (57 mg, 97.8% purity, 34.1% yield). HRMS: 1243.5928[M$^+$].

$^1$H NMR (400 MHz, METHANOL-d$_4$) δ 8.55 (s, 1H), 7.61-7.81 (m, 9H), 7.15 (d, J=8.8 Hz, 2H), 7.02 (d, J=8.8 Hz, 2H), 6.76 (d, J=8.4 Hz, 2H), 5.37 (d, J=2.4 Hz, 11H), 5.03 (d, J=3.2 Hz, 1H), 4.71-4.76 (m, 1H), 4.58-4.61 (m, 4H), 4.14-4.40 (m, 6H), 3.81-4.08 (m, 8H), 3.46-3.65 (m, 3H), 3.16 (s, 9H), 2.42-2.54 (m, 2H), 2.25-2.31 (m, 1H), 2.01-2.12 (m, 2H), 1.78-1.85 (m, 2H), 1.38-1.53 (m, 4H), 1.25-127 (m, 6H), 1.08 (d, J=6.8 Hz, 3H), 0.97 (t, J=7.2 Hz, 3H).

Example 16

Step 1

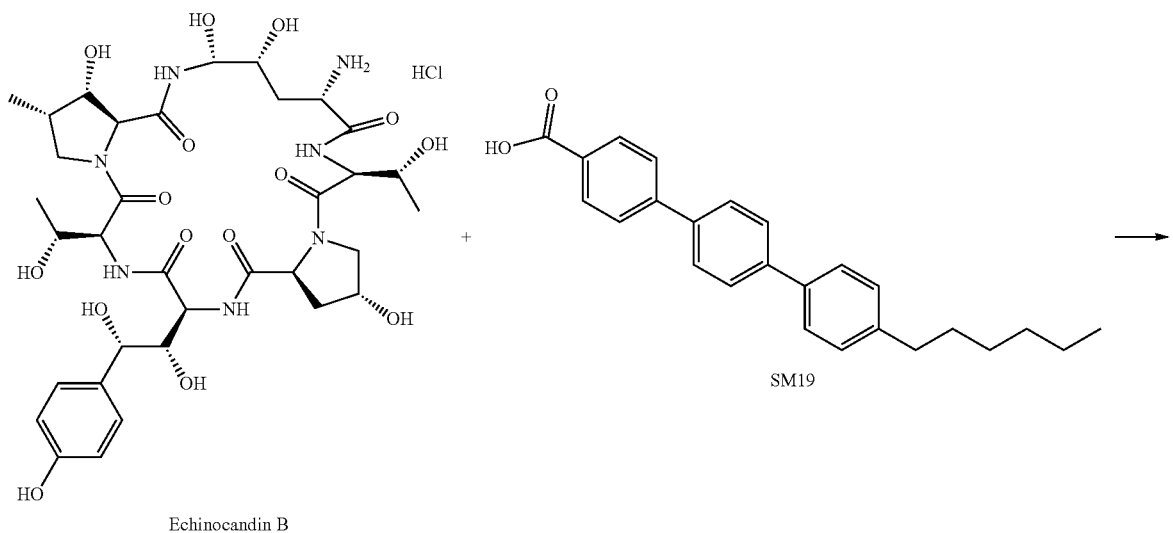

Echinocandin B

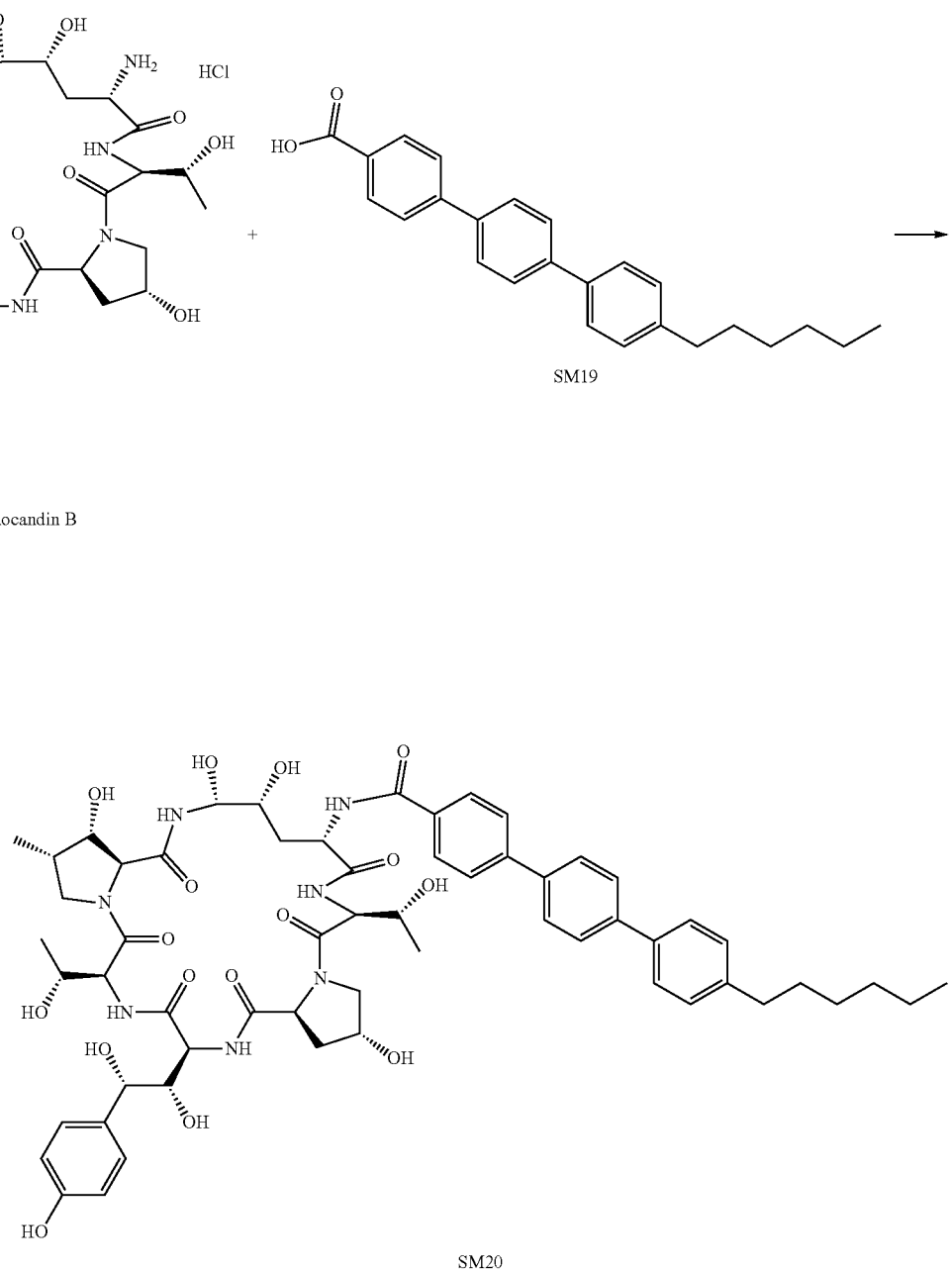

SM20

Echinocandin B (400 mg, 1.12 mmol) and SM19 (930 mg, 1.0 eq.) were dissolved in DMF (8 mL), and the resulting solution was stirred in an ice-water bath. TBTU (359 mg, 1.0 eq.) and DIPEA (288 mg, 2.0 eq.) were added. The reaction mixture was stirred in the ice-water bath for another hour and purified by reversed-phase column chromatography (MECN/$H_2O$) to give compound SM20 (890 mg, 89.6% purity, 70.1% yield). MS: 1138.5[M+1].

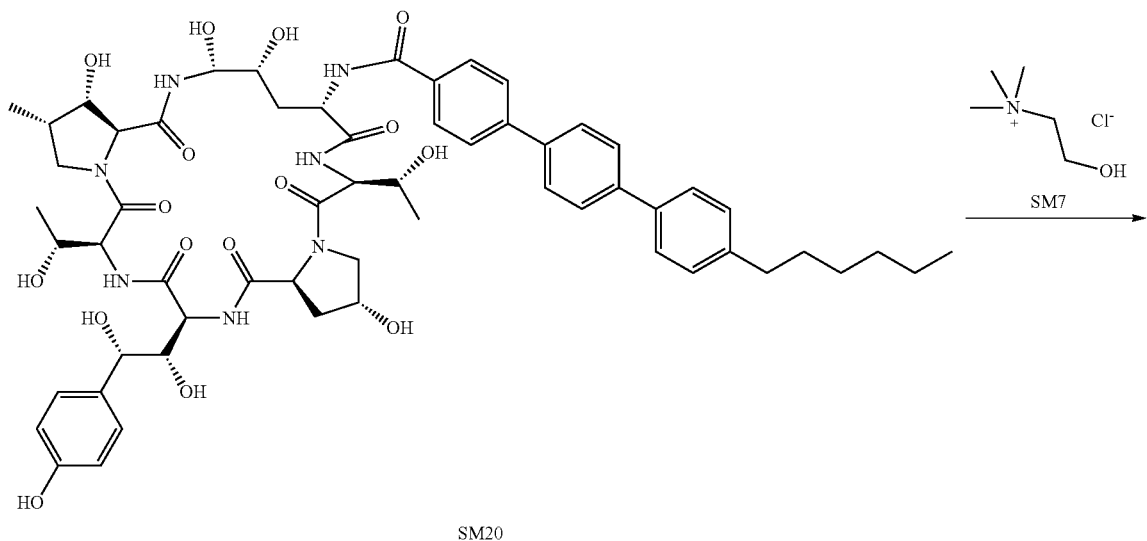

SM20

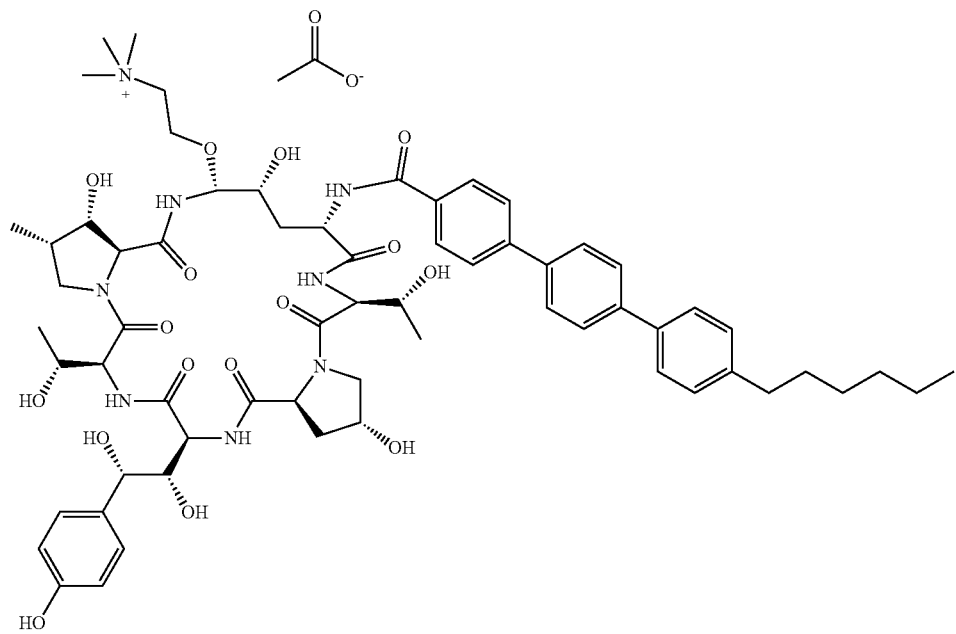

SM20 (200 mg, 0.18 mmol) was dissolved in tetrahydrofuran (4 mL) under nitrogen, and phenylboronic acid (42.8 mg, 0.351 mmol) was added. The reaction mixture was stirred at room temperature for 2 h and concentrated in vacuo to dryness to remove the solvent. 8 mL of dioxane was added, followed by addition of compound SM7 (146 mg, 1.05 mmol) and camphorsulfonic acid (204 mg, 0.88 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (123 mg, 97.6% purity, 54.6% yield). HRMS: 1223.6224[M$^+$].

$^1$H NMR (400 MHz, METHANOL-d$_4$) δ 7.98 (d, J=8.4 Hz, 2H), 7.80 (d, J=8.4 Hz, 2H), 7.72-7.78 (m, 4H), 7.59 (d, J=8.0 Hz, 2H), 7.28 (d, J=8.0 Hz, 2H), 7.15 (d, J=8.4 Hz, 2H), 6.76 (d, J=8.8 Hz, 2H), 5.42 (d, J=2.0 Hz, 11H), 5.04 (d, J=3.2 Hz, 11H), 4.87 (s, 11H), 4.74-4.78 (m, 1H), 4.56-4.61 (m, 3H), 4.16-4.40 (m, 6H), 3.81-4.11 (m, 6H), 3.46-3.62 (m, 3H), 3.14 (s, 9H), 2.64-2.68 (m, 2H), 2.42-2.53 (m, 2H), 2.26-2.29 (m, 1H), 2.04-2.12 (m, 2H), 1.91 (s, 3H), 1.62-1.68 (m, 2H), 1.35-1.40 (m, 6H), 1.26-1.27 (m, 6H), 1.07 (d, J=7.2 Hz, 3H), 0.91 (t, J=6.8 Hz, 3H).

Example 17
Step 1
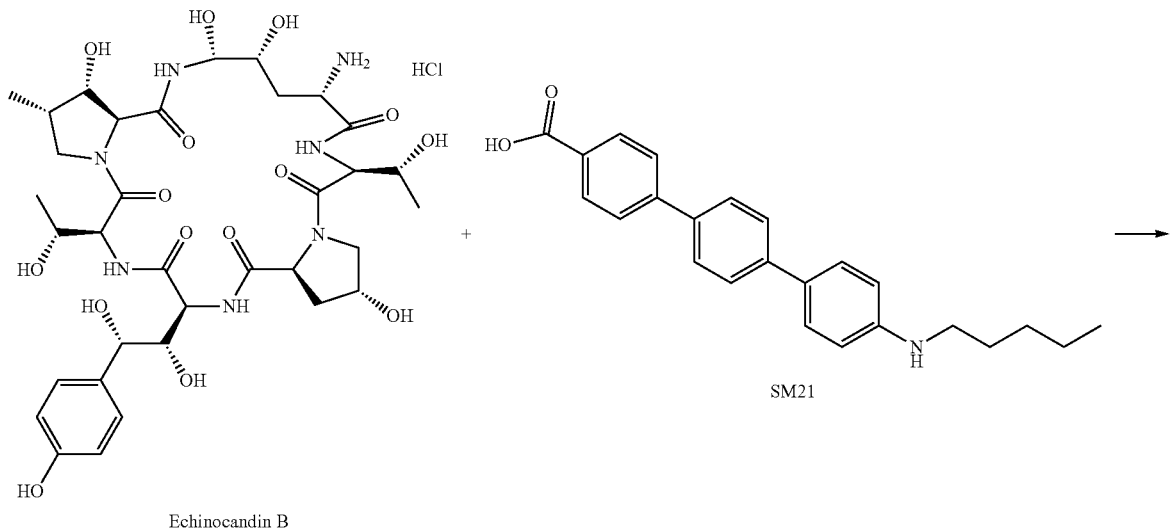
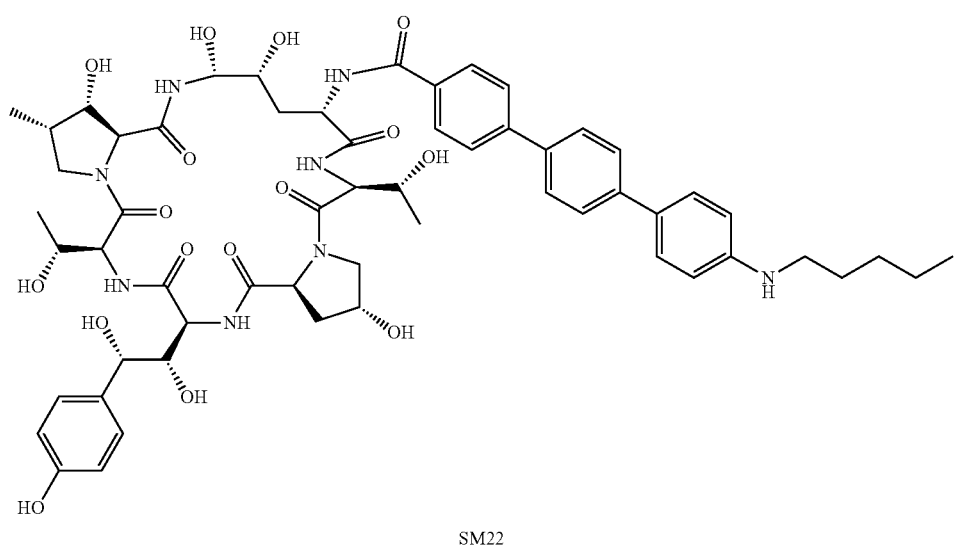
Echinocandin B (162 mg, 0.195 mmol) and SM21 (70 mg, 1.0 eq.) were dissolved in DMF (1.4 mL), and the resulting solution was stirred in an ice-water bath. TBTU (84.6 mg, 1.5 eq.) and DIPEA (50 mg, 2.0 eq.) were added. The reaction mixture was stirred in the ice-water bath for another hour and purified by reversed-phase column chromatography (MECN/H$_2$O) to give compound SM22 (94 mg, 73% purity, 32.9% yield). MS: 1139.5[M+1].

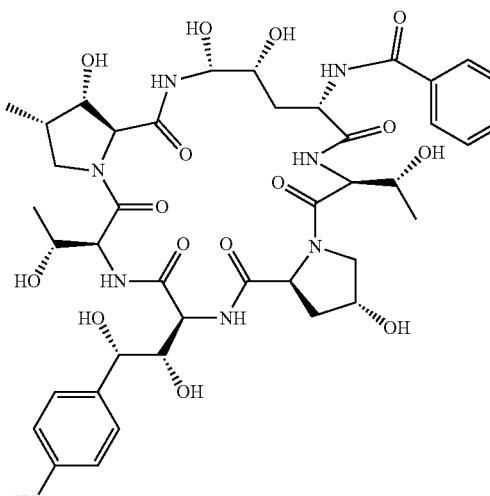 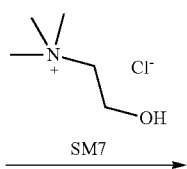

SM22

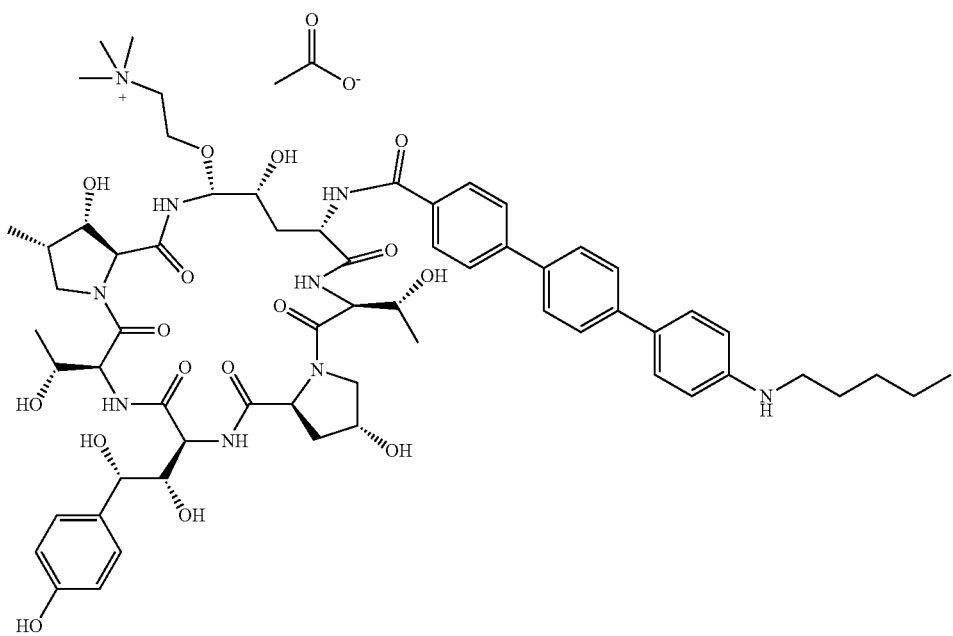

SM22 (100 mg, 0.18 mmol) was dissolved in tetrahydrofuran (2 mL) under nitrogen, and phenylboronic acid (21.4 mg, 2.0 eq) was added. The reaction mixture was stirred at room temperature for 2 h and concentrated in vacuo to dryness to remove the solvent. 4 mL of dioxane was added, followed by addition of compound SM7 (73.5 mg, 6.0 eq) and camphorsulfonic acid (102 mg, 5.0 eq). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (31 mg, 96.1% purity, 27.5% yield). HRMS: 1224.6163[M⁺].

$^1$H NMR (400 MHz, METHANOL-$d_4$) δ 7.96 (d, J=8.4 Hz, 2H), 7.79 (d, J=8.0 Hz, 2H), 7.65-7.72 (m, 4H), 7.48 (d, J=8.8 Hz, 2H), 7.15 (d, J=8.4 Hz, 2H), 6.71-6.78 (m, 4H), 5.43 (d, J=2.0 Hz, 1H), 5.04 (d, J=3.6 Hz, 1H), 4.91-4.93 (m, 1H), 4.73-4.78 (m, 1H), 4.57-4.61 (m, 3H), 4.16-4.40 (m, 6H), 3.81-4.10 (m, 6H), 3.46-3.62 (m, 3H), 3.11-3.14 (m, 11H), 2.42-2.53 (m, 2H), 2.26-2.31 (m, 1H), 2.02-2.12 (m, 2H), 1.91 (s, 3H), 1.62-1.67 (m, 2H), 1.38-1.44 (m, 4H), 1.26 (d, J=6.0 Hz, 6H), 1.08 (d, J=6.8 Hz, 3H), 0.96 (t, J=6.8 Hz, 3H).

Example 18

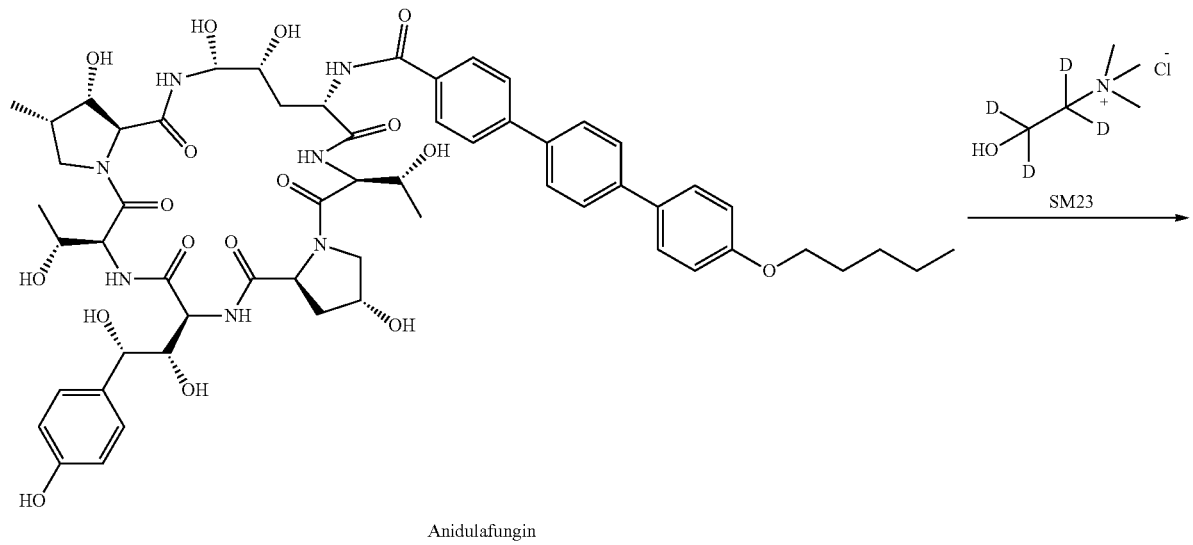

Anidulafungin

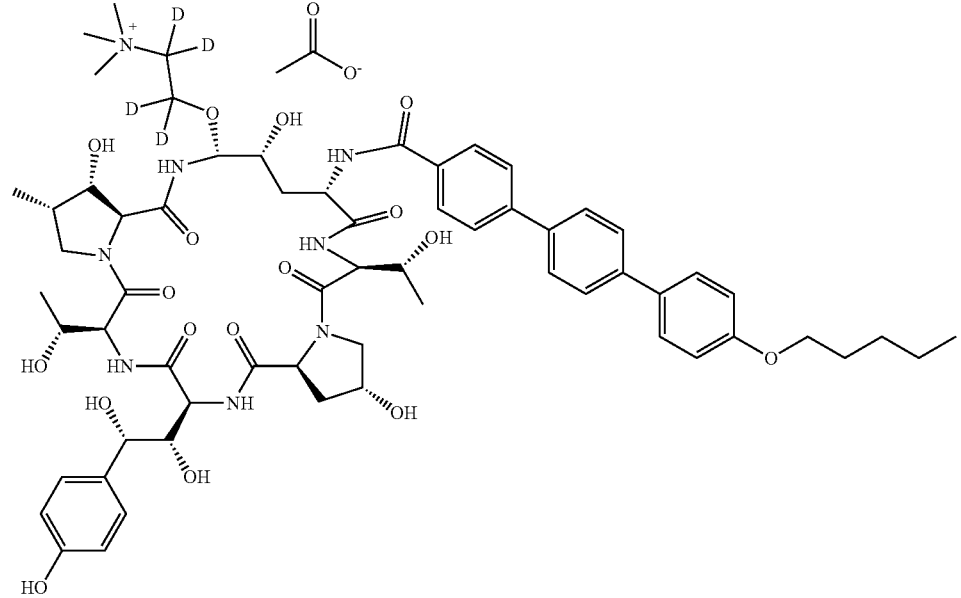

Anidulafungin (100 mg, 0.088 mmol) was dissolved in tetrahydrofuran (4 mL) under nitrogen, and phenylboronic acid (21.4 mg, 0.175 mmol) was added. The reaction mixture was stirred at room temperature for 2 h and concentrated in vacuo to dryness to remove the solvent. 4 mL of dioxane was added, followed by addition of compound SM23 (75.6 mg, 0.526 mmol) and p-toluenesulfonic acid (75.5 mg, 0.438 mmol). The reaction mixture was stirred at room temperature for 16 h, quenched with 1 N aqueous sodium acetate solution (2 mL), and concentrated by rotary evaporation to remove the solvent. The resulting crude product was purified by preparative chromatography to give an acetate salt (35 mg, 97.3% purity, 30.9% yield). HRMS: 1229.6268[M$^+$].

$^1$H NMR (400 MHz, METHANOL-d$_4$) δ 7.97 (d, J=8.4 Hz, 2H), 7.79 (d, J=8.4 Hz, 2H), 7.69-7.76 (m, 4H), 7.61 (d, J=8.8 Hz, 2H), 7.15 (d, J=8.4 Hz, 2H), 7.00 (d, J=8.8 Hz, 2H), 6.76 (d, J=8.4 Hz, 2H), 5.42 (d, J=2.4 Hz, 1H), 5.04 (d, J=2.8 Hz, 1H), 4.88 (s, 1H), 4.74-4.78 (m, 1H), 4.57-4.61 (m, 3H), 4.15-4.40 (in, 6H), 3.81-4.11 (m, 6H), 3.46-3.50 (m, 1H), 3.14 (s, 9H), 2.42-2.54 (m, 2H), 2.25-2.32 (m, 1H), 2.01-2.11 (m, 2H), 1.91 (s, 3H), 1.77-1.84 (m, 2H), 1.38-1.53 (m, 4H), 1.27 (d, J=5.6 Hz, 6H), 1.07 (d, J=7.6 Hz, 3H), 0.97 (t, J=6.8 Hz, 3H).

Example 19
Step 1
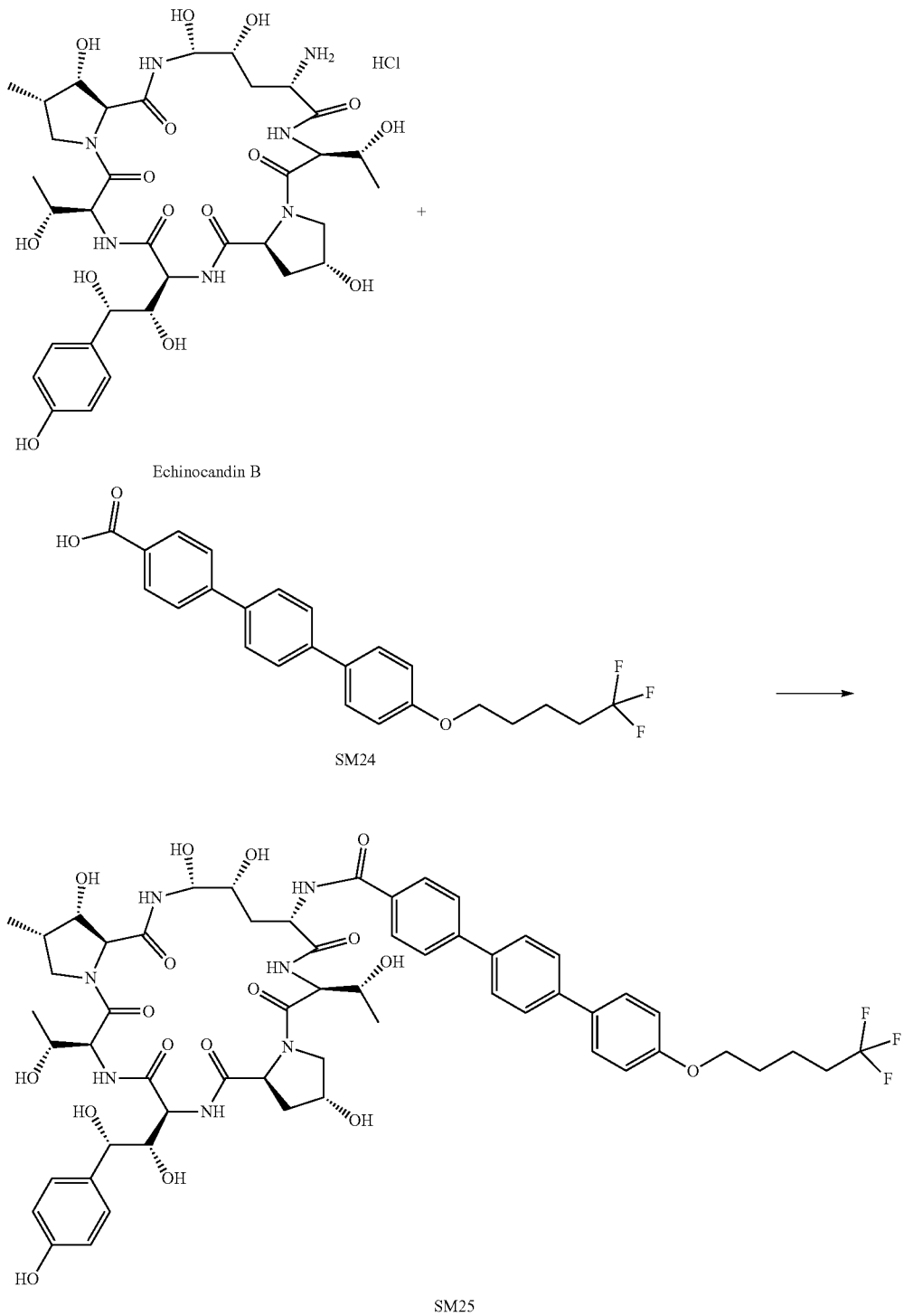
Echinocandin B (161 mg, 0.193 mmol) and SM24 (80 mg, 1.0 eq.) were dissolved in DMF (3.2 mL), and the resulting solution was stirred in an ice-water bath. TBTU (93 mg, 1.5 eq.) and DIPEA (50 mg, 2.0 eq.) were added. The reaction mixture was stirred in the ice-water bath for another hour and purified by reversed-phase column chromatography (MECN/$H_2O$) to give compound SM25 (165 mg, 95.9% purity, 71.6% yield). MS: 12194.5[M+1].

Step 2

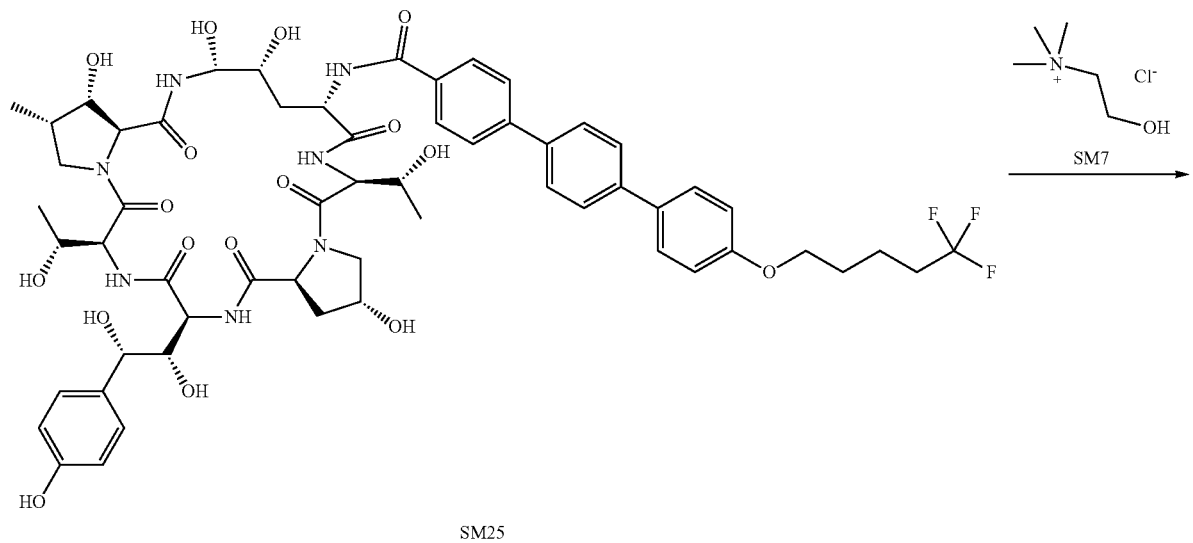

SM25

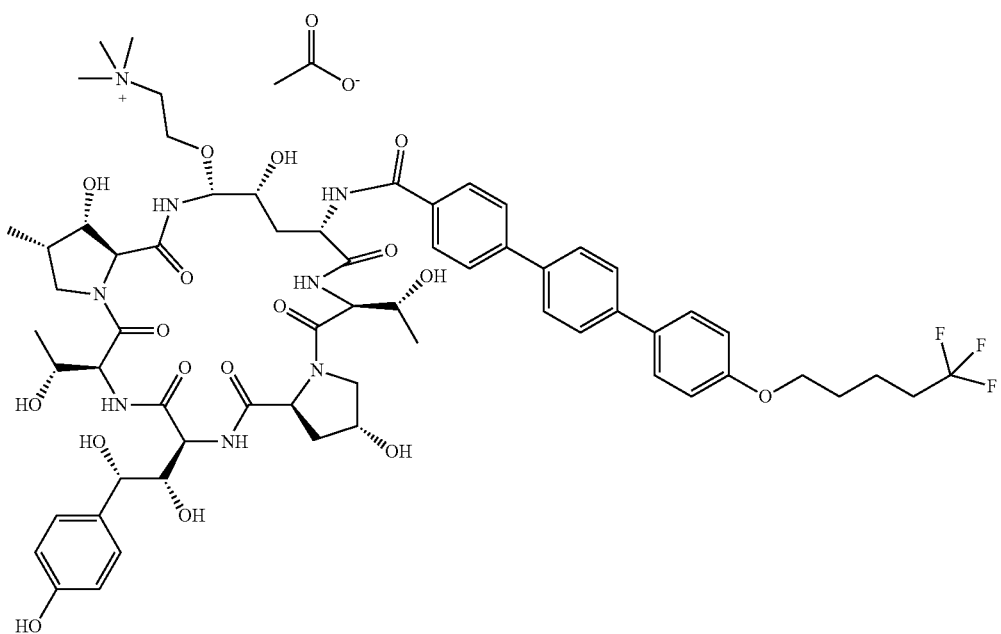

SM25 (100 mg, 0.084 mmol) was dissolved in tetrahydrofuran (4 mL) under nitrogen, and phenylboronic acid (20.4 mg, 2.0 eq) was added. The reaction mixture was stirred at room temperature for 2 h and concentrated in vacuo to dryness to remove the solvent. 4 mL of dioxane was added, followed by addition of compound SM7 (70 mg, 6.0 eq) and camphorsulfonic acid (97.6 mg, 5.0 eq). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (33 mg, 97.2% purity, 29.4% yield). HRMS: 1279.5720[M+].

$^1$H NMR (400 MHz, METHANOL-$d_4$) δ 7.97 (d, J=8.0 Hz, 2H), 7.80 (d, J=8.4 Hz, 2H), 7.69-7.76 (m, 4H), 7.62 (d, J=8.4 Hz, 2H), 7.15 (d, J=8.4 Hz, 2H), 7.03 (d, J=8.8 Hz, 2H), 6.76 (d, J=8.4 Hz, 2H), 5.42 (d, J=2.0 Hz, 1H), 5.04 (d, J=3.2 Hz, 1H), 4.88 (s, 1H), 4.73-4.78 (m, 1H), 4.57-4.61 (m, 3H), 4.16-4.40 (m, 6H), 3.81-4.11 (m, 8H), 3.46-3.62 (m, 3H), 3.15 (s, 9H), 2.42-2.53 (m, 2H), 2.23-2.32 (m, 3H), 2.04-2.11 (m, 2H), 1.93 (s, 3H), 1.87-1.90 (m, 2H), 1.76-1.82 (m, 2H), 1.26 (d, J=6.4 Hz, 6H), 1.08 (d, J=6.8 Hz, 3H).

Example 20
Step 1
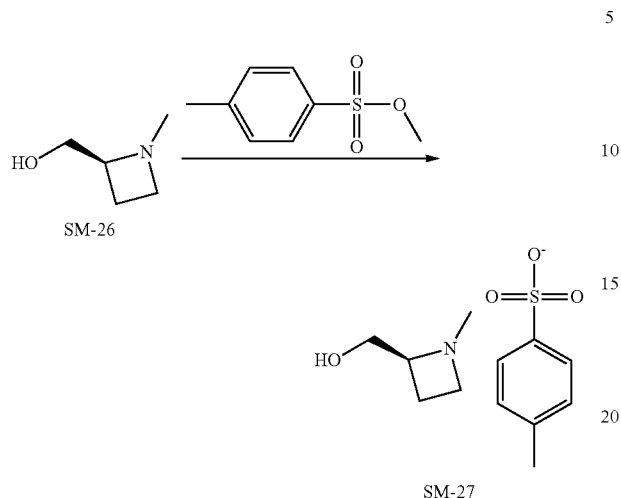
SM-26 (590 mg, 1 eq.) was dissolved in 10 mL of acetonitrile, and methyl p-toluenesulfonate (1.2 g, 1.1 eq.) was added. The reaction mixture was heated at reflux with stirring for 4 h and concentrated, and the residue was slurried with acetone petroleum ether to give compound SM-27 as a white solid (1.6 g, 95% yield). MS: 117.1[M$^+$].
Step 2
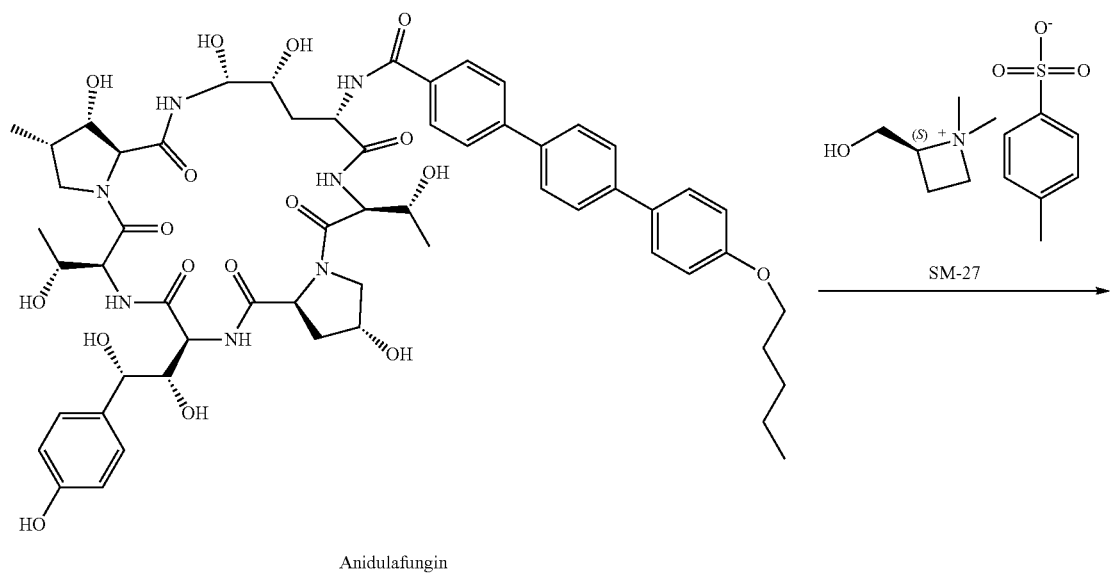

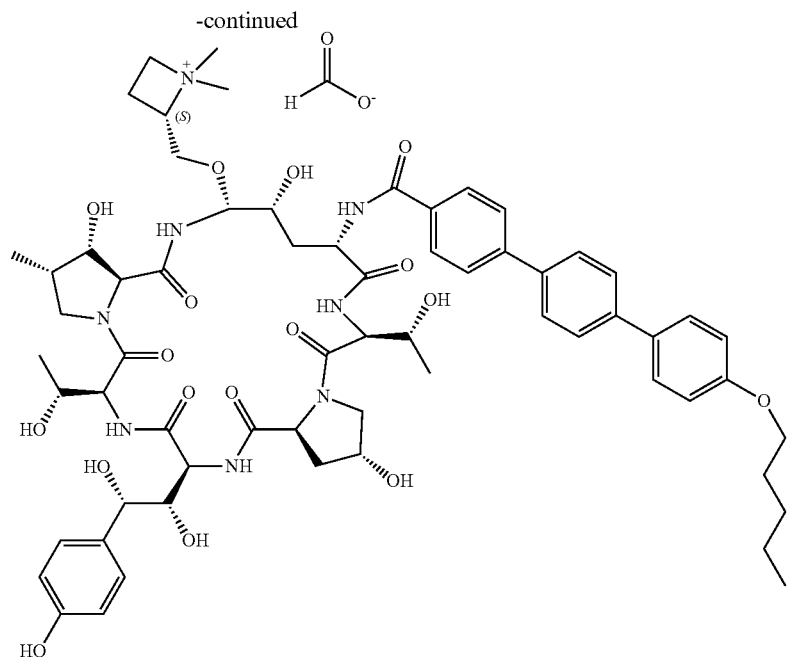

Anidulafungin (100 mg, 0.0877 mmol) and phenylboronic acid (21.39 mg, 2 eq.) were dissolved in THF (5 mL). The reaction mixture was stirred at room temperature for 1 h and concentrated to dryness. Compound SM-27 (151 mg, 6 eq.), p-toluenesulfonic acid (75.4 mg, 5 eq.) and anhydrous dioxane (5 mL) were added. The reaction mixture was stirred at room temperature under nitrogen for 5 h, quenched with aqueous sodium acetate solution, and concentrated to give a crude product, which was then purified by preparative HPLC to give a formate salt (60 mg, 97.8% purity, 55.6% yield). HRMS: 1237.6024[M$^+$].

$^1$H NMR (400 MHz, CD$_3$OD): δ 8.56 (s, 1H), 8.02 (d, 2H, J=10.8 Hz), 7.82 (d, 2H, J=8.4 Hz), 7.77 (m, 4H), 7.63 (d, 2H, J=8.4 Hz), 7.17 (d, 2H, J=8.8 Hz), 7.03 (d, 2H, J=8.8 Hz), 6.78 (d, 2H, J=8.8 Hz), 5.42 (d, 11H, J=2.4 Hz), 5.06 (d, 11H, J=2.8 Hz), 4.92-4.88 (m, 2H), 4.81-4.72 (m, 2H), 4.63-4.58 (m, 3H), 4.42 (d, 1H, J=4.0 Hz), 4.29-3.81 (m, 14H), 3.52-3.38 (m, 1H), 3.19 (s, 6H), 2.57-2.43 (m, 4H), 2.34-2.27 (m, 1H), 2.13-2.04 (m, 2H), 1.87-1.80 (m, 2H), 1.55-1.40 (m, 4H), 1.29 (d, 6H, J=6.0 Hz), 1.08 (d, 3H, J=6.8 Hz), 0.99 (t, 3H, J=6.8 Hz).

Example 21

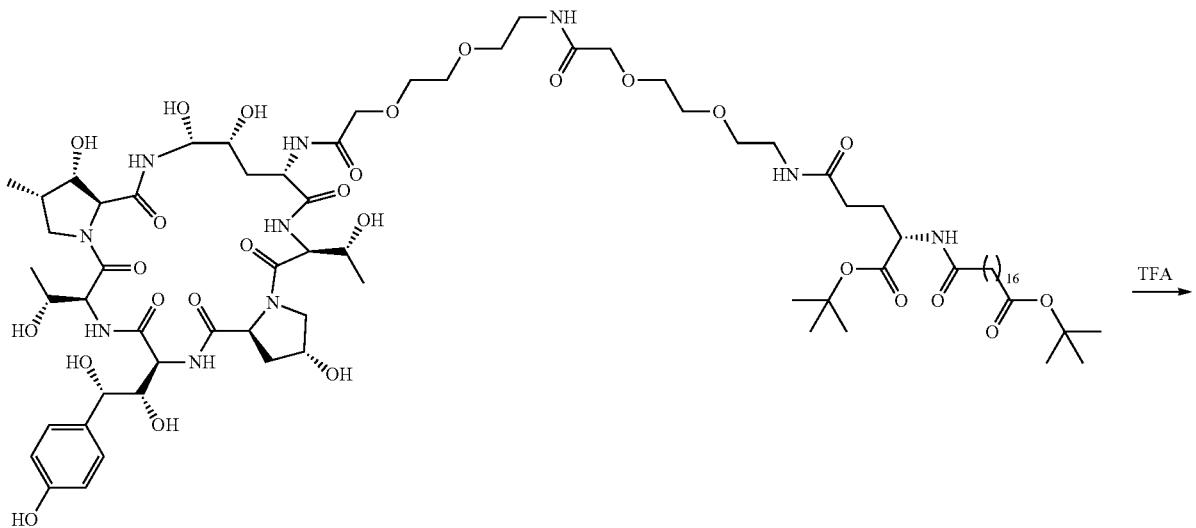

SM-28

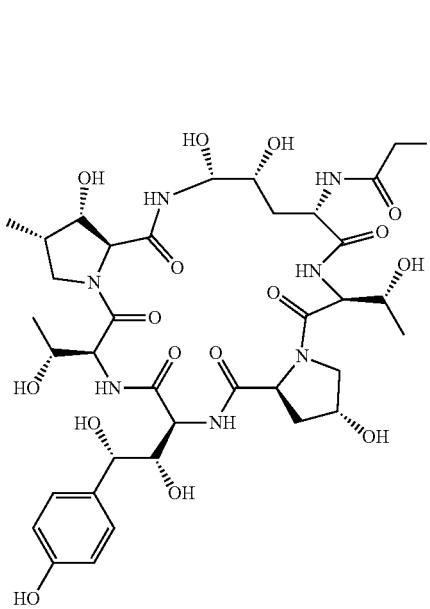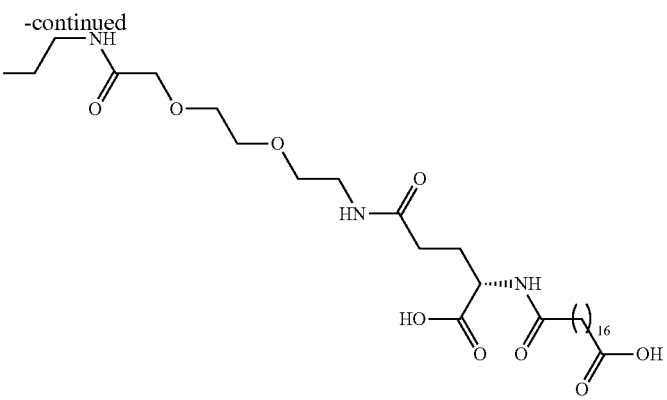

The trifluoroacetate salt of the compound of Example 6 (24 mg, 0.014 mmol) was dissolved in TFA (1 mL), and the resulting solution was stirred in an ice-water bath for 5 h and concentrated to dryness. The residue was purified by preparative HPLC to give a trifluoroacetate salt (7.2 mg, 97.8% purity, 30% yield). HRMS: 1513.7743[M+1].

Example 22

Step 1

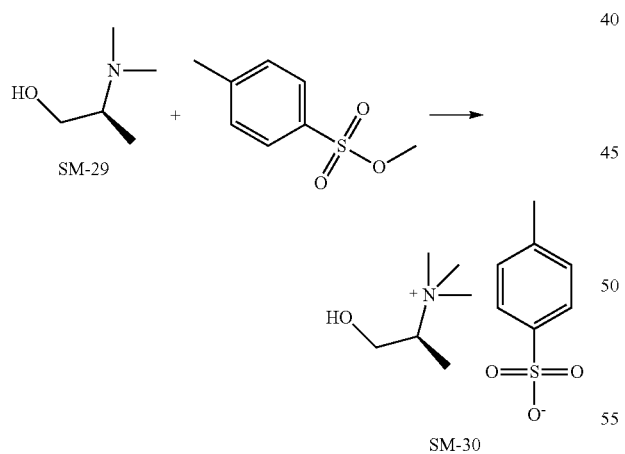

Compound SM-29 (5.4 g, 52.3 mmol) was dissolved in acetone (54 mL), and methyl p-toluenesulfonate (10.23 g, 54 mmol) was added dropwise. The reaction mixture was heated at reflux for 2 h, and a white solid precipitated. The reaction mixture was cooled to room temperature and filtered, and the filter cake was dried in vacuo to give compound SM-30 (6.5 g, 98% purity, 42.9% yield). MS: 118.12 [M$^+$].

Step 2

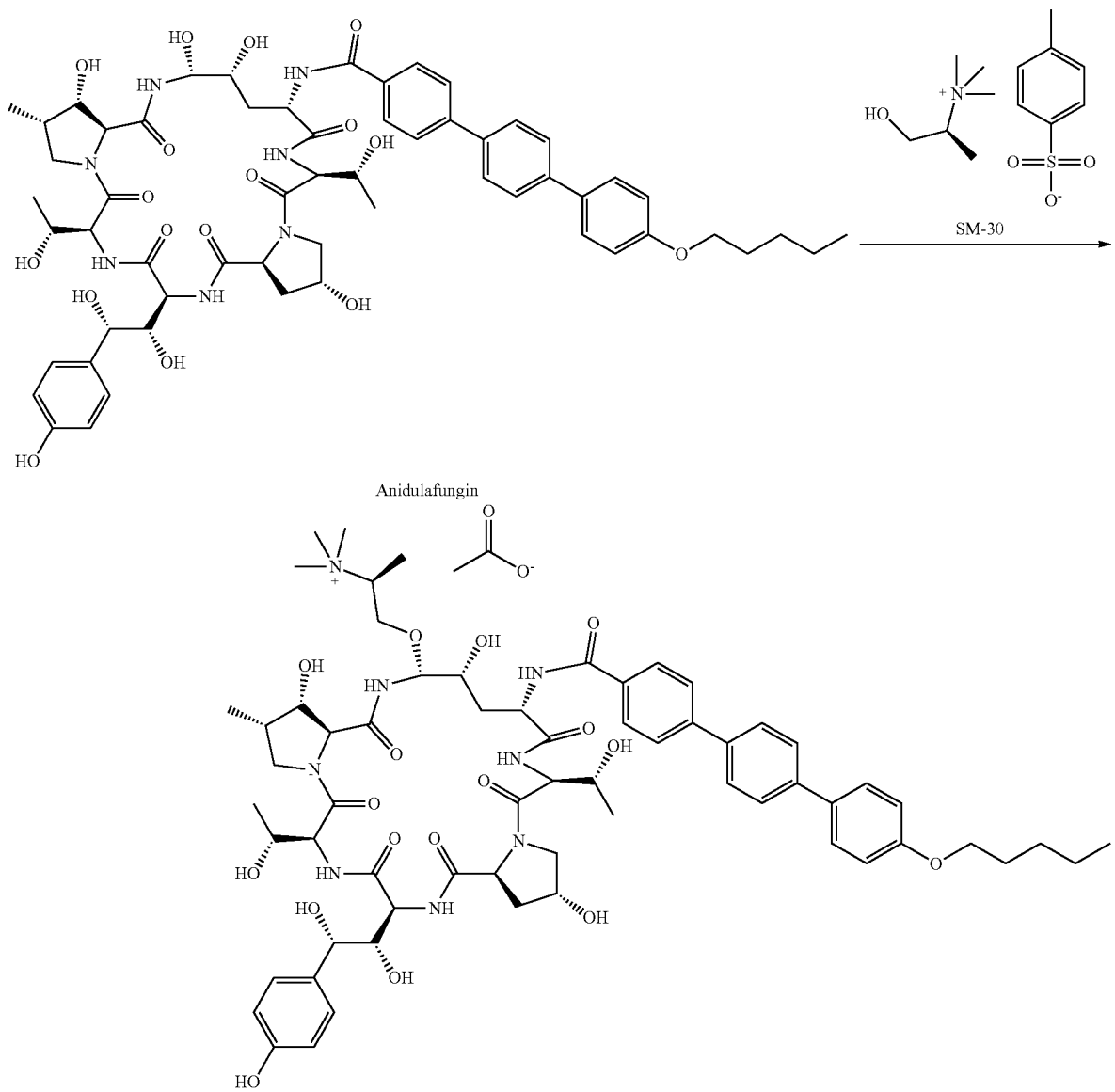

Anidulafungin (100 mg, 0.0877 mmol) and phenylboronic acid (21.39 mg, 2 eq.) were dissolved in tetrahydrofuran (4 mL) under nitrogen, and the resulting solution was stirred at room temperature for 2 h and concentrated in vacuo to dryness to remove the solvent. 4 mL of dioxane was added, followed by addition of compound SM-30 (152.3 mg, 0.526 mmol) and camphorsulfonic acid (102 mg, 0.44 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (53 mg, 96.1% purity, 46.5% yield). HRMS: 1239.6225[M+].

$^1$H NMR (400 MHz, METHANOL-$d_4$) δ 7.98 (d, J=8.4 Hz, 2H), 7.81 (d, J=7.2 Hz, 2H), 7.69-7.76 (m, 4H), 7.61 (d, J=8.8 Hz, 2H), 7.15 (d, J=8.4 Hz, 2H), 7.01 (d, J=8.8 Hz, 2H), 6.76 (d, J=8.4 Hz, 2H), 5.44 (s, 1H), 5.04 (d, J=3.2 Hz, 1H), 4.85 (m, 1H), 4.74-4.78 (m, 1H), 4.57-4.61 (m, 3H), 4.39 (d, J=4.0 Hz, 1H), 4.32-4.34 (m, 2H), 4.24-4.27 (m, 2H), 4.16-4.20 (m, 1H), 3.81-4.07 (m, 8H), 3.74 (m, 1H), 3.46-3.50 (m, 1H), 3.11 (s, 9H), 2.42-2.53 (m, 2H), 2.28-2.36 (m, 1H), 2.02-2.11 (m, 2H), 1.90 (s, 3H), 1.78-1.85 (m, 2H), 1.43-1.52 (m, 7H), 1.25-1.27 (m, 6H), 1.08 (d, J=6.4 Hz, 3H), 0.97 (t, J=7.2 Hz, 3H).

Example 23

Step 1

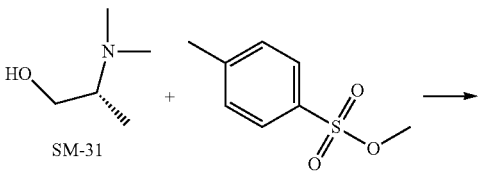

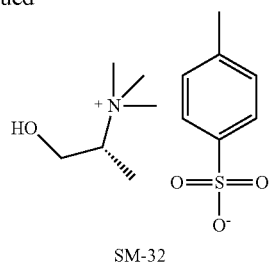
SM-32
Compound SM-31 (2.15 g, 20.84 mmol) was dissolved in acetone (21.5 mL), and methyl p-toluenesulfonate (4.08 g, 22 mmol) was added dropwise. The reaction mixture was heated at reflux for 2 h, and a white solid precipitated. The reaction mixture was cooled to room temperature and filtered, and the filter cake was dried in vacuo to give compound SM-32 (3.2 g, 98% purity, 53% yield). MS: 118.12 [M$^+$].
Step 2
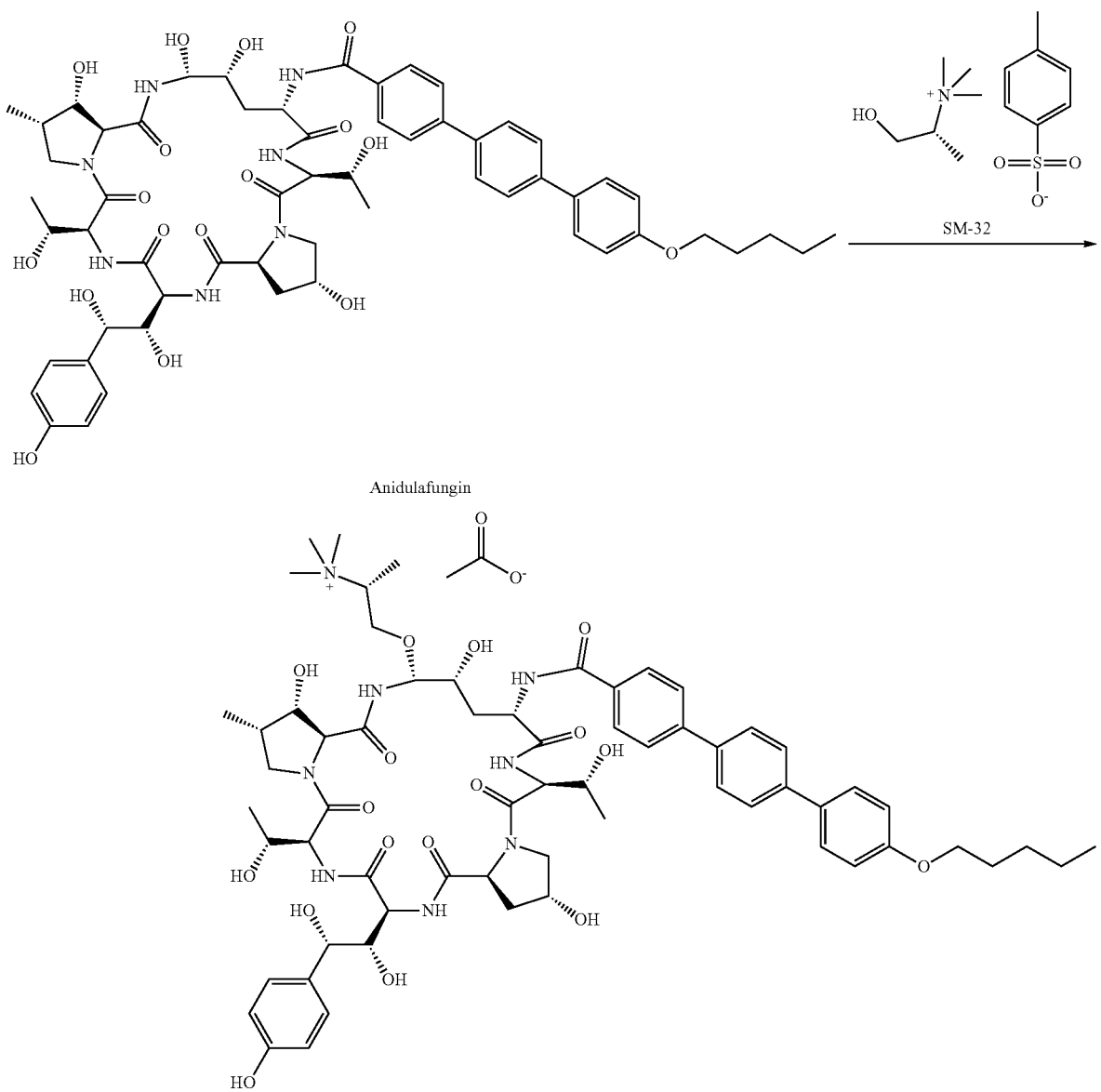

Anidulafungin (100 mg, 0.0877 mmol) and phenylboronic acid (21.39 mg, 2 eq.) were dissolved in tetrahydrofuran (4 mL) under nitrogen, and the resulting solution was stirred at room temperature for 2 h and concentrated in vacuo to dryness to remove the solvent. 4 mL of dioxane was added, followed by addition of compound SM-32 (152.3 mg, 0.526 mmol) and camphorsulfonic acid (102 mg, 0.44 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (39 mg, 99.6% purity, 34.2% yield). HRMS: 1239.6226[M$^+$].

$^1$H NMR (400 MHz, METHANOL-d$_4$) δ 7.97 (d, J=8.4 Hz, 2H), 7.69-7.81 (m, 6H), 7.61 (d, J=8.4 Hz, 2H), 7.15 (d, J=Hz 8.4 Hz, 2H), 7.01 (d, J=8.4 Hz, 2H), 6.76 (d, J=8.4 Hz, 2H), 5.34 (d, J=2.8 Hz, 11H), 5.02 (d, J=2.4 Hz, 1H), 4.85 (m, 1H), 4.73-4.78 (m, 1H), 4.57-4.61 (m, 3H), 4.39 (d, J=4.4 Hz, 1H), 4.32-4.34 (m, 2H), 4.24-4.28 (m, 2H), 4.17-4.21 (m, 1H), 3.79-4.10 (m, 8H), 3.66 (m, 1H), 3.46-3.50 (m, 1H), 3.12 (s, 9H), 2.42-2.53 (m, 2H), 2.25-2.31 (m, 1H), 2.03-2.11 (m, 2H), 1.89 (s, 3H), 1.78-1.84 (m, 2H), 1.37-1.53 (m, 7H), 1.25-1.28 (m, 6H), 1.08 (d, J=6.8 Hz, 3H), 0.97 (t, J=7.2 Hz, 3H).

Example 24

Step 1

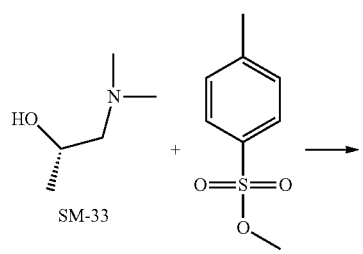

SM-33

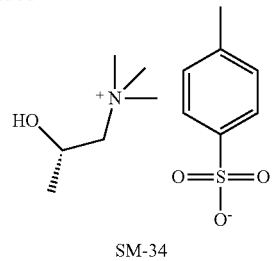

SM-34

Compound SM-33 (2.2 g, 21.3 mmol) was dissolved in acetone (22 mL), and methyl p-toluenesulfonate (4.17 g, 22.4 mmol) was added dropwise. The reaction mixture was heated at reflux for 2 h, and a white solid precipitated. The reaction mixture was cooled to room temperature and filtered, and the filter cake was dried in vacuo to give compound SM-34 (2.05 g, 98% purity, 33% yield). MS: 118.12 [M$^+$].

Step 2

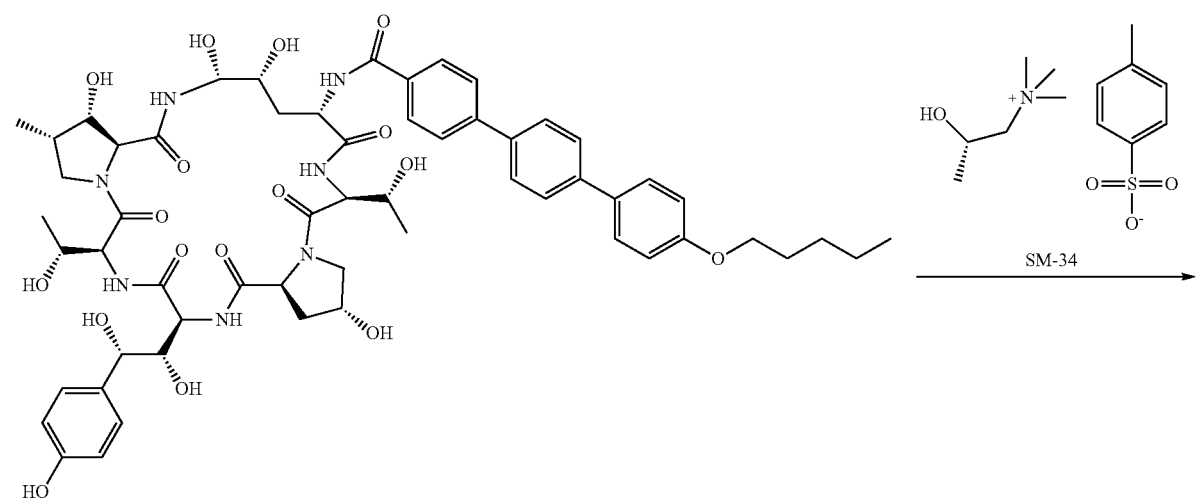

Anidulafungin

-continued

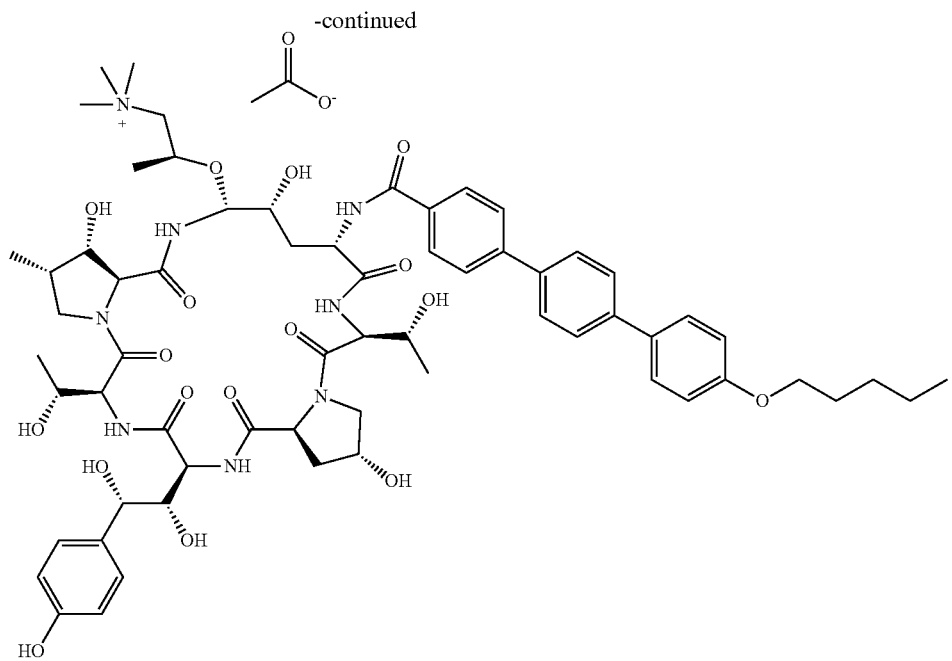

Anidulafungin (100 mg, 0.0877 mmol) and phenylboronic acid (21.39 mg, 2 eq.) were dissolved in tetrahydrofuran (4 mL) under nitrogen, and the resulting solution was stirred at room temperature for 2 h and concentrated in vacuo to dryness to remove the solvent. 4 mL of dioxane was added, followed by addition of compound SM-34 (152.3 mg, 0.526 mmol) and camphorsulfonic acid (102 mg, 0.44 mmol). The reaction mixture was stirred at room temperature for 16 h, quenched with 1 N aqueous sodium acetate solution (1 mL), and concentrated by rotary evaporation to remove the solvent. The resulting crude product was purified by preparative chromatography to give an acetate salt (29 mg, 97.5% purity, 25.4% yield). HRMS: 1239.6223[M$^+$].

$^1$H NMR (400 MHz, METHANOL-d$_4$) δ 7.96 (d, J=7.2 Hz, 2H), 7.69-7.80 (m, 6H), 7.61 (d, J=8.4 Hz, 2H), 7.15 (d, J=8.8 Hz, 2H), 7.01 (d, J=7.6 Hz, 2H), 6.76 (d, J=8.4 Hz, 2H), 5.50 (s, 1H), 5.04 (d, J=3.2 Hz, 1H), 4.85 (m, 1H), 4.78-4.79 (m, 1H), 4.55-4.60 (m, 3H), 4.30-4.36 (m, 4H), 4.22-4.27 (m, 2H), 4.16-4.20 (m, 1H), 3.80-4.10 (m, 6H), 3.52-3.55 (m, 1H), 3.34-3.43 (m, 2H), 3.18 (s, 9H), 2.42-2.51 (m, 2H), 2.24-2.30 (m, 1H), 2.05-2.13 (m, 2H), 1.90 (s, 3H), 1.78-1.84 (m, 2H), 1.40-1.51 (m, 4H), 1.27 (t, J=7.2 Hz, 6H), 1.20 (d, J=5.2 Hz, 3H), 1.07 (d, J=7.2 Hz, 3H), 0.97 (t, J=6.8 Hz, 3H).

Example 25

Step 1

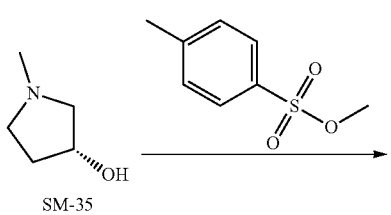

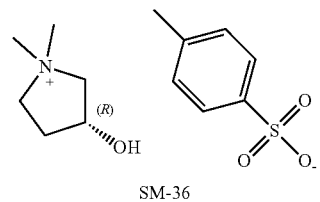

SM-35 (505 mg, 1 eq.) was dissolved in 5 mL of acetone, and methyl p-toluenesulfonate (1.02 g, 1.1 eq.) was added. The reaction mixture was stirred at room temperature for 2 h and filtered, and the filter cake was rinsed with acetone to give compound SM-36 as a white solid (1.22 g, 85% yield). MS: 116.2[M$^+$].

Step 2

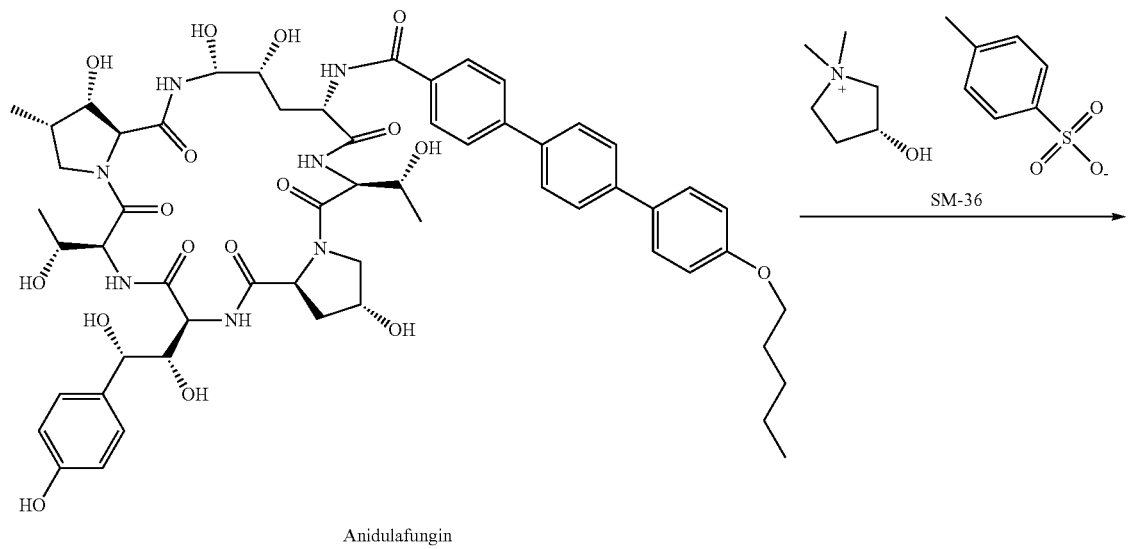

Anidulafungin

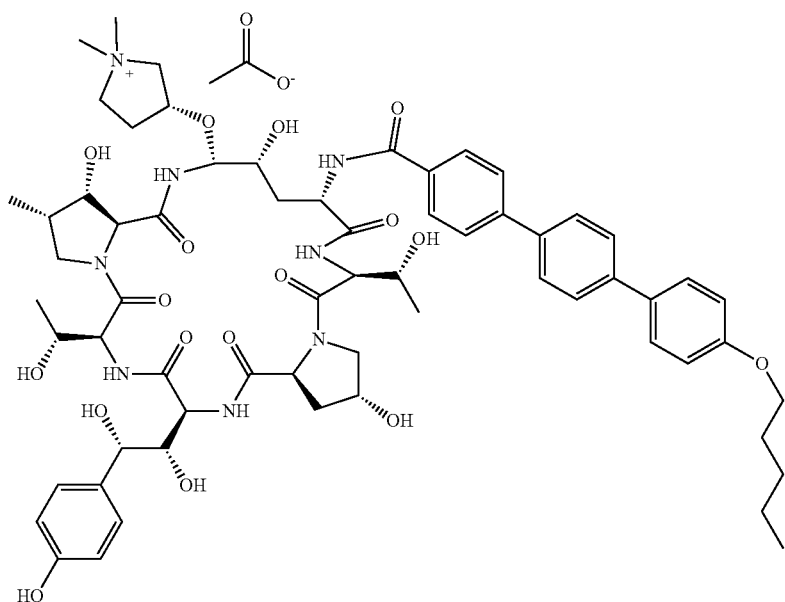

Anidulafungin (100 mg, 0.0877 mmol) and phenylboronic acid (21.39 mg, 2 eq.) were dissolved in tetrahydrofuran (4 mL) under nitrogen, and the resulting solution was stirred at room temperature for 2 h and concentrated in vacuo to dryness to remove the solvent. 4 mL of dioxane was added, followed by addition of compound SM-36 (151.2 mg, 0.526 mmol) and camphorsulfonic acid (102 mg, 0.44 mmol). The reaction mixture was stirred at room temperature for 16 h, quenched with 1 N aqueous sodium acetate solution (1 mL), and concentrated to give a crude product, which was then purified by preparative HPLC to give an acetate salt (50 mg, 96.2% purity, 44% yield). HRMS: 1238.4225[M$^+$].

$^1$H NMR (400 MHz, METHANOL-d$_4$): δ 8.02 (d, 2H, J=8.4 Hz), 7.84 (d, 2H, J=8.0 Hz), 7.78-7.71 (m, 4H), 7.63 (d, 2H, J=6.8 Hz), 7.17 (d, 2H, J=8.8 Hz), 7.03 (d, 2H, J=8.8 Hz), 6.81 (d, 2H, J=7.2 Hz), 5.52 (d, 1H, J=1.6 Hz), 5.08 (d, 1H, J=3.2 Hz), 4.84-4.76 (m, 1H), 4.63-4.60 (m, 6H), 4.42 (d, 1H, J=4.4 Hz), 4.36-4.33 (m, 2H), 4.27-4.23 (m, 2H), 4.18-4.15 (m, 1H), 4.06-4.00 (m, 4H), 3.96-3.90 (m, 2H), 3.86-3.83 (m, 1H), 3.74-3.46 (m, 4H), 3.18 (s, 3H), 3.11 (s, 3H), 2.60-2.30 (m, 4H), 2.10-2.04 (m, 2H), 1.91 (s, 3H), 1.85-1.80 (m, 2H), 1.53-1.40 (m, 4H), 1.29-1.26 (m, 6H), 1.10 (d, 3H, J=7.2 Hz), 0.99 (t, 3H, J=7.2 Hz).

Example 26
Step 1
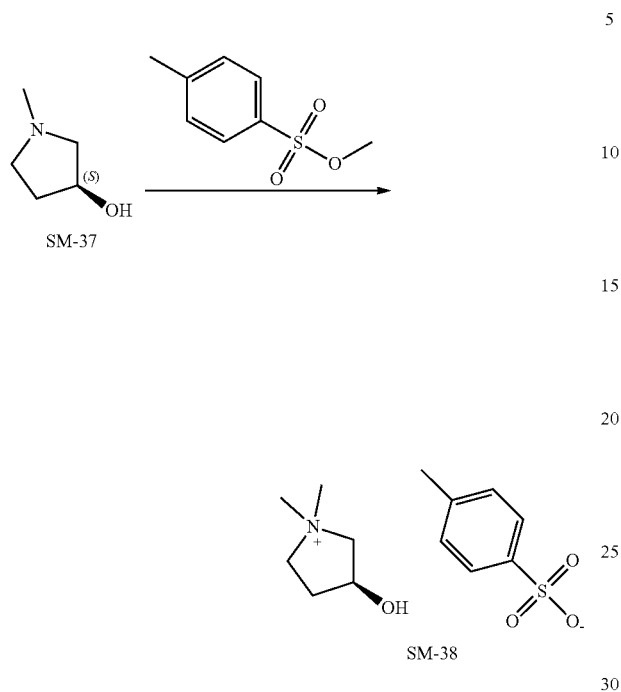
SM-37 (505 mg, 1 eq.) was dissolved in 5 mL of acetone, and methyl p-toluenesulfonate (1.02 g, 1.1 eq.) was added. The reaction mixture was stirred at room temperature for 2 h and filtered, and the filter cake was rinsed with acetone to give compound SM-38 as a white solid (1.29 g, 90% yield). MS: 116.2[M$^+$].
Step 2
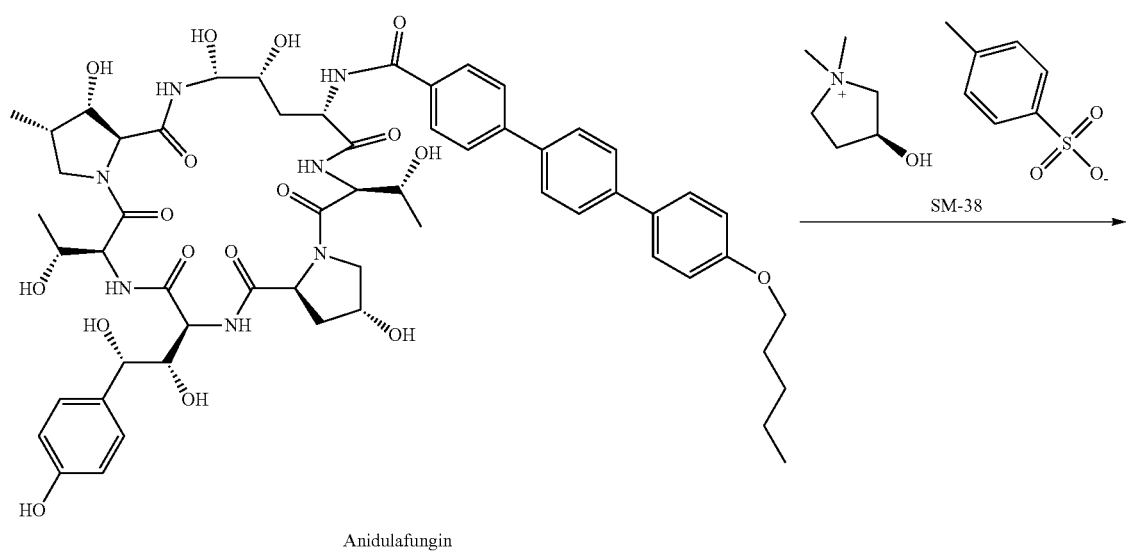

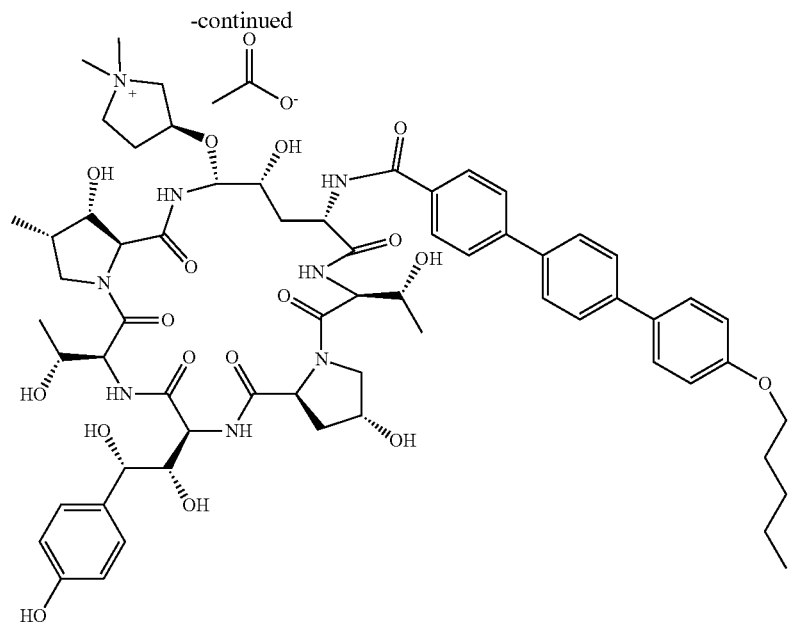

Anidulafungin (100 mg, 0.0877 mmol) and phenylboronic acid (21.39 mg, 2 eq.) were dissolved in tetrahydrofuran (4 mL) under nitrogen, and the resulting solution was stirred at room temperature for 2 h and concentrated in vacuo to dryness to remove the solvent. 4 mL of dioxane was added, followed by addition of compound SM-38 (151.2 mg, 0.526 mmol) and camphorsulfonic acid (102 mg, 0.44 mmol). The reaction mixture was stirred at room temperature for 16 h, quenched with 1 N aqueous sodium acetate solution (1 mL), and concentrated to give a crude product, which was then purified by preparative HPLC to give an acetate salt (40 mg, 96.2% purity, 34% yield). HRMS: 1238.4225[M$^+$].

$^1$H NMR (400 MHz, METHANOL-d$_4$): δ 8.00 (d, 2H, J=8.4 Hz), 7.82 (d, 2H, J=8.4 Hz), 7.78-7.71 (m, 4H), 7.63 (d, 2H, J=8.8 Hz), 7.17 (d, 2H, J=8.8 Hz), 7.03 (d, 2H, J=8.8 Hz), 6.78 (d, 2H, J=8.4 Hz), 5.44 (d, 1H, J=2.4 Hz), 5.06 (d, 1H, J=2.8 Hz), 4.83-4.77 (m, 1H), 4.63-4.60 (m, 6H), 4.42 (d, 1H, J=4.0 Hz), 4.36-4.33 (m, 2H), 4.27-4.25 (m, 2H), 4.20-4.18 (m, 1H), 4.06-4.00 (m, 4H), 3.94-3.90 (m, 2H), 3.86-3.78 (m, 1H), 3.71-3.46 (m, 4H), 3.25 (s, 3H), 3.19 (s, 3H), 2.58-2.41 (m, 4H), 2.32-2.28 (m, 2H), 1.92 (s, 3H), 1.86-1.80 (m, 2H), 1.53-1.40 (m, 4H), 1.32-1.27 (m, 6H), 1.10 (d, 3H, J=7.2 Hz), 0.99 (t, 3H, J=7.2 Hz).

High Resolution Mass Spectrometry Method:

| Instrument | Thermo-UltiMate 3000 Q Exactive |
| --- | --- |
| Chromatography column | Waters BEH C18 1.7 U 2.1 × 50 mm |
| Mobile phase | A: 0.1% FA in water  B: 0.1% FA in acetonitrile |

| Gradient | Time (min) | B(%) |
| --- | --- | --- |
| | 0 | 10 |
| | 1 | 10 |
| | 5 | 90 |
| | 7 | 90 |
| | 9 | 10 |

| Column temperature | 40° C. |
| --- | --- |
| Flowrate | 0.3 mL/min |

| Conditions for mass spectrometry | Polarity: Scanning range: | Positive polarity 100-1500 m/z 133-2000 m/z |
| --- | --- | --- |

Test Example 1: Test Method for Antifungal Activity

After a test compound was serially diluted, an MIC (minimum inhibitory concentration) assay was performed on the standard *Candida* strain and an MEC (minimum effective concentration) assay on the standard *Aspergillus* strain. The MIC assay was performed according to the guidelines of the Clinical and Laboratory Standards Institute (CLSI M27-A3) and the MEC assay according to the guidelines of the Clinical and Laboratory Standards Institute (CLSI M38-A2).

Preparation of Fungal Inoculation Liquid

*Candida:*

The frozen strain was passaged at least twice, and a single colony was picked and resuspended in normal saline or sterile water in a tube. The suspension was vortexed and adjusted to 0.5 McF (1×10$^6$ to 5×10$^6$ CFU/mL) using a spectrophotometer at wavelength 530 nm. The suspension was 50-fold diluted with normal saline and then 20-fold diluted with 1×RPMI 1640 broth (1×10$^3$ to 5×10$^3$ CFU/mL). 10 μL of the suspension was applied to an SDA plate for colony counting, with a range from about 10 to 50 single colonies.

After complete dissolution was achieved at room temperature in the prepared susceptibility testing plate, the bacterial suspension was added to a 96-well plate at 100 μL per well using a multi-channel pipette. At this time, the bacterium concentration in each well should be 0.5×10$^3$ to 2.5×10$^3$ CFU/mL.

*Aspergillus* (Operation in Class II Biosafety Cabinet):

*Aspergillus* was passaged onto an SDA plate and cultured at 35° C. for 48 h to 7 d to induce sporulation. Colonies on the plate were covered with about 1 mL of 0.85% normal saline or sterile water (polysorbate 20 was added at a final concentration of 0.1%-0.01%). The medium was gently wiped on its surface with a tip or a sterile cotton swab (be careful not to break the medium), and the spore hyphae suspension was transferred to a sterile tube and let stand for 3-5 min so that the heavy particles settled. The homogeneous upper layer of the suspension was transferred to a new sterile tube, which was then sealed and vortexed for 15 s (be careful as the suspension may produce an aerosol when the cover is removed). The concentration of the suspension was adjusted until an OD value of 0.09-0.13 was achieved using a spectrophotometer at 530 nm. The suspension was 50-fold diluted with 1×RPMI 1640. 100 µL of sample was added to each well of the 96-well plate within 2 h after dilution (the final spore concentration in the susceptibility testing plate was at $0.4 \times 10^4$ to $5 \times 10^4$ CFU/mL). Colony counting: The suspension diluted with RPMI 1640 was further diluted 10-fold, and 10 µL of the dilution was applied to an SDA plate, cultured at 28° C., and observed every day; colonies were immediately counted upon being visible to the naked eye.

Culture

The assay plate for yeast-type fungi was incubated in an incubator at 35° C. with 85% humidity for 24 h, and then the MIC value was read. For echinocandin drugs, *Aspergillus* was incubated at 28° C. for 21-26 h, and then the MEC results were read.

MIC or MEC Interpretation

Yeast-type fungi: A disposable sealing film was applied to the 96-well plate, and the mixture was well mixed by shaking. Observation was performed through a plate reader with the naked eye. Comparisons were made to the growth control, and the minimum compound concentration corresponding to ≥50% growth inhibition was defined as MIC. Pictures were taken and saved using an automatic plate reader.

*Aspergillus*: For echinocandin drugs, comparisons were made to the growth control under a plate reader, and the minimum drug concentration that could cause the hyphae to form small, round, compact hyphal particles was defined as MEC. For accurate determination of MEC values, the plate must not be vortexed before reading.

TABLE 1

Bacteriostatic activity assay results for compounds (first batch)

| Compound | Initial assay concentration (µg/mL) | *Candida albicans* ATCC 90029 | *Candida glabrata* ATCC 15126 | *Candida parapsilosis* ATCC 22019 | *Candida krusei* ATCC 6258 | *Meyerozyma guilliermondii* ATCC 6260 | *Candida tropicalis* ATCC 750 | *Aspergillus flavus* ATCC 28539 |
|---|---|---|---|---|---|---|---|---|
| Anidulafungin | 16 | 0.016 | 0.125 | 0.5 | 0.063 | 1 | 0.016 | 0.031 |
| Caspofungin acetate | 16 | 0.063 | 0.25 | 1 | 1 | 1 | 0.016 | 0.031 |
| Rezafungin acetate | 16 | 0.125 | 0.125 | 2 | 0.25 | 2 | 0.016 | 0.031 |
| Final product of Example 5 | 16 | 0.125 | 0.125 | 2 | 0.125 | 4 | 0.016 | 0.031 |
| Final product of Example 10 | 16 | 0.25 | 0.5 | 2 | 0.5 | 4 | 0.031 | 0.031 |
| Final product of Example 1 | 16 | 0.031 | 0.031 | 1 | 0.031 | 2 | 0.016 | 0.031 |
| Final product of Example 2 | 16 | 0.125 | 0.125 | 1 | 0.125 | 2 | 0.016 | 0.031 |
| Final product of Example 3 | 16 | 0.031 | 0.25 | 2 | 0.25 | 2 | 0.016 | 0.031 |
| Final product of Example 7 | 16 | 2 | 4 | 4 | 4 | 2 | 4 | 16 |
| Final product of Example 11 | 16 | 0.125 | 0.5 | 4 | 0.5 | 2 | 0.031 | 0.031 |
| Final product of Example 13 | 16 | 0.031 | / | 1 | 0.047 | 1 | 0.016 | 0.031 |

Note:
1. *Candida parapsilosis* ATCC 22019 and *Candida krusei* ATCC6258 were quality control strains. According to CLSI-M60, the 24 h MIC of ANI for ATCC 22019 is (0.25-2) µg/mL, and that of CAS is (0.25-1) µg/mL; the 24 h MIC of ANI for ATCC6258 is (0.03-0.12) µg/mL, and that of CAS is (0.12-1) µg/mL.

TABLE 2

Bacteriostatic activity assay results for compounds (second batch)

| Compound | Initial assay concentration (µg/mL) | *Candida albicans* ATCC 90028 | *Candida albicans* + 50% human serum ATCC 90028 | *Candida albicans* ATCC 44858 | *Candida glabrata* ATCC 36583 | *Candida albicans* (azole drug-resistant strain) R357 | *Candida albicans* (azole drug-resistant strain) R358 | *Candida tropicalis* (amphotericin-resistant strain) ATCC 200956 |
|---|---|---|---|---|---|---|---|---|
| Rezafungin acetate | 16 | 0.25 | 0.25 | 0.25 | 0.25 | 0.25 | 0.25 | 0.25 |

TABLE 2-continued

Bacteriostatic activity assay results for compounds (second batch)

| Compound | Initial assay concentration (μg/mL) | Candida albicans ATCC 90028 | Candida albicans + 50% human serum ATCC 90028 | Candida albicans ATCC 44858 | Candida glabrata ATCC 36583 | Candida albicans (azole drug-resistant strain) R357 | Candida albicans (azole drug-resistant strain) R358 | Candida tropicalis (amphotericin-resistant strain) ATCC 200956 |
|---|---|---|---|---|---|---|---|---|
| Final product of Example 13 | 16 | 0.25 | 0.25 | 0.25 | 0.5 | 0.5 | 0.25 | 0.25 |
| Final product of Example 16 | 16 | 0.25 | 0.5 | 0.25 | 0.25 | 0.25 | 0.25 | 0.25 |
| Final product of Example 17 | 16 | 0.25 | 0.25 | 0.25 | 0.5 | 0.5 | 0.25 | 0.25 |
| Final product of Example 22 | 16 | 0.25 | 0.25 | 0.25 | 0.5 | 0.5 | 0.25 | 0.25 |
| Final product of Example 23 | 16 | 0.25 | 0.25 | 0.25 | 0.25 | 0.25 | 0.125 | 0.25 |
| Final product of Example 24 | 16 | 0.25 | 0.25 | 0.125 | 0.25 | 0.5 | 0.0625 | 0.125 |
| Final product of Example 25 | 16 | 0.25 | 0.125 | 0.125 | 0.25 | 0.25 | 0.25 | 0.25 |
| Final product of Example 26 | 16 | 0.25 | 0.25 | 0.25 | 0.25 | 0.5 | 0.25 | 0.25 |

The assay data show that a significant number of the example compounds of the present disclosure have excellent antifungal activity, and some of the compounds have more excellent antifungal activity compared to the positive drugs.

Test Example 2: Plasma Histamine Concentrations of Compounds and Pharmacokinetic Study Test Method:
12 SD rats were divided into 2 groups of 6 (half are male and half female). The rats were observed at least once a day. The body weights were measured once before administration. Administration was performed by single intravenous injection for 20 min per animal. PK measurement was performed once before administration and 5 min, 30 min, 1 h, 4 h, 8 h, 24 h, 48 h, 72 h and 96 h after administration. A histamine assay was performed once before administration and 30 min, 4 h, 8 h and 24 h after administration.

The dose design is shown in the table below:

| Group | Route of administration | Dose for administration (mg/kg) | Concentration for administration (mg/mL) | Volume for administration (mL/kg) | Number of animals Male | Number of animals Female |
|---|---|---|---|---|---|---|
| 1 (Example 13 final product group) | Intravenous injection | 10 | 2 | 5 | 3 | 3 |
| 2 (Rezafungin acetate group) | Intravenous injection | 10 | 2 | 5 | 3 | 3 |

The Results are Mainly as Follows:
General State Observation
A transient slight decrease in activity occurred in 2 females in group 2 (⅔ of the rats) on the day of administration.

Apart from that, the SD rats in each group were in good general conditions, showed normal spontaneous locomotor activity, had clean skin and hair, and showed normal defecation and urination, and no other abnormality was observed.

Figure 2:
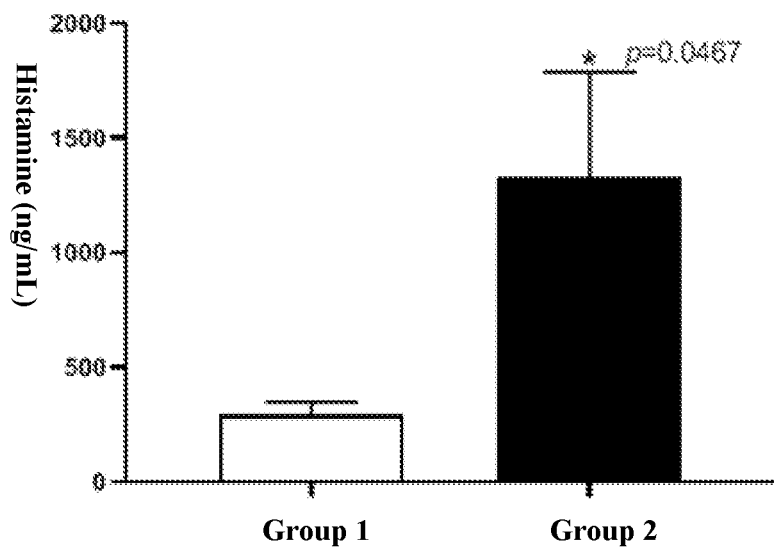
FIG. 2 shows a comparison of the histamine concentrations at 30 min after intravenous administration of compounds.

Histamine Assay
A transient increase in the histamine level was caused in both group 1 and group 2 by intravenous administration. The plasma histamine concentration peaked at 30 min, showed a tendency to recover at 4 h, and substantially returned to the normal level at 8-24 h, as shown in FIG. 1. 30 min after administration, the mean histamine concentration in the plasma of the rats in group 2 was 1333.0 ng/mL, which is 4.5 times significantly ($p=0.046$) higher than that in group 1 (296.6 ng/mL), as shown in FIG. 2. The ability of the group 1 compound to induce increases in the histamine level in rats is significantly lower than that of the group 2 compound when they are administered at the same dose.

Pharmacokinetics

The pharmacokinetic parameters in animals after administration to group 1 or group 2 are shown in the table below:

| Group | Sex | $T_{1/2}$ h | $C_{max}$ µg/mL | $AUC_{0-96}$ hr*µg/mL | $AUC_{0-inf}$ hr*µg/mL | CL mL/min/kg | $MRT_{IV}$ hr | $Vd_{SS}$ L/kg |
|---|---|---|---|---|---|---|---|---|
| 1 | Male | 27.7 | 8.0 | 173.9 | 191.2 | 0.9 | 37.1 | 1.9 |
|   | Female | 25.5 | 9.3 | 179.6 | 195.0 | 0.9 | 34.6 | 1.8 |
| 2 | Male | 28.0 | 7.8 | 190.5 | 212.1 | 0.8 | 38.4 | 1.8 |
|   | Female | 27.9 | 8.6 | 205.8 | 227.2 | 0.8 | 39.1 | 1.8 |

The assay data show that after administration at the same dose by single intravenous injection, group 1 and group 2 are close to each other in the plasma drug exposure levels ($C_{max}$ and AUC) and shows no significant sex-related difference, and the other pharmacokinetic parameters each have substantially equivalent values for both groups. In conclusion, after administration at the same dose (10 mg/kg) by single intravenous injection, the plasma drug exposure levels of the final product of Example 13 and rezafungin acetate are close, while the ability of the final product of Example 13 to induce increases in the histamine level in rats is significantly lower than that of rezafungin acetate, suggesting that the final product of Example 13, when applied clinically, will not easily cause allergies compared to rezafungin.

The invention claimed is:

1. A compound of formula I or a pharmaceutically acceptable salt or isomer thereof,

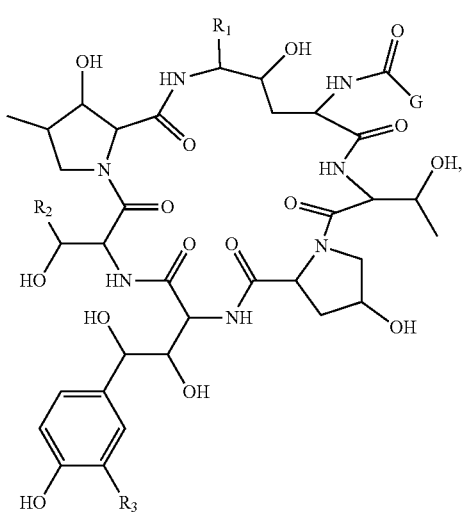

I wherein $R_1$ is selected from the group consisting of:

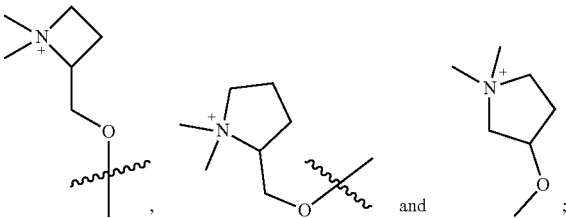

$R_2$ is selected from the group consisting of hydrogen, $R_{B1}R_{B2}N-$, $CH_2CH_2NR_{B1}R_{B2}$, $CH_2C(O)NR_{B1}R_{B2}$, $C_{1-10}$ alkyl, $C_{2-10}$ alkenyl, $C_{2-10}$ alkynyl, aryl, heteroaryl, cyclohydrocarbyl, heterocyclyl and PEG, wherein said PEG is polyethylene glycol;

$R_3$ is selected from the group consisting of H, $OSO_3H$ and $CH_2NR_{B1}R_{B2}$;

G is a $C_{10-36}$ lipophilic unit, or

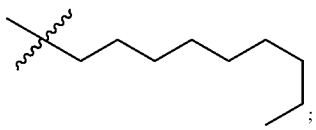 [SMILES: *CCCCCCCCC]

$R_{B1}$ and $R_{B2}$ are independently selected from the group consisting of H, $-C(O)R_J$ and $C_{1-10}$ alkyl; and $R_J$ is independently selected from the group consisting of hydrogen, deuterium, $C_{1-10}$ alkyl, cyclohydrocarbyl and cyclohydrocarbylene.

2. The compound or the pharmaceutically acceptable salt or isomer thereof according to claim 1, wherein the pharmaceutically acceptable salt is selected from the group consisting of an acetate salt, a trifluoroacetate salt and a formate salt.

3. A pharmaceutical composition comprising the compound or the pharmaceutically acceptable salt or isomer thereof according to claim 1, and a pharmaceutically acceptable excipient.

4. The compound of formula I or the pharmaceutically acceptable salt or isomer thereof according to claim 1, wherein the compound of formula I is:

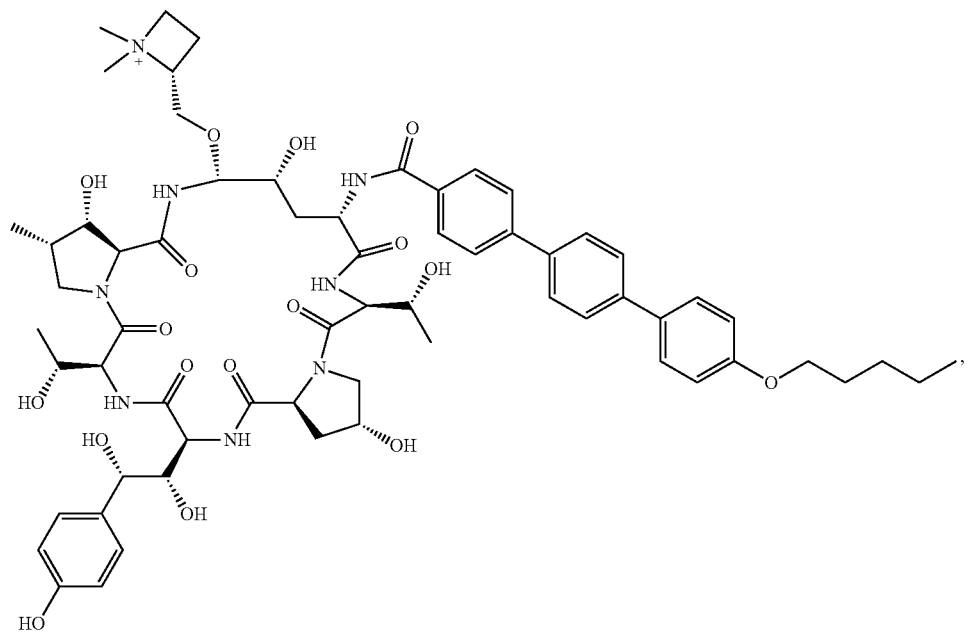
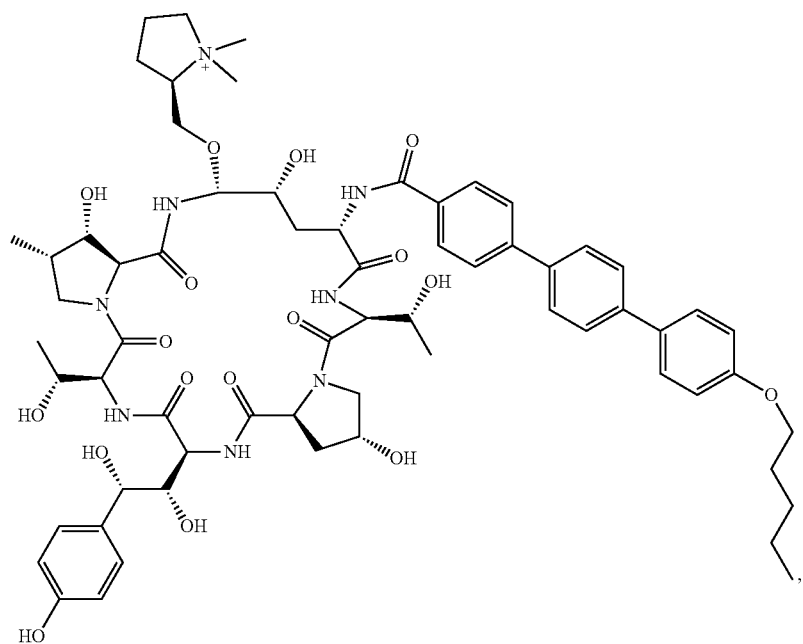

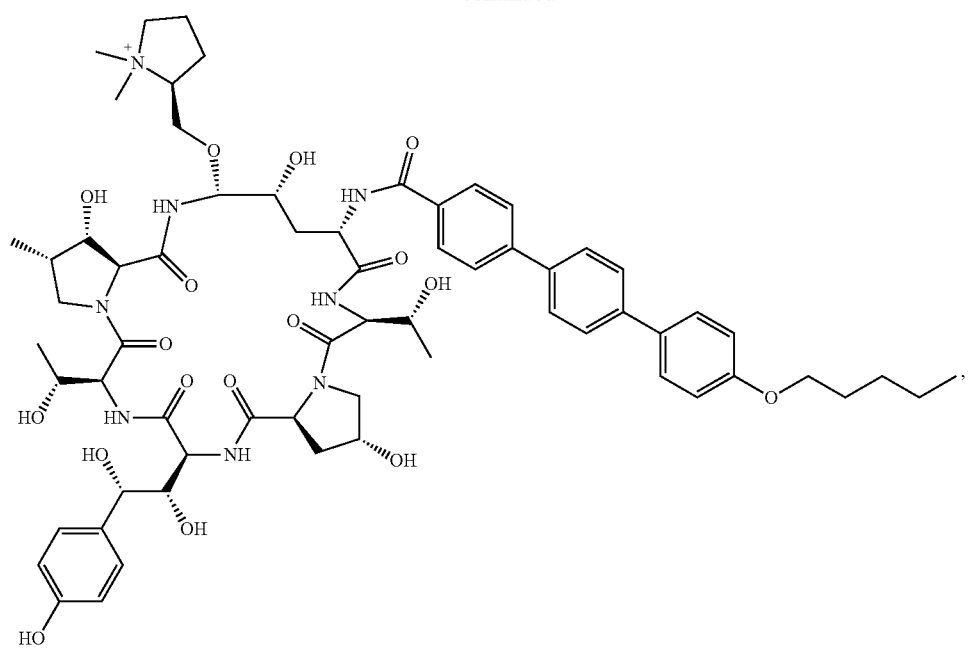
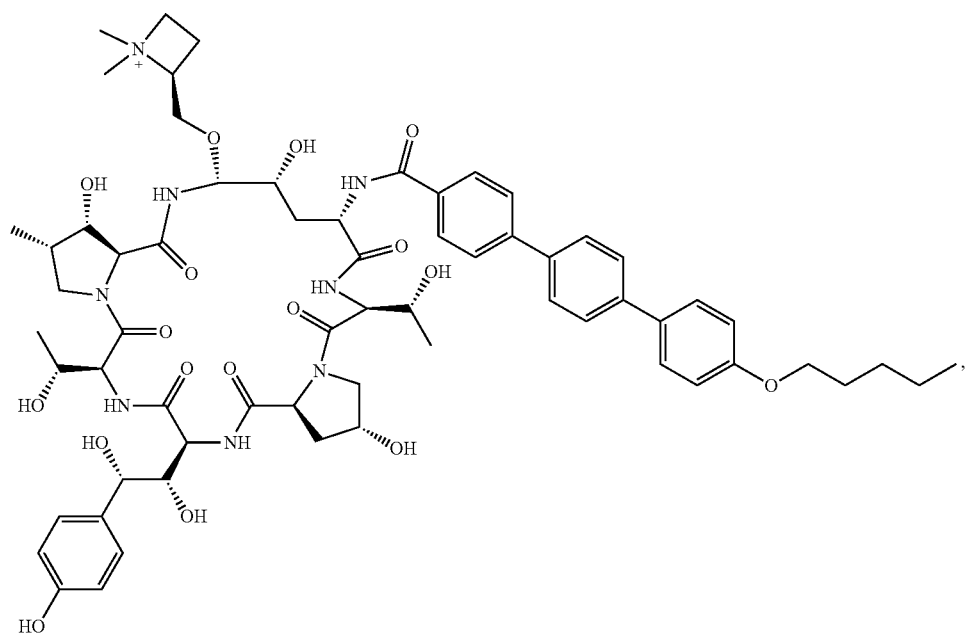

-continued
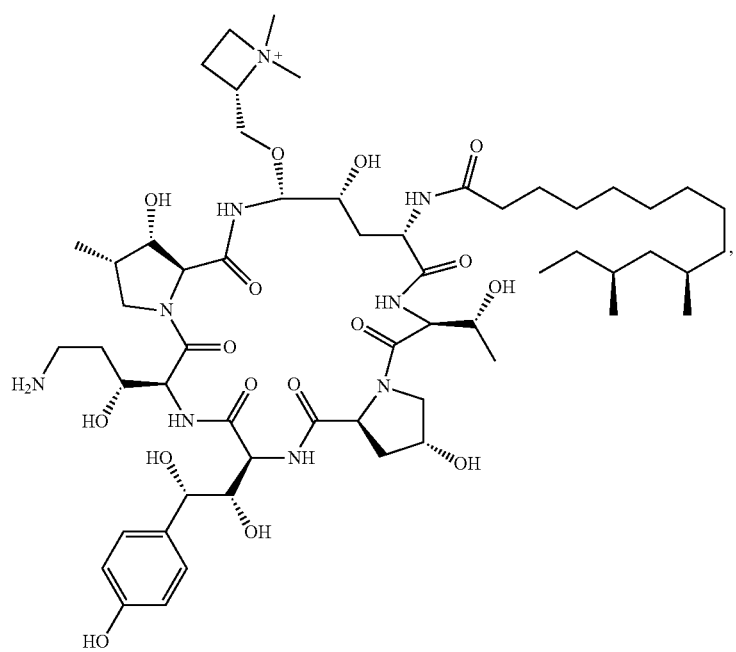
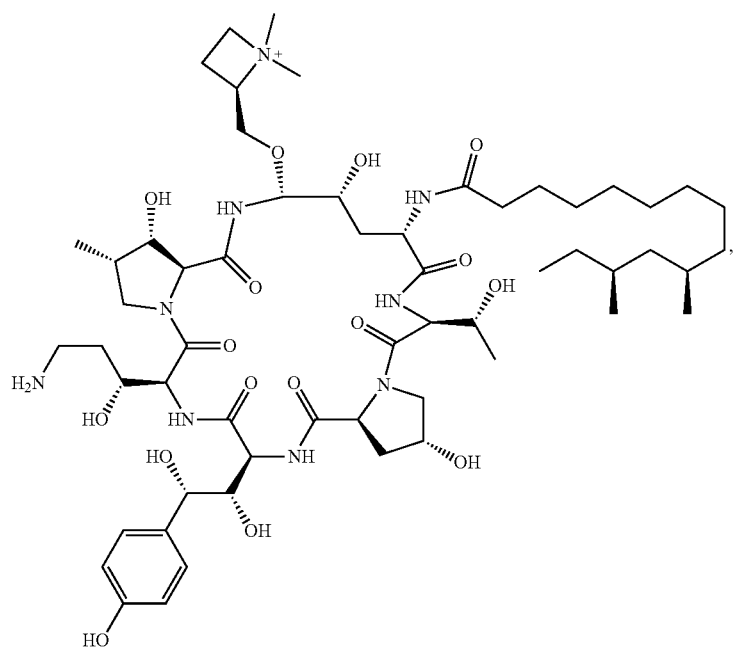

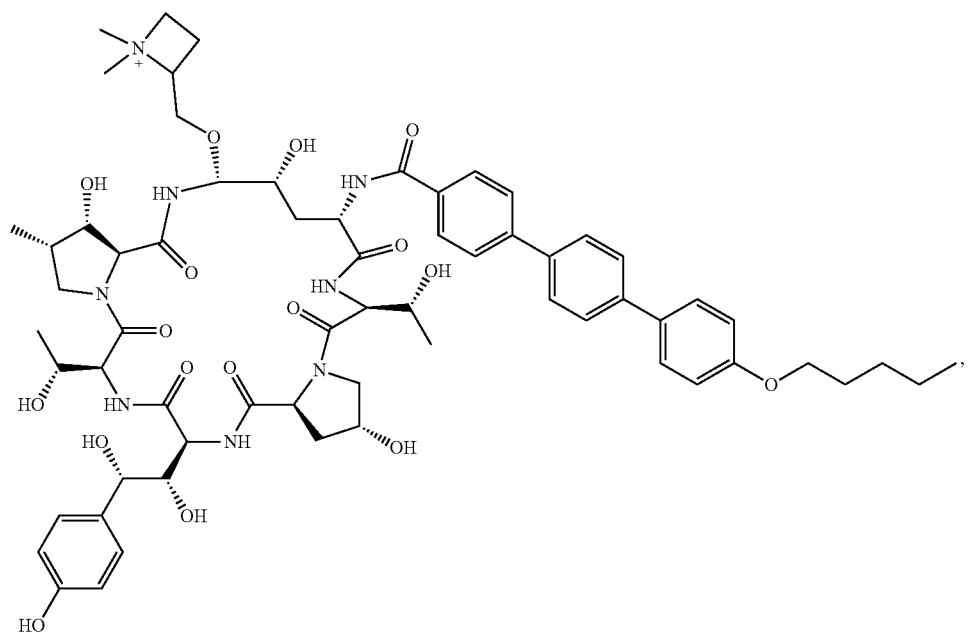
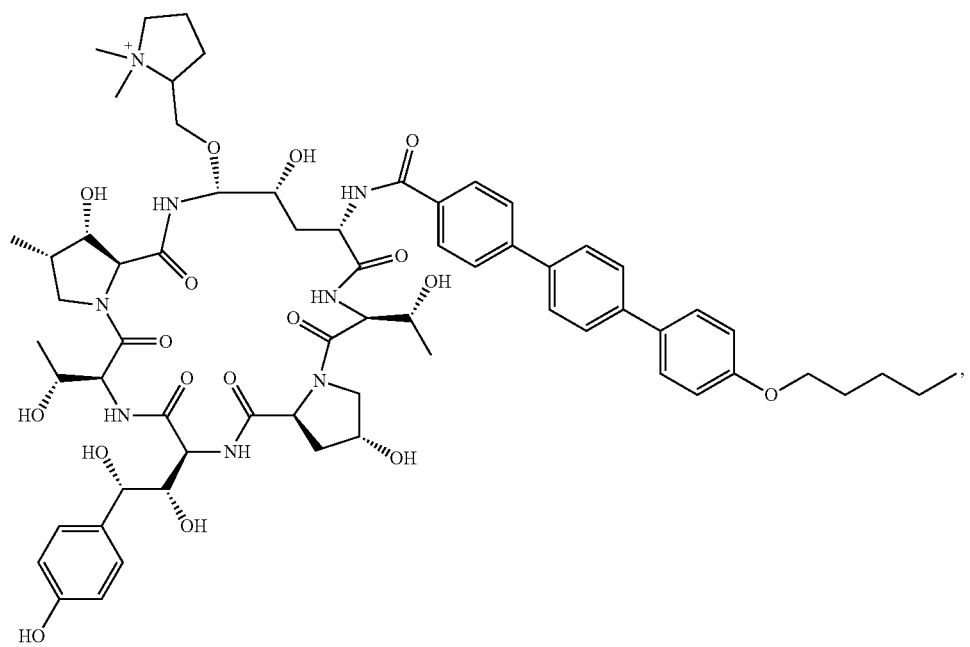

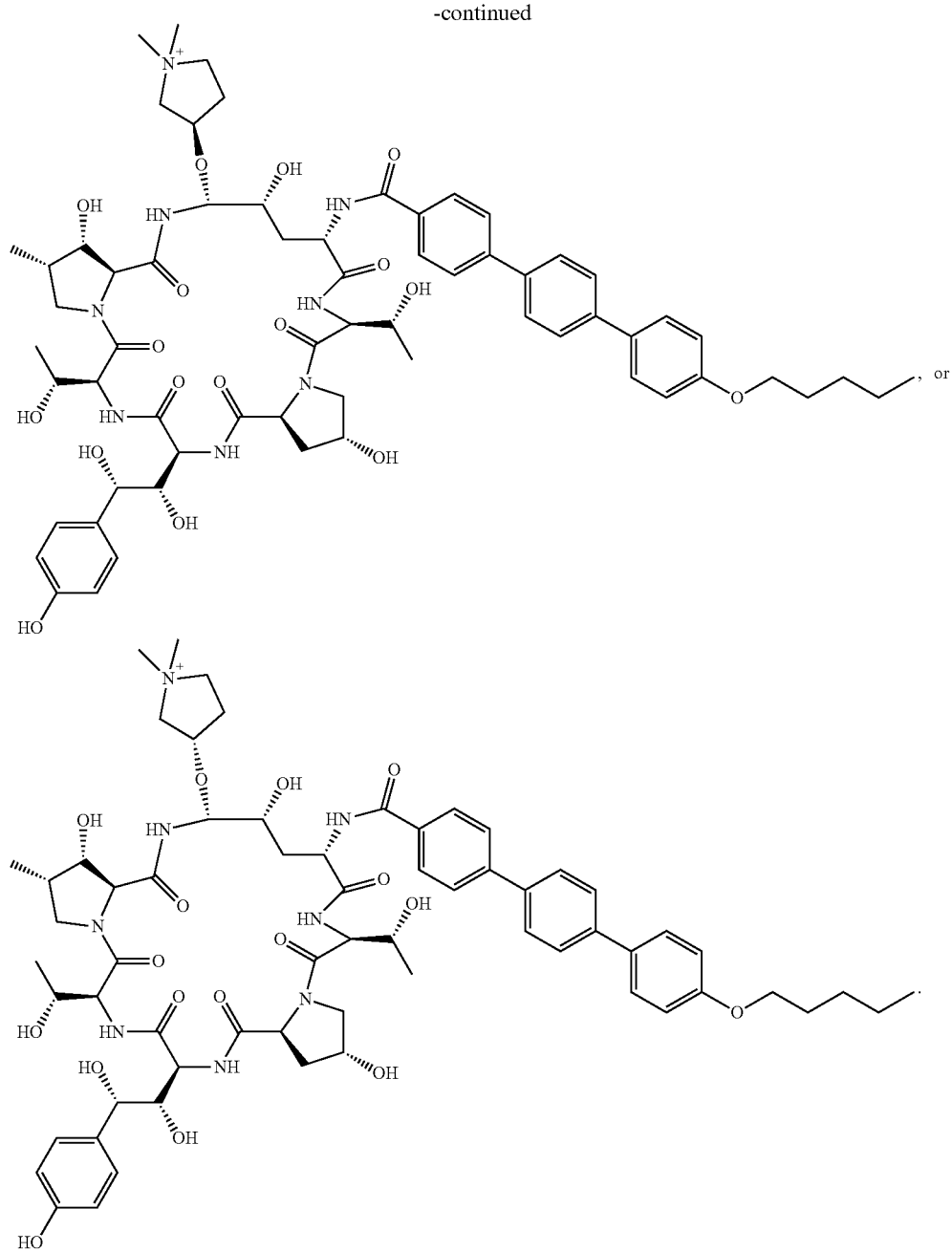

5. The compound or the pharmaceutically acceptable salt or isomer thereof according to claim 4, wherein the pharmaceutically acceptable salt is selected from the group consisting of an acetate salt, a trifluoroacetate salt and a formate salt.

6. A pharmaceutical composition comprising the compound or the pharmaceutically acceptable salt or isomer thereof according to claim 4, and a pharmaceutically acceptable excipient.

* * * * *